(12) United States Patent
Segawa

(10) Patent No.: US 7,100,734 B2
(45) Date of Patent: Sep. 5, 2006

(54) ELECTRIC-POWERED POWER STEERING APPARATUS

(75) Inventor: Toru Segawa, Maebashi (JP)

(73) Assignee: NSK Ltd., Tokyo (JP)

( * ) Notice: Subject to any disclaimer, the term of this patent is extended or adjusted under 35 U.S.C. 154(b) by 118 days.

(21) Appl. No.: 10/622,132

(22) Filed: Jul. 17, 2003

(65) Prior Publication Data

US 2004/0163879 A1 Aug. 26, 2004

Related U.S. Application Data

(63) Continuation of application No. PCT/JP03/07145, filed on Jun. 5, 2003.

(51) Int. Cl.
*B62D 5/04* (2006.01)

(52) U.S. Cl. .................... 180/444; 74/606 R; 74/552
(58) Field of Classification Search ............... 180/443, 180/444; 74/606 R, 552
See application file for complete search history.

(56) References Cited

U.S. PATENT DOCUMENTS

| | | | |
|---|---|---|---|
| 5,044,454 A | 9/1991 | Kanazawa et al. | |
| 6,044,723 A | 4/2000 | Eda et al. | |
| 6,357,313 B1 | 3/2002 | Appleyard | |
| 6,491,131 B1 | 12/2002 | Appleyard | |
| 6,763,738 B1 * | 7/2004 | Tsutsui et al. | 74/388 PS |
| 2002/0017420 A1 | 2/2002 | Kinme et al. | |
| 2002/0121401 A1 | 9/2002 | Shimizu et al. | |

FOREIGN PATENT DOCUMENTS

| | | |
|---|---|---|
| EP | 0 420 131 | 4/1991 |
| JP | 63-046281 | 2/1988 |
| JP | 03-112784 | 5/1991 |
| JP | 05-009583 | 1/1993 |
| JP | 08-014266 | 1/1996 |
| JP | 09-030432 | 2/1997 |
| JP | 10-148216 | 6/1998 |
| JP | 10-281235 | 10/1998 |
| JP | 11-043062 | 2/1999 |
| JP | 11-129703 | 5/1999 |
| JP | 11-151904 | 6/1999 |
| JP | 11-308805 | 11/1999 |
| JP | 2000-043739 | 2/2000 |
| JP | 2000-142009 | 5/2000 |
| JP | 2001-233224 | 8/2001 |
| JP | 2001-233225 | 8/2001 |
| JP | 2001-270448 | 10/2001 |
| JP | 2001-315653 | 11/2001 |
| JP | 2001-322554 | 11/2001 |
| JP | 2002-021943 | 1/2002 |

(Continued)

OTHER PUBLICATIONS

International Search Report dated Sep. 14, 2004.
International Preliminary Examination Report dated Dec. 16, 2003.
Richard Backhaus. The Servoelectric of ZF. ATZ Automobiltechnische Zeitschrift. XP–000780494, Sep. 1, 1998, vol. 100, No. 9, pp. 636–638.
The Nikkan Kogyo Shinbun Ltd. Gears. vol. 5.
International Preliminary Examination Report dated May 27, 2005.

*Primary Examiner*—Matthew Luby
(74) *Attorney, Agent, or Firm*—Katten Munchin Rosenman LLP

(57) ABSTRACT

An assist apparatus for electric-powered power steering apparatus is provided to have a torque sensor, steering shaft, preload pad 70, a torsion coil spring 30, and an electric motor 31. With the preload pad 70 and torsion coil spring 30, an elastic force is applied to the worm shaft 29 in the direction toward the worm wheel 28, whereby noises due to colliding teeth are prevented from occurring in the meshing portion between the worm wheel 28 and worm shaft 29.

38 Claims, 27 Drawing Sheets

FOREIGN PATENT DOCUMENTS

| JP | 2002-029434 | 1/2002 |
| JP | 2002-096749 | 4/2002 |
| JP | 2002-098198 | 4/2002 |
| JP | 2002-266987 | 9/2002 |
| JP | 2002-323059 | 11/2002 |
| WO | 99/11502 | 3/1999 |
| WO | 99/65758 | 12/1999 |
| WO | 02/32741 | 4/2002 |
| WO | PCT/JP02/12651 | 12/2002 |

\* cited by examiner

PRIOR ART

ELECTRIC-POWERED POWER STEERING APPARATUS

This is a continuation of pending International Application PCT/JP03/07145, filed Jun. 5, 2003.

TECHNICAL FIELD OF THE INVENTION

This invention is related to an electric-powered power steering apparatus installed in the steering apparatus of an automobile to make it possible to reduce the power required by an operator for controlling a steering wheel by using the auxiliary power of an electric motor.

BACKGROUND TECHNOLOGY OF THE INVENTION

A power steering apparatus is widely used as an apparatus for making it possible to reduce the power required for an operator to control the steering wheel when applying an angle to the steered wheels (normally the front wheel except in the case of special vehicles such as a fork lift). Also, in recent years, electric-powered power steering apparatuses that use an auxiliary power source are beginning to become popular as this kind of power steering apparatus. Compared to a hydraulic power steering apparatus, an electric-powered power steering apparatus has advantages in that it can be made more compact and lighter, that the size (torque) of the auxiliary power is easy to control and that there is less power loss of the engine. FIG. 40 shows the basic construction of a conventional electric-powered power steering apparatus.

In the middle of the steering shaft 2, which is turned by operating the steering wheel 1, there are a torque sensor 3 that detects the direction and size of the torque applied to the steering shaft 2 from the steering wheel 1, and a speed reducer 4. The output side of this speed reducer 4 connects to the middle of the steering shaft 2, and similarly, the input side connects to the rotating shaft of an electric motor 5. Also, the detection signal from the torque sensor 3 is, together with a signal indicating vehicle speed, input to a controller 6 for controlling the electric power to the electric motor 5. Moreover, in the past, a worm-gear reducer having a large lead angle and reversibility in the power transmission direction has been generally used as the speed reducer 4. In other words, the worm wheel that receives the torque is fastened to the middle of the steering shaft 2, and the worm on the worm shaft, which is connected to and fastened to the rotating shaft of the electric motor 5 that applies the torque, meshes with the worm wheel.

When the steering wheel 1 is operated and the steering shaft 2 is turned in order to apply an angle to the steered wheels 14, the torque sensor 3 detects the turning direction and torque of the steering shaft 2, and sends a signal indicating the detected values to the controller 6. The controller 6 then sends electric power to the electric motor 5 and by way of the speed reducer 4 turns the steering shaft 2 in the same direction as the direction of rotation of the steering wheel 1. As a result, the tip end of the steering shaft 2 (bottom end in FIG. 40) turns by a torque larger than the torque based on the force applied from the steering wheel 1.

The rotation of the tip end of the steering shaft 2 is transmitted to the input shaft 10 of the steering gear 9 by way of the universal joints 7 and intermediate shaft 8. This input shaft 10 turns the pinion 11 of the steering gear 9, and pushes or pulls the tie rod 13 by way of the rack 12 to apply the desired angle to the steered wheels 14. As can be clearly seen from the explanation above, the torque that is transmitted to the intermediate shaft 8 from the tip end of the steering shaft 2 by way of the universal joints 7 is larger than the torque applied to the base end of the steering shaft 2 (top end in FIG. 40) from the steering wheel 1 by the amount of the auxiliary power supplied from the electric motor by way of the speed reducer 4. Therefore, the force required by the operator in order to operate the steering wheel 1 and to apply an angle to the steered wheels 14 becomes smaller by the amount of auxiliary power. Also, disclosures of prior technology related to the invention are given below.

(1) International Disclosure Pamphlet 99/65758, (2) International Disclosure Pamphlet 99/11502, (3) JP Patent Publication Tokukai Hei 3-112784, (4) JP Utility Model Publication Jitsukai Sho 63-46281, (5) JP Patent Publication Tokukai Hei 11-43062, (6) International Disclosure Pamphlet 02/32741, (7) JP Patent Publication Tokukai 2002-98198, (8) JP Patent Publication Tokukai Hei 10-281235, (9) JP Patent Publication Tokukai 2000-43739, (10) JP Patent Publication Tokukai 2002-21943, (11) JP Patent Publication Tokukai 2002-29434, (12) JP Patent Publication Tokukai Hei 9-30432, (13) JP Patent Publication Tokukai 2001-233224, (14) JP Patent Publication Tokukai 2001-233225

In the case of the conventionally used electric-powered power steering apparatus described above, a worm-gear reducer is used as the speed reducer 4 in between the electric motor 5 and the steering shaft 2. However, there is unavoidable backlash in this worm-gear reducer. This backlash becomes larger as the errors in dimensions and assembly errors in the components of the worm-gear reducer such as the worm shaft, worm wheel and bearing for supporting these members becomes larger. When there is large backlash like this, there is large collision between some of the teeth surfaces and the worm wheel and worm gear, which can cause loud, disturbing noise.

It is considered possible to reduce this backlash by suitably fitting the components of the worm-gear reducer together and by taking the precision of dimensions into consideration. However, when reducing this backlash, the work of controlling the precision of the dimensions and assembling the components becomes troublesome, and causes the cost to increase.

DISCLOSURE OF THE INVENTION

Taking the problems mentioned above into consideration, this invention is to provide a structure which can be constructed inexpensively and can suppress the occurrence of disturbing noise due to colliding teeth in the gear meshing section.

The electric-powered power steering apparatus of this invention is provided as follows:

(1) An assist apparatus for electric-powered power steering Apparatus having a torque sensor, assist shaft, worm wheel, worm shaft, elastic force application means and an electric motor, comprises first to fourth bearings and wherein the torque sensor is located around the steering shaft or pinion; the assist shaft is one of the steering shaft, the pinion and a sub-pinion; the worm wheel is fastened around one of the steering shaft, pinion and sub-pinion; the worm shaft has a worm gear that meshes with the worm wheel; the electric motor comprises a rotating shaft, a rotor located on the outer-diameter side of the rotating shaft, and a stator located such that it faces the rotor in the radial direction; and the rotating shaft and worm shaft are connected to each other by way of a toothed joint or elastic member. The first bearing supports inside the casing the end section of the rotating shaft on the opposite side from the worm shaft; the second bearing supports inside the casing the portion between the joint, which connects the worm shaft and the rotating shaft, and the rotor; the third bearing supports the end of the worm shaft on the side of the rotating shaft inside the gear housing such that the worm shaft can free tilt within a specified range; and the fourth bearing supports the end of the worm shaft on the opposite side from the rotating shaft inside the gear housing. Also, there is a clearance in the radial direction either between the outer peripheral surface of the outer race of the fourth bearing and the inner surface of the gear housing, or between the inner peripheral surface of the inner race of the fourth bearing and the outer peripheral surface of the worm shaft. The elastic-force application means comprises an elastic member having a variable spring constant that can be changed from a low spring constant of 1 N/mm to 20 N/mm to a high spring constant of 180 N/mm or more, and it is located between the fourth bearing and gear housing, between the fourth bearing and the worm shaft and/or between the gear housing and the worm shaft so as to apply an elastic force corresponding to the radial displacement of the worm shaft. Also, when not driven by the electric motor, the elastic force having a low spring constant applies a pre-load to parts of the toothed surfaces of the worm and worm wheel to bring them into contact; and when driven by the maximum output of the electric motor and the worm shaft is moved in the direction going away from the worm wheel by the reaction force applied to the worm shaft from the worm wheel, with the area of meshing moved just 0.1 mm to 1.0 mm in the radial direction of the worm shaft with respect to when not driven, the elastic force having a high spring constant applies a pre-load to part of the toothed surfaces of the worm and worm wheel and brings them into contact. Also, the amount of increase in torque of the assist shaft due to the rise in friction force in the area where the worm shaft meshes with the worm wheel caused by applying an elastic force having a low spring constant to the worm shaft is kept within a range of 0.4 Nm to 5 Nm.

(2) The assist apparatus for an electric-powered power steering apparatus described in (1) above wherein the total sum.$_1$ of the gaps in the radial direction existing inside the second bearing, in the fitting section between the inner race of the second bearing and the rotating shaft, and in the fitting section between the outer race of the second bearing and the inner surface of the casing is less than the total sum.$_2$ of the gaps in the radial direction existing inside the third bearing, in the fitting section between the outer race of the third bearing and the inner surface of the gear housing, in the fitting section between the inner race of the third bearing and the worm shaft, and in the connecting section between the worm shaft and the rotating shaft.

(3) The assist apparatus for an electric-powered power steering apparatus described in (1) above wherein when the amount of displacement in the radial direction of a point on the center axis of the rotating shaft where a 20 N force is applied in the radial direction, to a place on the rotating shaft that coincides in the axial direction with the second bearing is taken to be $x_1$, and the amount of displacement in the radial direction of a point on the center axis of the worm shaft where a 20 N force is applied in the radial direction, to a place on the worm shaft that coincides in the axial direction with the third bearing is taken to be $x_2$, and the displacement in the radial direction of the center axis of the rotating shaft with reference to the center axis of the worm shaft in a part connecting the center axis of the worm shaft with the center axis of the rotating shaft when a 20 N force is applied in the radial direction to the part on the rotating shaft where the worm shaft and rotating shaft are connected is taken to be $x_3$, $x_1 < (x_2 + x_3)$.

(4) The assist apparatus for an electric-powered power steering apparatus described in any of the items (1) to (3) above wherein the angle between the worm shaft and rotating shaft when driven by the electric motor is less than the angle between the worm shaft and the rotating shaft when not driven by the electric motor.

(5) The assist apparatus for an electric-powered power steering apparatus described in any of the items (1) to (4) above wherein the angle between the center axis of the worm shaft and the center axis of the rotating shaft when driven by the electric motor is 10 minutes or less.

(6) The assist apparatus for an electric-powered power steering apparatus described in any of the items (1) to (5) above wherein the third bearing is a deep-groove type ball bearing having a C2 or C3 internal clearance.

(7) The assist apparatus for an electric-powered power steering apparatus described in any of the items (1) to (6) above wherein the third bearing is a four-point contact type ball bearing.

(8) The assist apparatus for an electric-powered power steering apparatus described in any of the items (1) to (7) above wherein the balls of at least one of the third and fourth bearings are pre-loaded in the axial direction by a force of 20 N to 200 N.

(9) The assist apparatus for an electric-powered power steering apparatus described in any of the items (1) to (8) above wherein the connection between the worm shaft and the rotating shaft is located at a position that coincides in the axial direction with the third bearing.

(10) The assist apparatus for an electric-powered power steering apparatus described in any of the items (1) to (9) above wherein the ends of the worm shaft and the rotating shaft are connected by a spline joint and wherein the displacement in center of both shafts due to clearance in the radial direction of the spline joint is kept within 10 .m to 200 .m.

(11) The assist apparatus for an electric-powered power steering apparatus described in any of the items (1) to (10) above wherein the ends of the worm shaft and rotating shaft are connected to each other by a spline joint, and wherein the displacement of the centers of the worm shaft and rotating shaft due to the clearance existing in-row section between the casing which supports the end of the rotating shaft, and the gear housing which supports the end of the worm shaft, is less than the displacement of the center of these shafts due to the clearance in the radial direction existing in the spline joint.

(12) The assist apparatus for an electric-powered power steering apparatus described in any of the items (1) to (11) above wherein the rotor comprises a permanent magnet and the stator comprises a coil, and wherein a vector-control apparatus changes the magnetic force of the stator.

(13) The assist apparatus for an electric-powered power steering apparatus described in any of the items (1) to (12) above wherein a controller controls the output of the electric motor according the amount of displacement in the radial direction of the worm shaft.

(14) The assist apparatus for an electric-powered power steering apparatus described in any of the items (1) to (13) above wherein the amount of displacement in the radial direction of the center axis of the worm shaft at a portion where a 20 N force is applied in the radial direction and where the worm shaft coincides in the axial direction with the second bearing is 5 .m to 200 .m.

(15) The assist apparatus for an electric-powered power steering apparatus described in any of the items (1) to (14) above wherein the force received by the second bearing from the rotating shaft due to the force acting on the area where the worm wheel meshes with the worm shaft when driven by the electric motor is less than the force received by the third bearing from the worm shaft due to the force that acts on this same area of meshing.

(16) The assist apparatus for an electric-powered power steering apparatus described in any of the items (1) to (15) above wherein the position of the center in the axial direction of the spline joint between the worm shaft and the rotating shaft is located closer to the third bearing than the position of the center in the axial direction between the second bearing and the third bearing.

(17) The assist apparatus for an electric-powered power steering apparatus of any of the items (1) to (3) above wherein the elastic force is applied to the worm shaft from the elastic-force application means located inside the gear housing without by way of the fourth bearing.

(18) The assist apparatus for an electric-powered power steering apparatus of item (17) above wherein the elastic-force application means comprises a torsion coil spring that is located around the worm shaft.

(19) An assist apparatus for an electric-powered power steering apparatus having a torque sensor, assist shaft, worm wheel, worm shaft, and electric motor, and comprising a first bearing and fourth bearing; wherein the torque sensor is located around the steering shaft or pinion; the assist shaft is either one of the steering shaft, pinion and a sub-pinion; the worm wheel is fastened to one of the steering shaft, pinion and sub-pinion; the worm shaft is formed with a worm that meshes with the worm wheel; and the electric motor comprises a rotating shaft that is integrated with a part of the worm shaft, a rotor that is located around the outer-diameter side of the rotating shaft, and a stator that is located such that it faces the rotor in the radial direction; also wherein the first bearing supports the end of the rotating shaft on the side opposite from the worm shaft inside the casing such that the rotating shaft can tilt freely within a specified range; and the fourth bearing supports the end of the worm shaft on the opposite side from the rotating shaft inside the gear housing; also there is a clearance in the radial direction either between the outer peripheral surface of the outer race of the fourth bearing and the inner surface of the casing, or between the inner peripheral surface of the inner race of the fourth bearing and the outer peripheral surface of the worm shaft or in the interior of the fourth bearing.

(20) The assist apparatus for an electric-powered power steering apparatus of item (19) above wherein a cylindrical member is fastened around the outer peripheral surface of the worm shaft, and worm teeth are formed around the outer peripheral surface of this cylindrical member to mesh with the worm wheel.

(21) The assist apparatus for an electric-powered power steering apparatus of any of the items (19) to (20) above wherein the angle between the center axis of the stator and the rotating shaft of the electric motor when driven by the electric motor is less than the angle between the center axis of the stator and the rotating shaft when not driven by the electric motor.

(22) The assist apparatus for an electric-powered power steering apparatus of any of the items (19) to (21) above wherein the inner peripheral surface of the inner race of the fourth bearing faces the outer peripheral surface of the worm shaft by way of a clearance or elastic material.

(23) The assist apparatus for an electric-powered power steering apparatus of any of the items (19) to (21) above wherein the fourth bearing is a sliding bearing, and wherein the inner peripheral surface of this sliding bearing faces the outer peripheral surface of the worm shaft.

(24) The assist apparatus for an electric-powered power steering apparatus of any of the items (19) to (23) above wherein a hole for assembling the fourth bearing inside the gear housing that supports the fourth bearing is formed in the part of the gear housing that faces the fourth bearing, and this hole is blocked with a cover.

(25) The assist apparatus for an electric-powered power steering apparatus of any of the items (19) to (24) above wherein the electric motor uses brushless construction.

(26) The assist apparatus for an electric-powered power steering apparatus of any of the items (19) to (25) above wherein a support bushing is provided in part of the casing for supporting the worm shaft before it is installed inside the gear housing.

(27) The assist apparatus for an electric-powered power steering apparatus of any of the items (19) to (26) above wherein a pre-load in the axial direction is applied to the balls of at least one of the first and fourth bearings.

(28) The assist apparatus for an electric-powered power steering apparatus of any of the items (19) to (27) above wherein the first bearing is a four-point contact type ball bearing.

(29) An electric-powered power steering apparatus comprising: a steering shaft having a steering wheel located at its rear end, a pinion that is located at the front end of the steering shaft, a rack whose teeth mesh with the pinion or a member supported by the pinion, the assist apparatus for an electric-powered power steering apparatus of any of the items (1) to (28) and a controller for controlling the drive state of the electric motor.

(30) An electric-powered power steering apparatus wherein the torque obtained by reducing the output of the electric motor by a worm speed reducer at a magnitude corresponding to the steering torque applied to the steering wheel is applied to the steering shaft, and wherein an elastic-force application means applies an elastic force toward the worm wheel to an end of the worm shaft or to the bearing for supporting the end of the worm shaft.

(31) The electric-powered power steering apparatus of item (30) above wherein the elastic-force application means is a pre-load pad that is located inside the gear housing, and a torsion coil spring that is located around this pre-load pad, and wherein this pre-load pad is made of synthetic resin.

(32) The electric-powered power steering apparatus of item (30) above wherein the elastic-force application means is a pre-load pad that is located inside the gear housing and a torsion coil spring that is located around this pre-load pad, and wherein there is a gap in the axial direction between the surface of the wires of each winding of the torsion coil spring.

(33) The electric-powered power steering apparatus of item (30) above wherein the elastic-force application means is a pre-load pad that is located inside the gear housing and a torsion coil spring that is located around this pre-load pad, and wherein an arm section is formed on part of the pre-load pad for controlling the displacement of the pre-load pad inside the gear housing before the worm shaft is inserted through a through hole that is formed in the pre-load pad.

(34) The electric-powered power steering apparatus of item (30) above wherein the elastic-force application means is a pre-load pad that is located inside the gear housing and a torsion coil spring that is located around this pre-load pad, and wherein the area of contact between the outer peripheral surface of the pre-load pad and the torsion coil spring is arc shaped such that the radius of curvature of the part on the outer peripheral surface of the pre-load pad away from the area of contact is less than the radius of curvature of the area of contact.

(35) The electric-powered power steering apparatus of item (30) above wherein the elastic-force application means is a pre-load pad that is located inside the gear housing and a torsion coil spring that is located around this pre-load pad, and wherein a protruding fitting section is formed on part of the outer peripheral surface of the pre-load pad for preventing the torsion coil spring from falling off from around the pre-load pad.

(36) The electric-powered power steering apparatus of item (30) above wherein the elastic-force application means is a pre-load pad that is located inside the gear housing, and wherein protrusions are formed at two or more locations on each end in the axial direction of the pre-load pad for controlling displacement in the axial direction of the pre-load pad inside the gear housing.

(37) The electric-powered power steering apparatus of item (30) above wherein the elastic-force application means has a pre-load pad that is located inside the gear housing, and wherein elastic material is located between the gear housing or a member fixed to the gear housing and the outer peripheral surface of the pre-load pad for preventing the pre-load pad from turning inside the gear housing.

(38) The electric-powered power steering apparatus of item (30) above wherein the elastic-force application means has a pre-load pad that is located inside the gear housing, and wherein a through hole is formed in part of the pre-load pad for inserting the tip end of the worm shaft and a tapered surface is formed on part of the pre-load pad for guiding part of the worm shaft into the through hole.

(39) The electric-powered power steering apparatus of item (30) above wherein the elastic-force application means has a pre-load pad that is located inside the gear housing, and wherein a tapered surface is formed on part of the pre-load pad or bearing for guiding the worm shaft inside the pre-load pad or worm shaft, and wherein the diameter of the opening of this tapered surface is greater than the diameter of the part on the warm shaft that is inserted into this opening by 0.5 mm or more.

In the case of the electric-powered power steering apparatus of this invention described above, by applying an elastic force by the elastic-force application device to the worm shaft in a direction toward the worm wheel, it is possible to apply a pre-load on the meshing section between the worm wheel and worm shaft, it is possible to construct the electric-powered power steering apparatus inexpensively and to suppress the occurrence of disturbing noise due to colliding teeth in the meshing section.

BEST EMBODIMENTS TO WORK THE INVENTION

Figure 1:
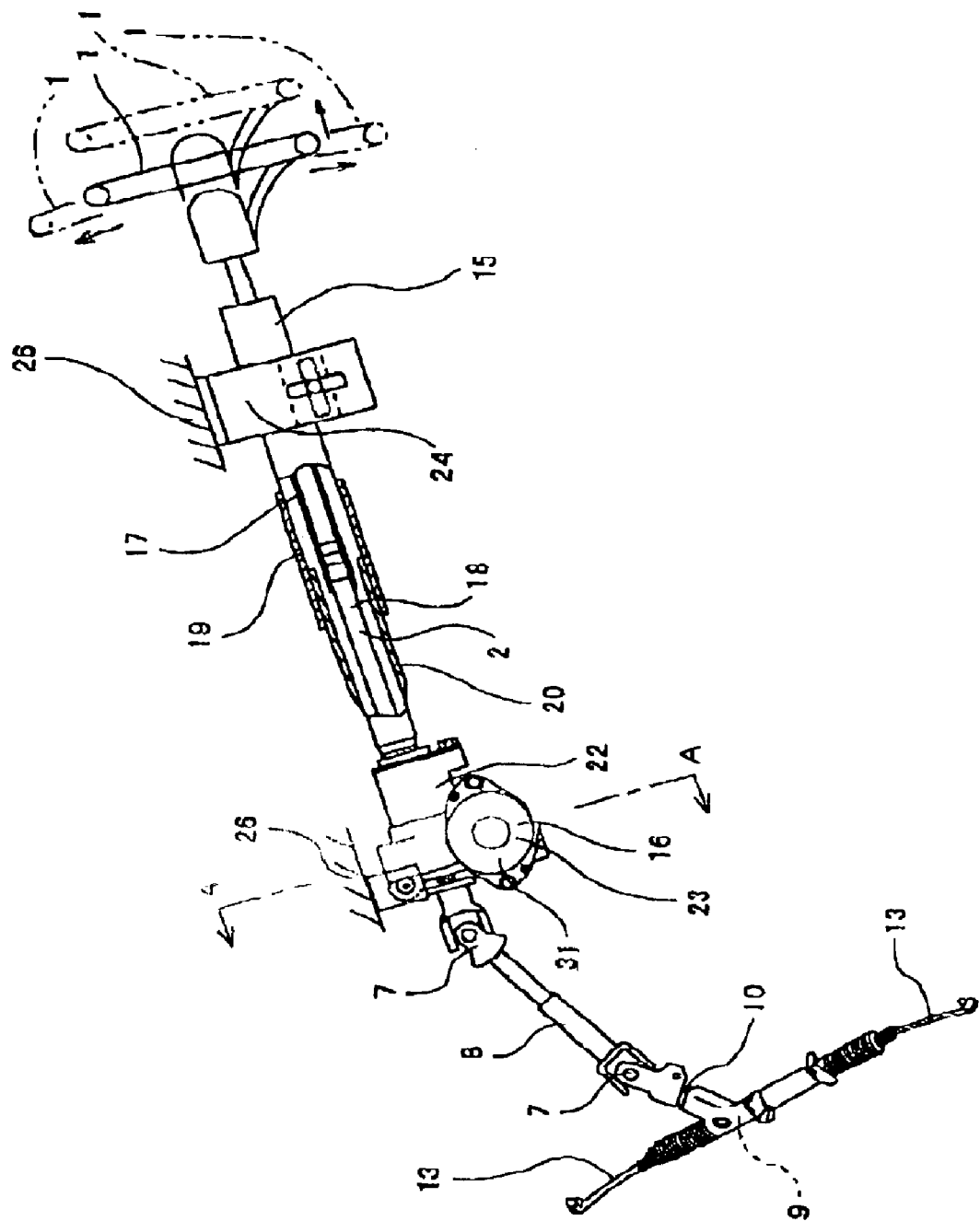
FIG. 1 is a partly cut-away view to show a first example of the present invention.
Figure 2:
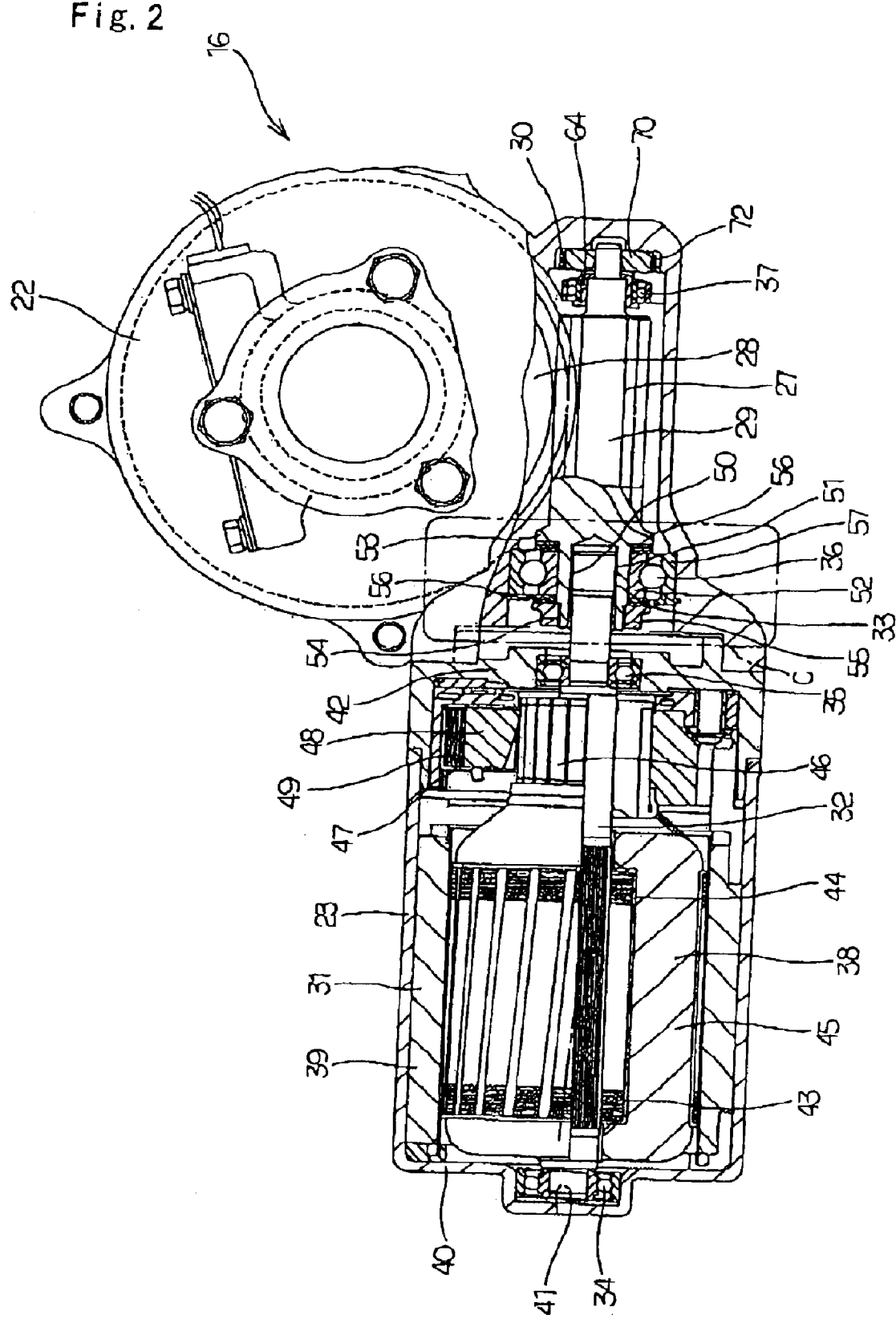
FIG. 2 is a partly cut-away cross sectional view taken along the line A—A in FIG. 1.
Figure 3:
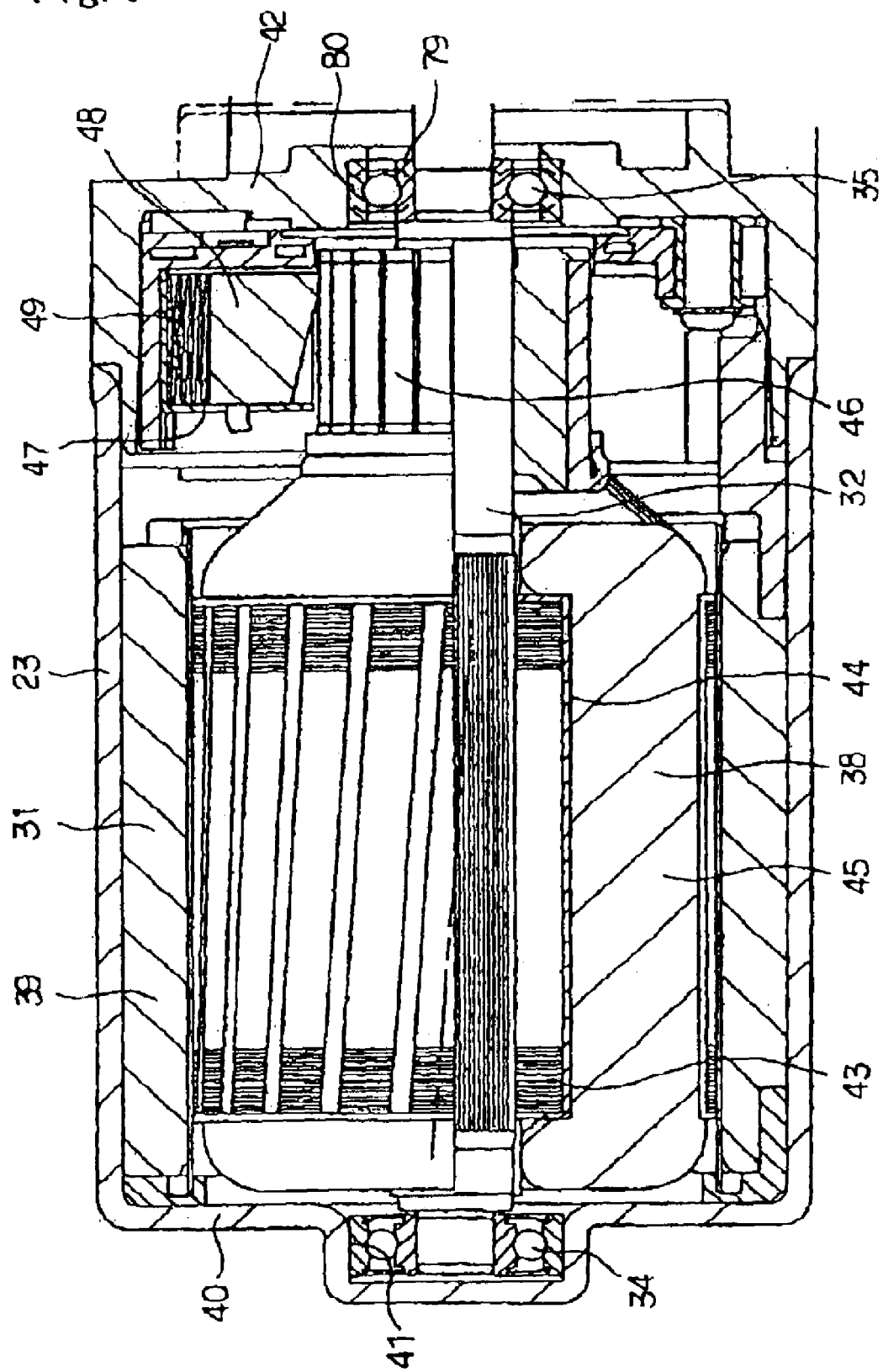
FIG. 3 is an enlarged cross sectional view of the left part of FIG. 2.
Figure 4:
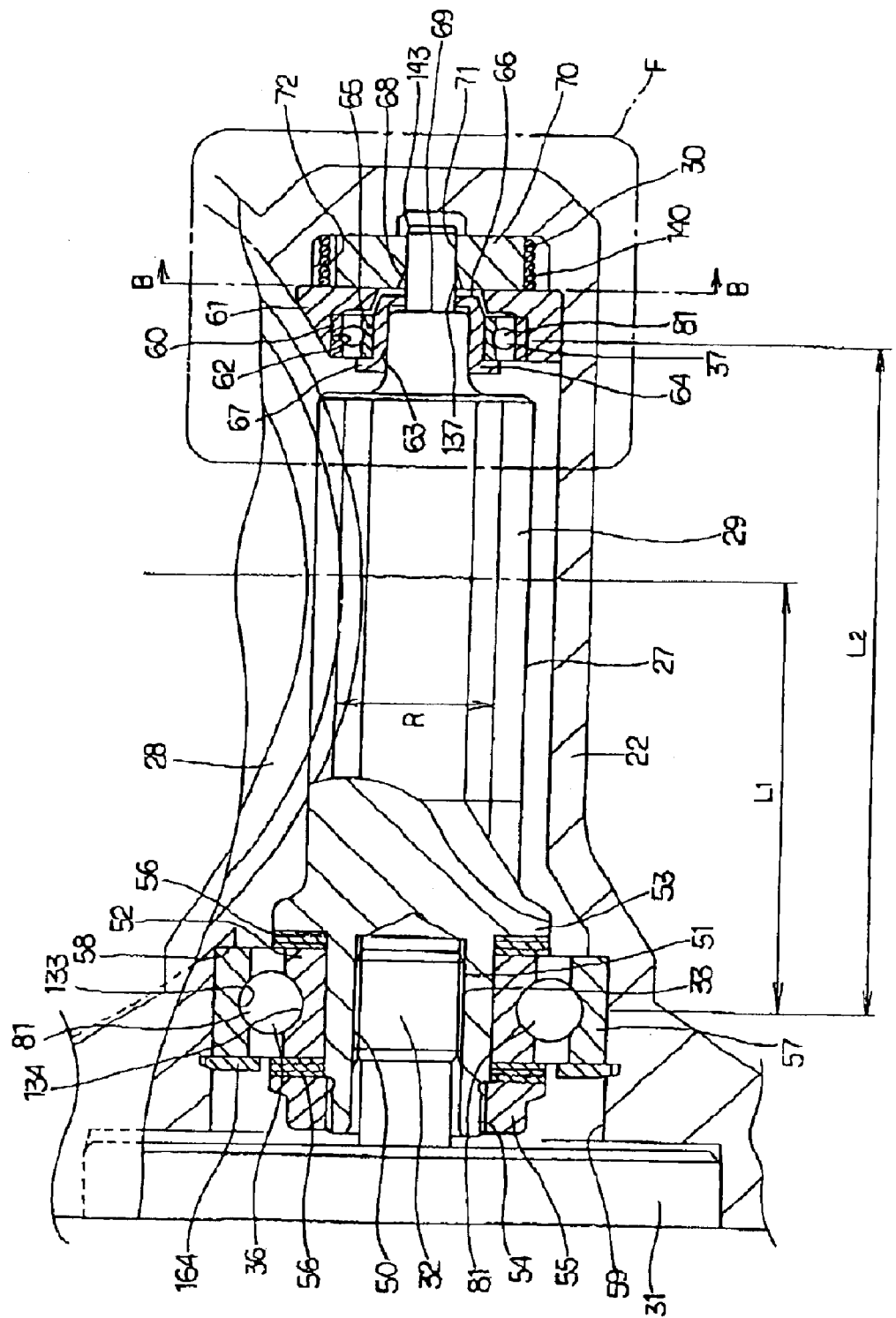
FIG. 4 is an enlarged cross sectional view of the right part of FIG. 2.
Figure 5:
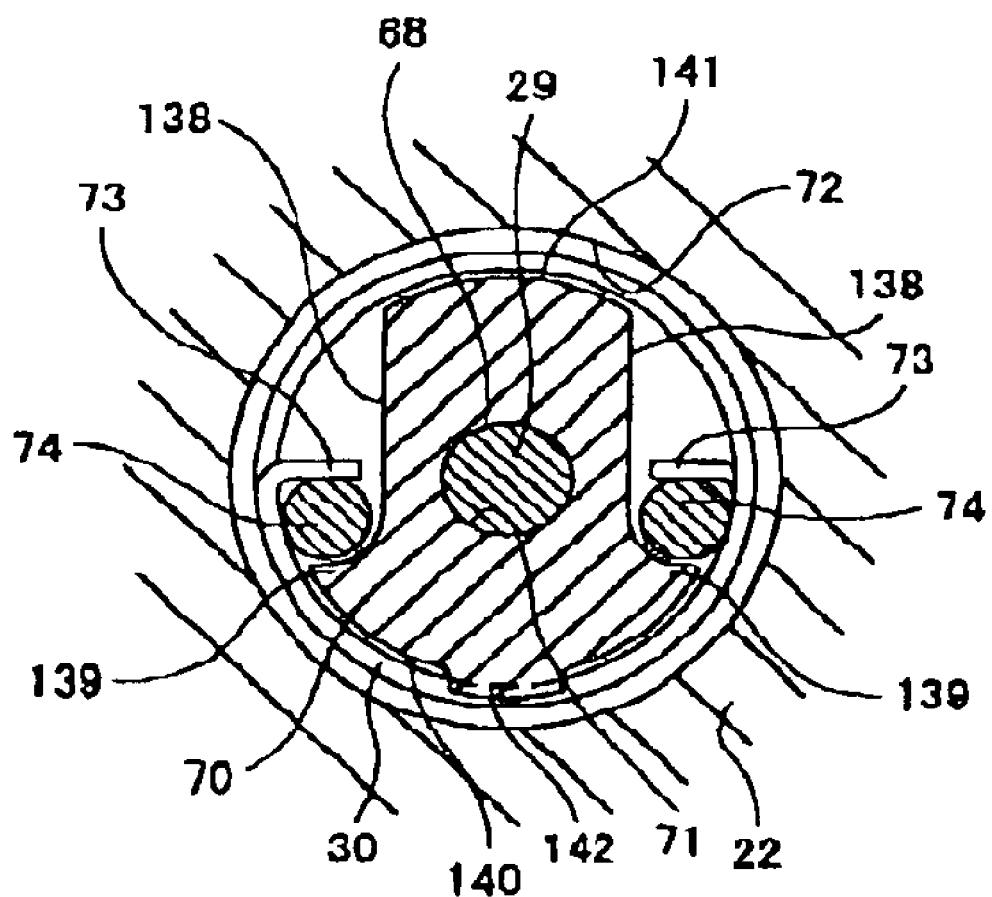
FIG. 5 is a cross sectional view taken along the line B—B in FIG. 4.

FIGS. 1 to 5 show a first example of the embodiment of the present invention. The electric-powered power steering apparatus of this embodiment comprises: a steering shaft 2, whose rear end is fastened to the steering wheel 1; a steering column 15 through which the steering shaft 2 is freely inserted; and an assist apparatus 16 for applying an auxiliary torque to the steering shaft 2.

Of these components, the steering shaft 2 comprises an outer shaft 17 and an inner shaft 18 that are joined together with a spline joint such that torque can be transmitted freely and that they can move in the axial direction. Also, in this example, the front end of the outer shaft 17 and rear end of the inner shaft 18 are connected to each other by a spline joint and by synthetic resin. Therefore, in the case of a collision, it is possible to shorten the length of the outer shaft 17 and inner shaft 18 by cutting this synthetic resin.

Moreover, the cylindrical shaped steering column 15 through which the steering shaft 2 is inserted, is formed such that it is collapsible by connecting an outer column 19 to an inner column 20 in a telescope shape, so that when there is impact in the axial direction, the column absorbs the impact and the entire length becomes shorter. Also, the front end of this inner column 20 is connected and fastened to the surface of the rear end of the gear housing 22, and the front end of the inner shaft 18 passes through the inside of the gear housing 22 and protrudes from the surface of the front end of the gear housing 22. In the case of this example, the inner shaft 18 corresponds to the assist shaft in the claims.

The steering column 15 is supported partially by part of the automobile body such as the bottom surface of the dashboard using a support bracket 24 in the middle section of the steering column 15. Also, there is a fitting section (not shown in the figures) located between the support bracket 24 and the automobile body 26, and when there is impact in the direction toward the front of the support bracket 24, the support bracket 24 becomes separated from this fitting section. Moreover, the top end of the gear housing 22 is also supported by part of the automobile body 26. In the case of this example, by using a tilt mechanism and telescopic mechanism, the front and rear position and the height of the steering wheel 1 can be freely adjusted. This tilt mechanism and telescopic mechanism have been well known previously and are not part of the features of this invention, so they will not be explained in detail.

The front end of the inner shaft 18 that protrudes from the front surface of the gear housing 22 connects to the rear end of the intermediate shaft 8 by way of a universal joint 7. Moreover, the front end of this intermediate shaft 8 connects to the input shaft 10 of the steering gear 9 by way of a universal joint 7. Also, the pinion 11 that is connected to the input shaft 10 meshes with the rack 12 (see FIG. 40). It is possible to install a vibration absorbing apparatus in the universal joints 7 to prevent the vibration that is applied to the intermediate shaft 8 from the ground by way of the wheels from being transmitted to the steering wheel 1.

Moreover, the assist apparatus 16 comprises: a torque sensor 3 (see FIG. 40); and the inner shaft 18; a worm wheel 28 that is fitted and fastened onto part of the inner shaft 18; a worm shaft 29; and electric motor 31, a torsion coil spring 30 that corresponds to the elastic-force application means described in the claims; and a pre-load pad 70. Furthermore, the assist apparatus 16 comprises: first to fourth ball bearings 34 to 37, which are the first to fourth bearings, respectively.

Figure 40:
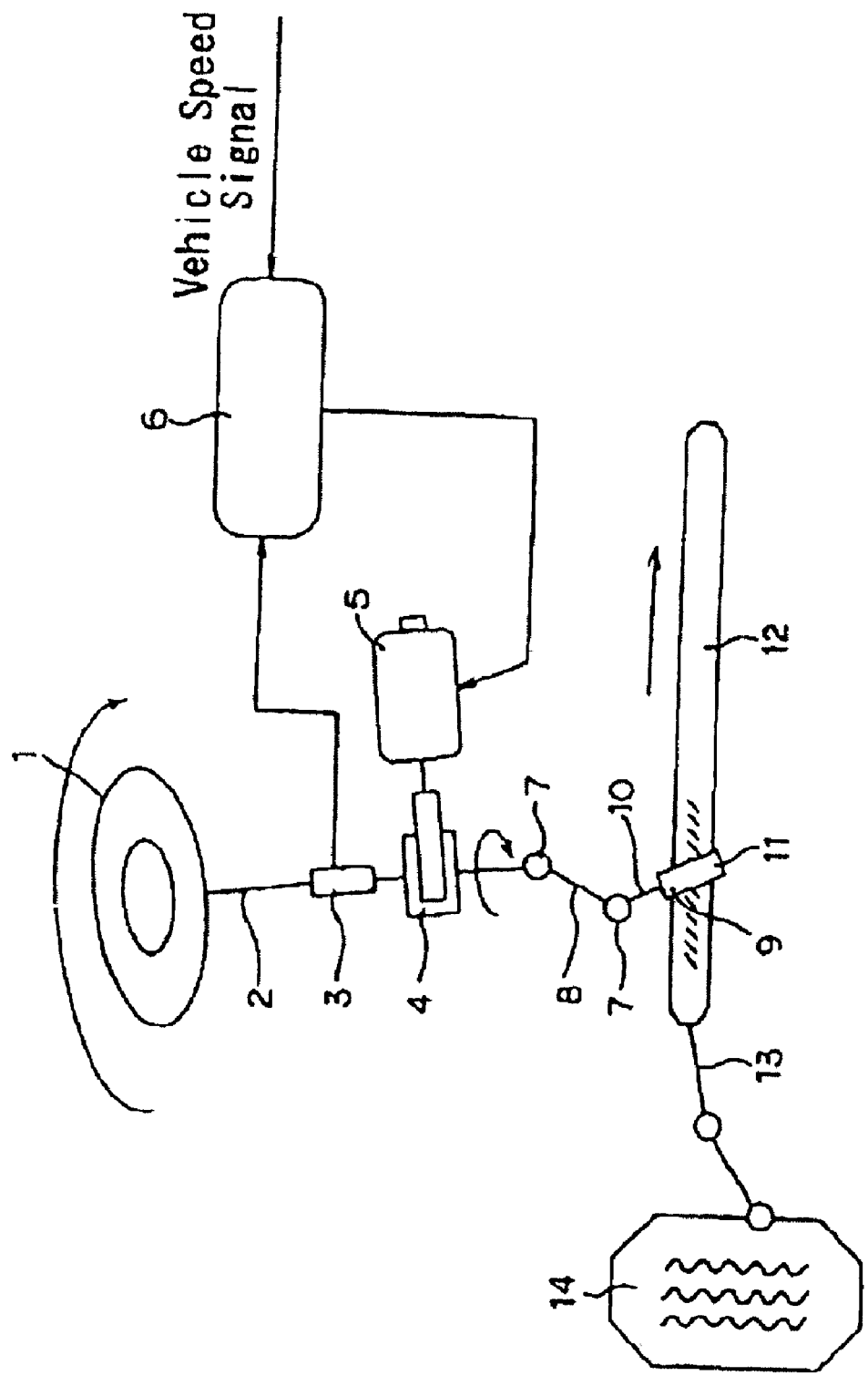
FIG. 40 is a brief view to show a whole structure of the electric-powered power steering apparatus to which the present invention is applied.

The torque sensor 3 is located around the middle section of steering shaft 2 and it detects the direction and size of the torque that is applied to the steering shaft 2 from the steering wheel 1, and sends a signal indicating the detected values (detection signal) to a controller 6 (see FIG. 40). Also, this controller 6 sends a signal for driving the electric motor 31 based on this detection signal, to generate auxiliary torque in the specified direction and specified size.

The worm wheel 28 and worm shaft 29 are located inside the gear housing 22, and the worm wheel 28 meshes with the worm 27 that is formed around the middle second of the worm shaft 29. Moreover, the electric motor 31 comprises: a casing 23 that is connected to and fastened to the gear housing 22; a permanent-magnet stator 39 that is located around the inner peripheral surface of the casing 23; a rotating shaft 32 that is located inside the casing 23; and a rotor 38 that is located around the middle section of the rotating shaft 32 such that it faces the stator 39.

The first ball bearing 34 is located between the inner peripheral surface of a concave hole 41, which is formed in the center of the bottom-plate section 40 of the casing 23, and the outer peripheral surface of the base end of the worm shaft 29, and it supports the base end (left end in FIGS. 2 and 3) of the rotating shaft 32 such that it rotates freely with respect to the concave hole 41. The second ball bearing 35 is located between the inner peripheral surface of a partition section 42, which is located around the inner peripheral surface in the middle of the casing 23, and the outer peripheral surface in the middle of the rotating shaft 32, and it supports the middle section of the rotating shaft 32 such that it rotates freely with respect to the partition section 42. The rotor 38 is located in the middle section of the rotating shaft 32, and it is formed with a core 43 made of laminated steel plate and with a coil 45 that is wound around a slot 44 located in a plurality of locations around the circumference on the outer peripheral surface of the core 43. Also, there is a commutator 46 for generating electric current in the coil 45 located between the rotor 38 and partition 42 near the tip end (near the right end in FIGS. 2 and 3) of the rotating shaft 32.

On the other hand, there is a brush holder 47 fastened to the section around the inner peripheral surface of the casing 23 that faces this commutator 46. Also, there is a brush 48 held in this brush holder 47 such that it can move freely in the radial direction of the casing 23. This brush 48 passes through the coupler terminal (not shown in the figures) that is located around the outer peripheral surface of the casing 23. An elastic force is applied to this brush 48 inward in the radial direction of the casing 23 by a spring 49 that is supported on the inside of the brush holder 47. The surface on the inside end of this brush 48 comes in sliding elastic contact with the outer peripheral surface of the commutator 46. This commutator 46 and brush 48 form a rotor phase detector for changing the direction of the excitation current in the coil 45.

In the case of this example, the female spline section 50 that is formed around the inner peripheral surface of the base end (left end in FIGS. 2 and 4) of the worm shaft 28 is connected to the male spline section 31 that is formed on the tip end of the rotating shaft 32 by a spline joint. This spline joint 33 connects the tip ends of both of the shafts 29, 32. With this construction, the worm shaft 29 rotates together with the rotating shaft 32.

The third ball bearing 36 supports the base end of the worm shaft 29 inside the gear housing 22 such that it can rotate freely. This third ball bearing 36 is a deep-groove type ball bearing and the rolling contact surfaces of the balls 81 come in contact with the outer raceway 133 formed around the inner peripheral surface of the outer race 57 and the inner raceway 134 formed around the outer peripheral surface of the inner race 52 such that there is contact at only one point on each ball 81. Moreover, the inner race 52 fits around the outer peripheral surface on the base end of the worm shaft 29 such that it coincides with the spline joint 33 in the axial direction. The location of the axial center of this spline joint 33 coincides nearly with the location of the axial center of this third ball bearing 36. Also, by forming a small clearance between the inner peripheral surface of the inner race 52 and the outer peripheral surface of the worm shaft 29, the worm shaft 29 can tilt freely within a certain range with respect to the third ball bearing 36. Also, there is a plurality of disc springs 56 located between both ends in the axial direction of the inner race 52 of this third ball bearing 36 and the side surface of the flange section 53 formed around the outer peripheral surface near the base end of the worm shaft 29, and the surface on the inside end of the nut 55 that connects and fastens the male screw section 54 formed on the base end of this worm shaft 29. The inner race 52 is elastically held between the side surface of the flange section 53 and the surface on the inside end (surface on the left end in FIGS. 2 and 4) of the nut 55. Also, the worm shaft 29 can move freely within a certain range in the axial direction with respect to the third ball bearing 36. Moreover, in this example, there is a C2 or C3-scale clearance in the radial direction inside the third ball bearing 36.

The outer race 57 of this third ball bearing 36 fits around the inner peripheral surface of a support hole 59 formed in part of the gear housing 22. One end in the axial direction of this outer race 57 (right end in FIGS. 2 and 4) comes in contact with a stepped section 58 formed around the inner peripheral surface of the support hole 59, and the other end in the axial direction of the outer race 57 (left end in FIGS. 2 and 4) is held in place by an attachment ring 164 (FIG. 4) that is attached on this inner peripheral surface.

The fourth ball bearing 37 is for supporting the tip end of the worm shaft 29 (right end in FIGS. 2 and 4) inside the gear housing 22 such that it can rotate freely. This fourth ball bearing 37 is a deep-groove type bearing, and the rolling contact surfaces of the balls 81 come in contact with the outer raceway formed around the inner peripheral surface of the outer race 60 and the inner raceway formed around the outer peripheral surface of the inner race 65 such that they come in contact at only one point on each ball 81. The outer race 60 of the fourth ball bearing 37 is fastened to the inside of the large-diameter section 62 formed around the inner peripheral surface of half of a generally circular-shaped holder 61 having an L-shaped cross section that is attached to the inside of the gear housing 22. Also, a bushing 64 is fitted onto the large-diameter section 63 that is formed on the section of outer peripheral surface near the tip end of the worm shaft 29 that is separated from the worm 27. This bushing 64 is formed in a generally cylindrical shape with a crank-shaped cross section. Also, the tip end of the worm shaft 29 passes loosely through the inside of this bushing 64 and this tip end protrudes from the outside surface of the inward facing flange section 66 that is formed on one end (right end in FIGS. 2 and 4) in the axial direction of the bushing 64. Also, the inner race 65 of the fourth ball bearing 37 fits around the middle section in the axial direction of this bushing 64. The surface of one end in the axial direction of this inner race 65 (left end surface in FIGS. 2 and 4) comes in contact with the inside surface of the outward facing flange section 67 that is formed on the other end in the axial direction (left end in FIGS. 2 and 4) of the bushing 64. Also, in the case of this example, by forming a minute clearance between the inner peripheral surface of the bushing 64 and the outer peripheral surface of the large-diameter section 63 of the worm shaft 29, the worm shaft 29 can tilt freely within a certain range with respect to the bushing 64.

Also, a minute gap is formed between a stepped section 69, which is the continuous section between the large-diameter section 63 formed on the worm shaft 29 and the small-diameter section 68 formed on the tip end side that is separated from the large-diameter section 63, and the inside surface of the inward facing flange section 66. There is also a tapered surface 143 formed on this continuous section between the tip-end surface of the worm shaft 29 and the small-diameter section 68.

Of this small-diameter section 68, the portion that protrudes from the outside surface of the inward facing flange section 66 formed on the bushing 64 is inserted into part of the pre-load pad 70. As shown in detail in FIG. 5, this pre-load pad 70 is made of synthetic resin mixed with a solid lubricating material, and formed such that parts are removed from two opposing sides in the radial direction of the cylindrical outer peripheral surface, and flat sections 138 and arm sections 139 are formed on both of the two opposing sides in the radial direction on the outer peripheral surface of the pre-load pad 70. And, the pre-load pad 70 is located between the other end surface of the holder 61 (right end surface of FIGS. 2 and 4) and the bottom surface of a concave hole 72 that is formed in part of the gear housing 22. A through hole 71 is formed in the pre-load pad 70 such that it passes through the center in the axial direction, such that the small-diameter section 68 of the worm shaft 29 can be freely inserted inside this through hole 71. The inner peripheral surface of this through hole 71 functions as a sliding bearing that supports the small-diameter section 68 of the worm shaft 29. Of this through hole 71, the inner peripheral surface of the half on the side of the electric motor 31 is a tapered surface 137 whose diameter increases toward the opening end. Moreover, the diameter of this opening of this tapered surface 137 is greater than the diameter of the small-diameter section 68 formed on the tip end of the worm shaft 29 by 0.5 mm or more.

Furthermore, a torsion coil spring 30 is located around the pre-load pad 70 and a pair of attachment sections 73 are located at two locations on radially opposite sides on both ends of this torsion coil spring 30 and are attached to or face with a clearance one side (upper side in FIGS. 2, 4 and 5) of a pair of protruding attachment sections 74 located at two locations on radially opposite sides on the other end surface of the holder 61 such that they protrude in the axial direction. Also, the tip ends of these protruding attachment sections 74 fit inside holes(not shown in the figures) that are formed in two locations on the bottom surface of the concave hole 72. The position of these protruding attachment sections 74 is regulated with a certain range with respect to the gear housing 22. By pressing the inner peripheral edge of the torsion coil spring 30 against the first partial cylindrical surface 140 on the side opposite from the worm wheel 28 (lower side in FIGS. 2, 4 and 5) in the outer peripheral surface of the pre-load pad 70, an elastic force is applied to the tip end of the worm shaft 29 by way of the pre-load pad 70 in the direction facing the worm wheel 28 (upward in FIGS. 2, 4 and 5). By applying this elastic force to the tip end, the distance between the center axes of the worm shaft 29 and the inner shaft 18 around which the worm wheel 28 is fastened is shortened. Moreover, a pre-load is applied to the toothed surfaces of the worm 27 of the worm shaft 29 and the worm wheel 28 which are brought in contact with each other.

In the case of this example, the area of contact between the outer peripheral surface of the pre-load pad 70 and the inner peripheral edge of the torsion coil spring 30 forms an arc shape, and the length of the arc direction of this area of contact is sufficiently small with respect to the length of one winding of the torsion coil spring 30. Also, of the outer peripheral surface of the pre-load pad 70, the radius of curvature of the second partial cylindrical surface 141 on the side of the worm wheel 28 (upper side in FIGS. 2, 4 and 5) is made smaller than the radius of curvature of the first partial cylindrical surface 140.

In the case of this example, one side (top side in FIG. 5) of the arm sections 139 located on the pre-load pad 70 faces the other side (bottom side in FIGS. 2, 4 and 5) of the protruding attachment sections 74 through a small gap. Furthermore, there is a protruding attachment section 142 on the end in the axial direction of the first partial cylindrical surface 140 that is formed around the outer peripheral surface of the pre-load pad 70, and it prevents the torsion coil spring 30 from separating from around the pre-load pad 70. In the case of this example, when the torsion coil spring 30 is located around the pre-load pad 70, there is a gap in the axial direction between the surfaces of the wires (between wires) of each winding of the torsion coil spring 30.

Furthermore, by applying the elastic force of the torsion coil spring 30 to the worm shaft 29, the amount that the torque on the inner shaft 18 increases due to the increase in friction force at the area of meshing between the worm shaft 29 and the worm wheel 28 is regulated at 0.4 Nm to 5 Nm. More particularly, when the increase in this torque is 0.4 Nm to 5 Nm, the elastic force is regulated by the size of F found by the following equation.

$$F = (TL_1 \sin.)/(.\cos. R. L_2) \tag{Eq. 1}$$

In this equation, the amount of increase in the torque of the inner shaft 18 is taken to be T, the pressure angle at the meshing section is taken to be, the friction coefficient is taken to be, the lead angle is taken to be, the radius of the pitch circle at the meshing section with the worm shaft 29 is taken to be R, the gear ratio at this meshing section is taken to be the distance in the axial direction between the meshing section and the third ball bearing 36 is taken to be $L_1$, and the distance in the axial direction between the third ball bearing 36 and the fourth ball bearing 37 is taken to be $L_2$. Moreover, in this embodiment, at the meshing section with the worm wheel 28, the pressing force on both due to the elastic force is taken to be 12.8 N to 160 N.

In this example, when driven at the rated output of the electric motor 31, the worm shaft 29 receives the reaction force from the worm wheel 28, so that at a location going away from this worm wheel 28, it meshes with the worm wheel 28. Also, when driven at the rated output of the electric motor 31, the angle between the rotating shaft 32 of the electric motor 31 and the worm shaft 29 becomes smaller than the angle between the rotating shaft 32 and worm shaft 29 when not driven by the electric motor 31 (output is 0). Furthermore, in this example, when driven at the rated output of the electric motor 31, the angle between the rotating shaft 32 and the worm shaft 29 is 0 minutes to 50 minutes, and more preferably, 0 minutes to 10 minutes.

Moreover, in this example, the center displacement between the rotating shaft 32 and worm shaft 29 due to the clearance in the radial direction in the spline joint 33 between the male spline section 51 on the tip end of the rotating shaft 32 and the female spline section 50 on the base end of the worm shaft 29 is taken to be 10 .m to 200 .m. Furthermore, the center displacement between the rotating shaft 32 and worm shaft 29 due to the clearance in the in-row section of the components of the casing 23 of the electric motor 31, and due to the clearance in the in-row section of the gear housing 22 and this casing 23 is less than the center displacement between the shafts 32, 29 due to the clearance in the radial direction in the spline joint 33.

As described above, the electric-powered power steering apparatus of this invention has an assist apparatus 16 that comprises a torque sensor 3, inner shaft 18 that is an assist shaft, worm wheel 28, worm shaft 29, torsion coil spring 30 and pre-load pad 70 that are members for applying an elastic force, and an electric motor 31. Therefore, in the case of the example described above, when the torsion coil spring 30 applies an elastic force on the worm shaft 29 in the direction toward the worm wheel 28, it is possible to apply a pre-load at the meshing section between the worm wheel 28 and worm shaft 29, and thus it is possible to prevent the noise of colliding teeth in this meshing section as well as to keep cost of the apparatus down.

Also, in the case of this example, the elastic force of the torsion coil spring 30 locating inside the gear housing 22 is applied to the tip end of the worm shaft 29 without going through the fourth ball bearing 37. Therefore, it is possible to make the internal space of the concave hole 72, where the torsion coil spring 30 is located, small. However, it is also considered possible to support the fourth ball bearing 37 around the outer peripheral surface on the tip end of the worm shaft 29, and place a coil spring between the gear housing 22 or the other members connected to the gear housing 22 and this fourth ball bearing 37 to apply an elastic force on the worm shaft 29 by the coil spring in the radial direction. However, in the case of that construction, the amount of protrusion of the coil spring from the outer peripheral surface of the worm shaft 29 is large, so that the gear housing 22 causes an increase in the size of the apparatus. In the case of this example, the elastic force from the torsion coil spring 30 is applied to the tip end of the worm shaft 29 without going through the fourth ball bearing 37, so the aforementioned problem does not occur.

Also, in the case of this example, the elastic force applied to the pre-load pad 70 by the torsion coil spring 30 is regulated within the range described above. Therefore, when the apparatus is not being driven by the electric motor 31, it is possible to maintain a pre-load and contact between teeth surfaces in the meshing section between the worm wheel 28 and worm shaft 29, and thus it is possible to effectively suppress the noise of colliding teeth, as well as keep the increase in torque from the electric motor 31 from becoming a problem. According to tests performed by the inventors, by regulating the elastic force within the aforementioned range, the noise from colliding teeth disappeared, and the increase in torque was sufficiently small. Also, in the case of this example, the length in the arc direction of the area of contact between the outer peripheral surface of the pre-load pad 70 and inner peripheral edge of the torsion coil spring 30 is made sufficiently small with respect to the length of one winding of the torsion coil spring 30. Therefore, it is possible to efficiently apply the elastic force from the torsion coil spring 30 on the pre-load pad 70 in the direction toward the worm wheel 28. Moreover, in this example, of the outer peripheral surface of the pre-load pad 70, the radius of curvature of the second partial cylindrical surface 141 on the worm wheel 28 side (the radius of this section) is smaller than the radius of curvature of the first partial cylindrical surface 140 on the opposite side from the worm wheel 28 (radius of this section). Therefore, even when the dimension errors in the torsion coil spring 30 become larger and the diameter of the torsion coil spring 30 increases due to displacement of the worm shaft 29, it is possible for the torsion coil spring 30 to have good contact with the first partial cylindrical surface 140 of the pre-load pad 70, and thus can apply a steady elastic force on the worm shaft 29.

The worm shaft 29 whose tip end is passed through the through hole 71 in the pre-load pad 70 moves in the radial direction of the fourth ball bearing 37 due to rotation of the rotating shaft 32 of the electric motor 31 and the worm wheel 28. When this movement causes the pre-load pad 70 to move and the torsion coil spring 30 around the pre-load pad 70 to twist, so there is a tendency for the friction between the pre-load pad 70 and the torsion coil spring 30 to increase. The amount that this friction increases differs according to the direction of movement of the pre-load pad 70. This increase in friction causes the elastic force applied to the worm shaft 29 by the torsion coil spring 30 to change improperly, which is not desirable. However, in this example, since the pre-load pad 70 is made of synthetic resin mixed with a solid lubricating material, it is possible to suppress this increase in friction, and thus it is possible to steadily apply the specified elastic force to the worm shaft 29. Also, when the surfaces of the wires of each wiring of the torsion coil spring 30 come in contact with each other in the axial direction, the friction that occurs at this area of contact also causes the elastic force applied to the worm shaft 29 by the torsion coil spring 30 to change improperly. However, in the case of this example, since there is a gap in the axial direction between the surfaces of the wires of each winding, it is possible to steadily apply the specified elastic force to the worm shaft 29.

As in the case of this example, in the case of the electric-powered power steering apparatus disclosed in International Disclosure 99/65758 Pamphlet as well, the elastic-force application member applies an elastic force on the worm shaft in the direction of the worm wheel. However, in the case of the construction disclosed in this 99/65758 Pamphlet, the rolling bearing that supports the tip end of the rotating shaft of the electric motor and the rolling bearing that supports the base end of the worm shaft are integrated into one rolling bearing. Therefore, in the case of the construction disclosed in this 99/65758 Pamphlet, even when the rotating shaft of the electric motor is not driven by the electric motor and is supported concentrically inside the electric motor casing, by having the worm shaft receive the reaction force from the worm wheel when driven by the electric motor, the worm shaft tilts with respect to the rolling bearing toward the direction away from the worm wheel. Also, because of this, it becomes easy for the rotating shaft as well to tilt with respect to the rolling bearing. When this happens, the distance between the rotor and stator in the middle section of the rotating shaft changes and it becomes difficult to obtain steady output from the electric motor.

However, in the case of this example, the first and second ball bearings 34, 35 support both ends of the rotating shaft 32 and the third and fourth ball bearings 36, 37 support both ends of the worm shaft 29, and each of the four bearings 34–37 is separate from the other. Therefore, in the case of this example, even when the worm shaft 29 tilts with respect to the third ball bearing 36 when driven by the electric motor 31, it is possible to prevent the rotating shaft 32 from tilting with respect to the third ball bearing 36, and thus it is possible to obtain steady output from the electric motor 31. Also, in the case of this example, since there is C2 or C3 sized clearance inside the third ball bearing 36, it is possible to easily maintain the angle clearance in the third ball bearing 36, and thus it is possible to easily cause the worm shaft 29 to tilt with respect to the third ball bearing 36.

Furthermore, in the case of this example, when driven by the rated output of the electric motor 31, the angle between the rotating shaft 32 of the electric motor 31 and the worm shaft 29 when the worn shaft 29 becomes away from the worn wheel 28 is smaller than the angle between the rotating shaft 32 and worm shaft 29 when not driven by the electric motor 31. Therefore, in the case of this example, when driven by the electric motor 31, it is possible to smoothly transmit the output from the electric motor 31 to the worm shaft 29, and thus it is possible to suppress the increase in friction in the spline joint 33 between the rotating shaft 32 and the worm shaft 29. Also, since it is possible to prevent the rotating shaft 32 from whirling, it is possible to obtain even more stable output from the electric motor 31 and to prevent the occurrence of vibration. Furthermore, in the case of this example, when driven by the electric motor 31 at the rated output, the angle between the shafts 32, 29 is sufficiently small at 0 minutes to 50 minutes (and more preferably 0 minutes to 10 minutes). Therefore, there is good fit between the male and female spline sections 50, 51 of the spline joint 33, so it is possible to even more smoothly transmit the output from the electric motor 31 to the worm shaft 29, and to effectively prevent whirling motion of the rotating shaft 32 of the electric motor 31.

Also, in the case of this example, the spline joint 33 is located at a location that coincides in the axial direction with the location of the third ball bearing 36. Therefore, even when the worm shaft 29 tilts with respect to the third ball bearing 36, it is possible to effectively prevent the portion of the rotating shaft 32 where the male spline section 51 is formed from moving in the radial direction, and thus it is possible to obtain even more steady output from the electric motor 31 and to prevent the occurrence of vibration.

Moreover, in the case of this example, the center displacement between the center axes of the worm shaft 29 and the rotating shaft 32 due to the existence of clearance in the radial direction in the spline joint 33 is kept within the range 10 .m to 200 .m. Therefore, it is prevented that tilting of the worm shaft 29 with respect to the third ball bearing 36 is hindered by interference by the female spline section 50 on the worm shaft 29 and the male spline section 51 on the rotating shaft 32, and thus it is possible to prevent the occurrence of the noise of colliding teeth in the spline joint 33 due to the tilting of the worm shaft 29.

Also, in the case of this example, by placing disc springs 56 in between the base end of the worm shaft 29 and the third ball bearing 36, displacement of the worm shaft 29 with respect to the third ball bearing 36 within a specified range in the axial direction is possible. Therefore, it is difficult for the worm shaft 29 to be effected by the lost motion of the third ball bearing 36 itself, and thus adequate tilting of the worm shaft 29 with respect to the third ball bearing 36 becomes easier.

Furthermore, in the case of this example, center displacement between the rotating shaft 32 and the worm shaft 29 due to the existence of gap in the in-row section between components of the casing 23 of the electric motor 31, and gap in the in-row section between the gear housing 22 and the casing 23, is less than the center displacement between the shafts 32, 29 due to the existence of gap in the radial direction in the spline joint 33. Therefore, when the shafts 32, 29 are off center, it is possible to install these shafts 32, 29 in the casing 23 and gear housing 22 without interfering with the male and female spline sections 50, 51, and thus it is possible to smoothly transmit torque to the worm shaft 29 from the rotating shaft 32. Also, it is possible to obtain steady output from the electric motor 31.

The elastic force applied to the worm shaft 29 by the torsion coil spring 30 can be regulated as follows. That is, in the electric-powered power steering apparatus, the torque detected by the inner shaft 18 or steering wheel 1 (detected torque) is found by rotating the inner shaft 18 against the friction force in the meshing section with the rack 12 and pinion 11 disconnected, and with the current flowing to the electric motor 31 stopped. Then, the elastic force is regulated such that the value of the torque (maximum torque increase) after the detected torque when the torsion coil spring 30 has not been installed has been subtracted from the detected torque when the torsion coil spring 30 is installed is 0.4 Nm to 5 Nm.

Also, when assembling the apparatus of this example, it is necessary to insert the tip end of the worm shaft 29 inside the through hole 71 in the pre-load pad 70 that is located inside the gear housing 22. However, by applying the elastic force from the torsion coil spring 30 to the pre-load pad 70 in the state before inserting the tip end into the through hole 71, the center axis of the through hole 71 is displaced to the side of the worm wheel 28 with respect to the center axis of the fourth ball bearing 37. Also, when the large-diameter section 63 on the section near the tip end of the worm shaft 29 is inserted inside the bushing 64 that is supported on the inside of the fourth ball bearing 37, and the small-diameter section 38 on the section near the tip end is inserted into the through hole 71, this small-diameter section 68 causes the pre-load pad 70 to move against the elastic force of the torsion coil spring 30 toward the side of the worm wheel 28. With the worm shaft 29 installed in the gear housing 22 in this way, the elastic force from the torsion coil spring 30 is applied to the small-diameter section 68 by way of the pre-load pad 70 in the direction toward the worm wheel 28. Therefore, in the case of this example, it is possible to apply the specified elastic force to the worm shaft 29 and to easily assemble the apparatus without having to perform troublesome work such as performing special adjustment or assembling an elastic member in order that the specified elastic force is applied after assembling the worm shaft 29 inside the gear housing 22. Also, in the case of this example, a tapered surface 137 is formed on the inner peripheral surface of the half on the electric motor 31 side of the through hole 71 in the pre-load pad 70 such that its diameter increases toward the opening end, and there is a tapered surface 143 that is formed in the connection section that connects the end surface of the worm shaft 29 and the small-diameter section 68. Therefore, in this example, it is possible to easily insert the small-diameter section 68 into the through hole 71, and to perform assembly more easily.

In order to suppress the noise of colliding teeth in the meshing section between the worm shaft 29 and worm wheel 28 by way of the torsion coil spring 30, it is necessary to apply an elastic force to the worm shaft 29 of a specified value or greater (for example 20 N or greater). Therefore, there is a tendency for the pre-load pad 70 to move a lot to the side of the worm wheel 28 in the state before the tip end of the worm shaft 29 has been inserted inside the through hole 71 in the pre-load pad 70 that is located inside the gear housing 22. However, as this displacement becomes excessively large (4 mm when the elastic force is taken to be 20 N or greater), the center axis of the through hole 71 is greatly shifted to the side of the worm wheel 28 with respect to the center axis of the worm shaft 29 when the worm shaft 29 is installed in the gear housing 22, and thus it becomes difficult to insert the tip end of the worm shaft 29 into the through hole 71. However, in the case of this example, there are a pair of arm sections 139 in part of the pre-load pad 70 and these arms sections 139 face protruding attachment sections 74 that are formed in the holder 61. Therefore, regardless of whether the elastic force is a specified value or greater, it is possible to prevent the through hole 71 from moving excessively toward the side of the worm wheel 28 before inserting the tip end of the worm shaft 28 into the through hole 71 in the pre-load pad 70, and to perform assembly easily. For example, by using the pair of arm sections 139, it is possible to keep the displacement of the pre-load pad 70 in the direction toward the side of the worm wheel 28 small, or about 0.5 mm.

Also, in the case of this example, the pinion 11 directly meshes with the rack 12, however, the invention is not limited to this kind of construction. For example, it is possible to provide a construction using so-called variable speed gear ratio steering mechanism (VGS) in which the lower end of the pinion 11 is fitted into a long hole in a pinion gear that is separate from the pinion 11 such that it can move freely in the lengthwise direction of this long hole, and where this pinion gear meshes with the rack and changes the ratio of the amount of displacement of the rack with respect to the rotation angle of the steering shaft according to the speed of the automobile, so as to provide a combination of this construction with the construction of this example.

Figure 6:
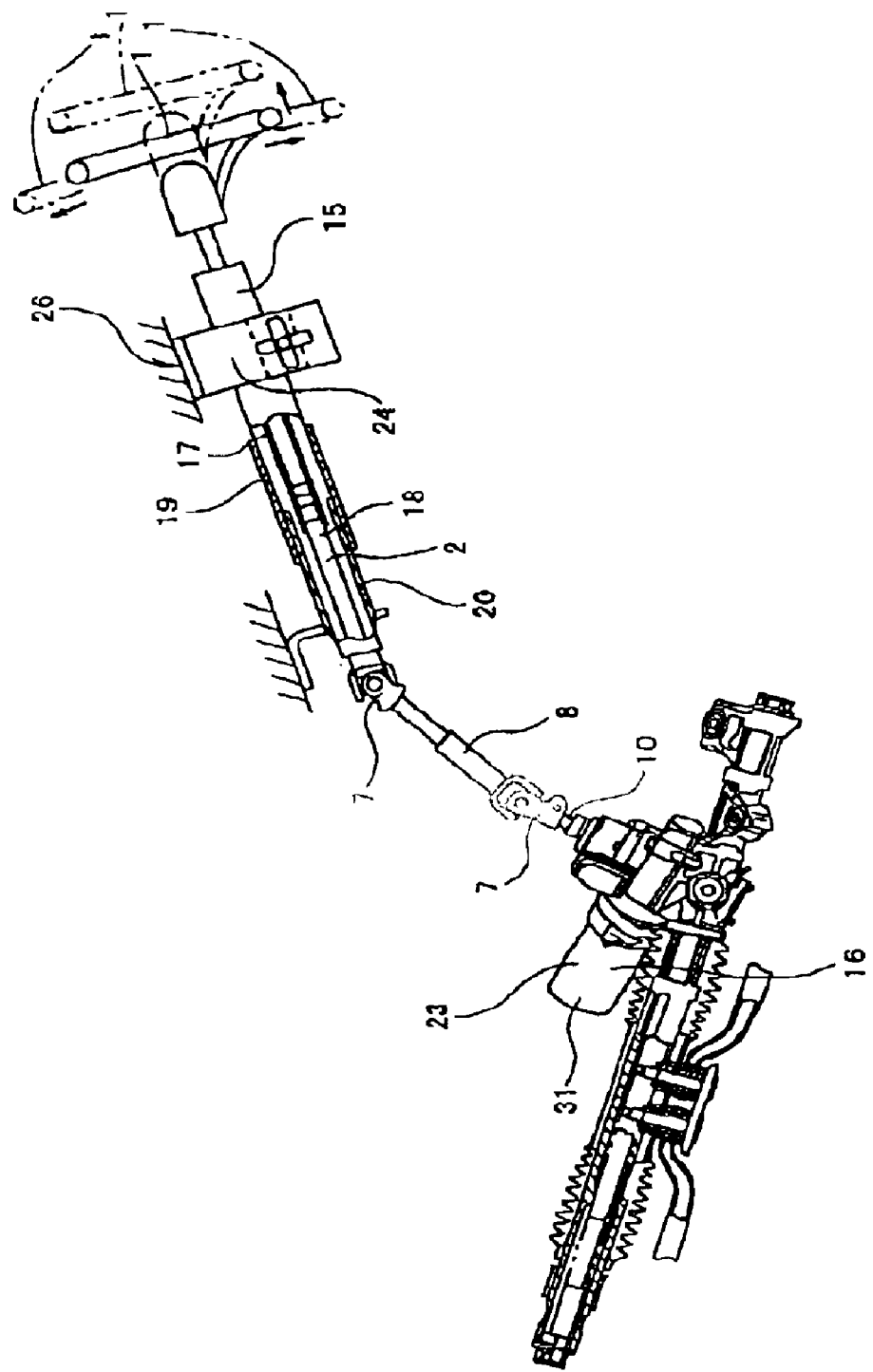
FIG. 6 is a view to show an example of the construction where the assist apparatus is provided in the peripheral portion of the pinion.
Figure 7:
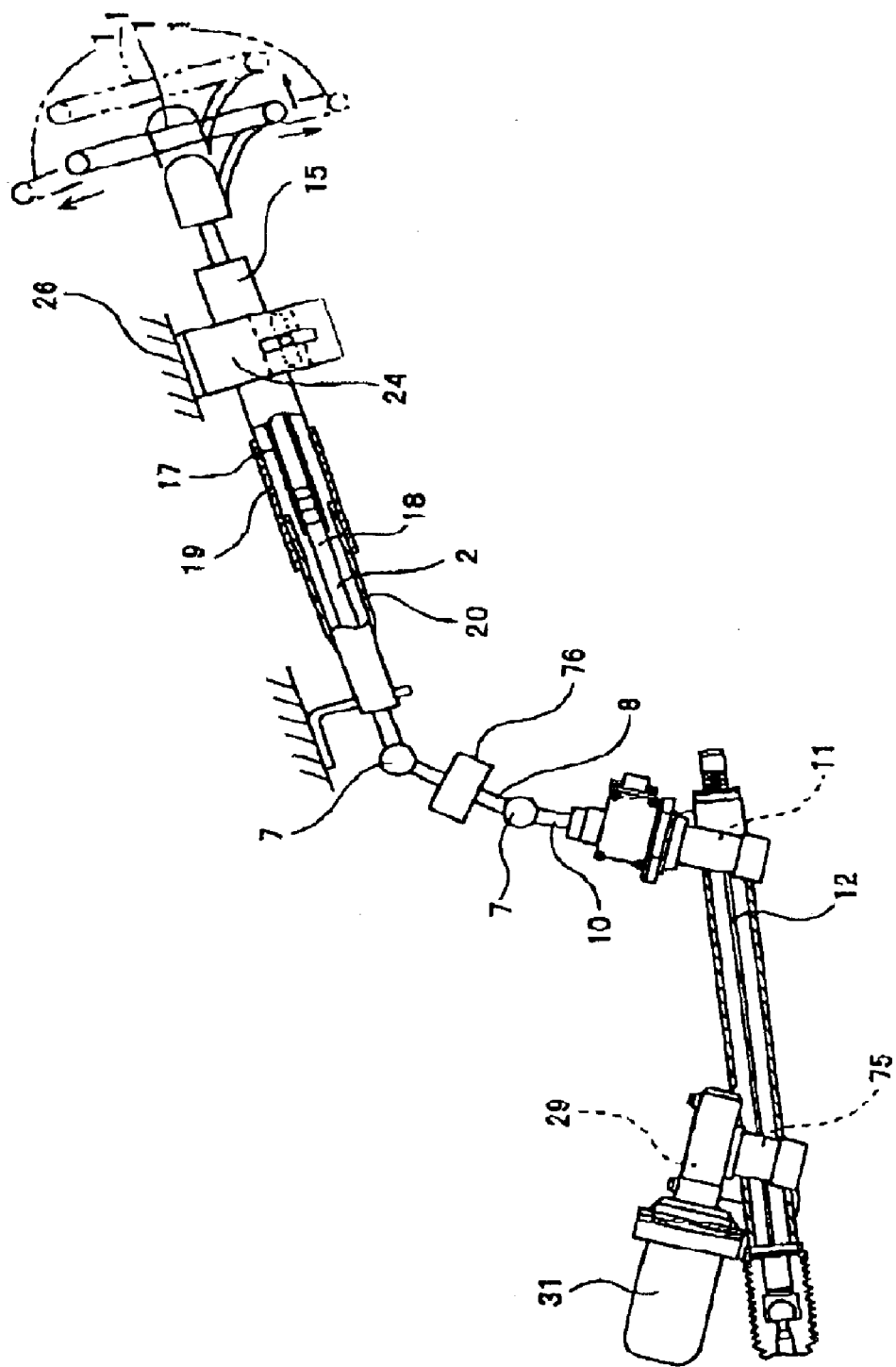
FIG. 7 is a view to show an example of the construction where the assist apparatus is provided in the peripheral portion of the subpinion.

Moreover, this invention is not limited to construction where the assist shaft of the assist apparatus is part of the steering shaft 2. For example, as shown in FIG. 6, it is possible to make the pinion 11 (see FIG. 40) that meshes with the rack 12 function as the assist shaft and to place the electric motor 31 near this pinion 11. In the case of the construction shown in FIG. 6, the torque sensor (see FIG. 40) can be located near the pinion 11 instead of near the steering shaft 2. Also, as shown in FIG. 7, it is possible to have the sub-pinion 75 that meshes with part of the rack 12 at a location separated from the joint with the pinion 11 function as the assist shaft. In the case of the construction shown in FIG. 7, the worm wheel that is attached to the sub-pinion 75 meshes with the worm shaft 29. Also, the electric motor 31 is located near this sub-pinion 75. Also, in the case of the construction shown in FIG. 7, it is possible to locate the torque sensor 3 near the pinion 11. In the case of the construction shown in FIG. 7, a shock absorbing apparatus 76 is placed in the middle of the intermediate shaft 8 in order to prevent the vibration that is transmitted from the ground to the pinion 11 by way of the wheel from being transmitted to the steering wheel 1. For example, this shock absorbing apparatus 76 can be constructed by combining the inner shaft and outer shaft into a telescope shape and connecting elastic material between the peripheral surfaces on the ends of these shafts.

Figure 8:
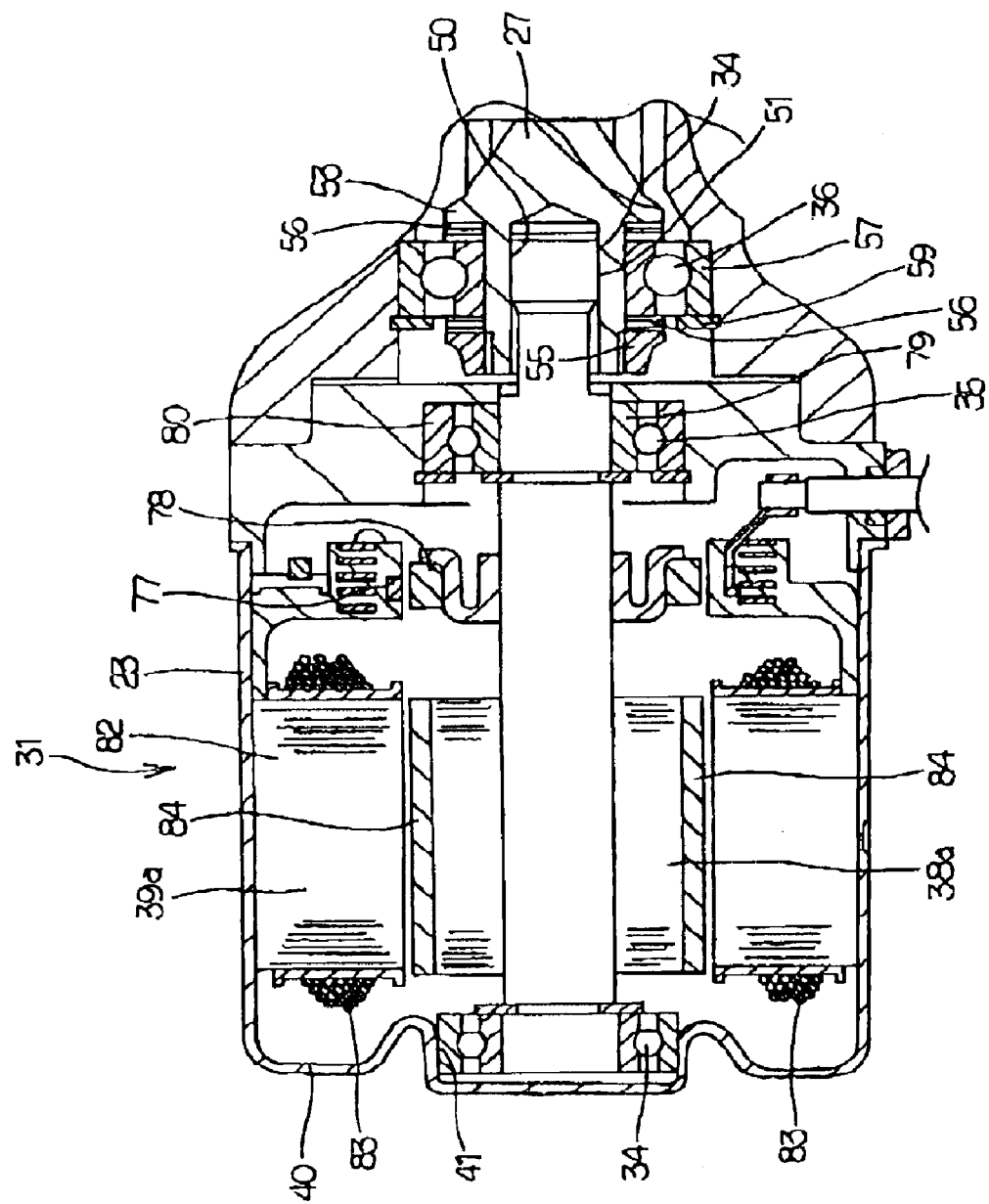
FIG. 8 is a view similar to FIG. 3 to show an example of the electric motor having a brushless structure.

Also, in the case of this example, the rotor-phase detector that switches the direction of the excitation current that is sent to the coil 45 of the electric motor 31 comprises a brush 48 and a commutator 46. However, this invention is not limited to this kind of construction, and as shown in FIG. 8, the electric motor 31 can have so-called brushless construction in which the rotor-phase detector comprises a permanent magnet encoder 78 that is fastened to the rotating shaft 32, and a Hall IC 77. Also, in the case of the construction shown in FIG. 8, the stator 39$a$ comprises a laminated steel plate core 82 that is fastened to the inner peripheral surface of the casing 23 and coils 83 that are wound at a plurality of locations on the core 82; and the rotor 38$a$ comprises permanent magnets 84 that are fastened around the outer peripheral surface in the middle section of the rotating shaft 32. Moreover, when adopting this kind of construction, by using a vector controller that controls the increase or decrease in the size of the current sent to the stator 39$a$, it is possible to change the magnetic force of the stator 39$a$.

Moreover, in the case of this example, the sum $_{-1}$ of the clearances in the radial direction on the inside of the second ball bearing 35, in the fitting between the inner race 79 of this second ball bearing 35 and rotating shaft 32, and in the fitting between the outer race 80 of this second ball bearing 35 and the inner peripheral surface of the casing 23 is less than the sum $_{-2}$ of the clearances in the radial direction on the inside the third ball bearing 36, in the fitting between the outer race 57 of this third ball bearing 36 and the gear housing 22, in the fitting between the inner race 56 of this third ball bearing 36 and the worm shaft 29, and in the fitting section 33 ($._{-1} < ._{-2}$). In the case of regulating the clearances in this way, it is possible to obtain steady output from the electric motor 31 regardless of tilting of the worm shaft 29, and it is possible to suppress vibration of the electric motor 31. Also, in the case where there are a plurality of joints in the connecting section that connects the tip end section of the rotating shaft 32 and the base end of the worm shaft 29, the sum $_{-1}$ of the clearances described above is less than the sum $_{-3}$ of the clearances that exists in the radial direction of these joints, inside the third ball bearing 36, in the fitting between the outer race 57 of this third ball bearing 36 and the gear housing 22, and in the fitting between the inner race 56 of this third ball bearing 36 and the worm shaft 29 ($._{-1} < ._{-3}$).

Also, without regulating the relationship of the clearances inside the second and third ball bearings 35, 36, and in each of the fitting sections, instead it is possible to regulate the relationship of the following displacement amounts $x_1$ to $x_3$. That is, when a 20 N force is applied in the radial direction to the portion of the rotating shaft 32 that coincides in the axial direction with the second ball bearing 35, the amount of displacement in the radial direction of the center axis of the rotating shaft 32 where the force acts is taken to be displacement $x_1$; and when a 20 N force is applied in the radial direction to the portion of the worm shaft 29 that coincides in the axial direction with the third ball bearing 36, the amount of displacement in the radial direction of the center axis of the worm shaft 29 where the force acts is taken to be displacement $x_2$; and when a 20 N force is applied in the radial direction to the spline joint 33 on part of the rotating shaft 32, the amount of displacement in the radial direction of spline joint 33 on the center line of the rotating shaft 32 with respect to the center axis of the worm shaft 29 is taken to be displacement $x_3$. In this case, the relationship is regulated such that $x_1 < (x_2 + x_3)$. In the case of regulating the amounts of displacement $x_1$ to $x_3$ in this way, it is also possible to obtain steady output from the electric motor 31 and to suppress vibration of the electric motor 31 even when there is tilting of the worm shaft 29. Also, more preferably, in the case when a 20 N force is applied in the radial direction to the portion of the worm shaft 29 that coincides in the axial direction with the second ball bearing 35, the amount of displacement in the radial direction of the center axis of the worm shaft 29 where the force acts is regulated within the range 5 .m to 200 .m. In the case of this kind of regulation, it is possible to easily prevent the vibration that is applied from the worm wheel 28 to the worm shaft 29 from being transmitted to the rotating shaft 32 of the electric motor 31.

Moreover, more preferably, when driven by the electric motor 31, the force that the second ball bearing 35 receives from the rotating shaft 32 due to the force acting on the area where the worm wheel 28 meshes with the worm shaft 29 is less than the force that the third ball bearing 36 receives from the worm shaft 29 due to force acting on this area of meshing. In the case of this example, the position of the center in the axial direction of the spline joint 33 between the worm shaft 29 and rotating shaft 32 nearly coincides with the position of the center in the axial direction of the third ball bearing 36. On the other hand, it is possible to shift the position of the center in the axial direction of the spline joint 33 from the position of the center in the axial direction of the third ball bearing 36. However, even in this case, in order to be able to obtain steady output from the electric motor 31 even when there is tilting of the worm shaft 29, it is preferred that the position of the center in the axial direction of the spline joint 33 be located further toward the side of the third ball bearing 36 than the position of the center in the axial direction between the second ball bearing 35 and third ball bearing 36.

Moreover, in the case of this example, the torsion coil spring 30 and pre-load pad 70 of an elastic-force application means are located between the gear housing 22 and tip end of the worm shaft 29. However, the elastic-force application means is not limited to a torsion coil spring 30 and pre-load pad 70 that are located in this way. For example, the elastic-force application can be located at least between the outer race 60 of the fourth ball bearing 37 and the gear housing 22, between the inner race 65 of the fourth ball bearing 37 and the worm shaft 29, or between the gear housing 22 and the worm shaft 29, so as to apply an elastic force in the radial direction corresponding to the displacement in the radial direction of the worm shaft 29.

As to the opposite ends of the worm shaft 29, the fourth bearing for supporting the end of the worm shaft 29 on the opposite side of the rotating shaft 32 inside the gear housing 22 can be a bearing other than the fourth ball bearing 37 described above. For example, this fourth bearing is not limited to a ball bearing but could be another kind of rolling bearing such as a cylindrical roller bearing or a sliding bearing, as long as it supports the portion near the tip end of the worm shaft 29 such that it can rotate freely inside the gear housing 22, and allows displacement within a specified range in the radial direction of the worm shaft 29, and furthermore has a clearance in the radial direction in at least the fitting section between the outer race of this fourth bearing and the gear housing or the fitting section between the inner race of the fourth bearing and the worm shaft.

As to the opposite ends of the worm shaft 29, the third bearing that supports the end of the worm shaft 29 on the side of the rotating shaft 32 inside the gear housing 22 can also be a bearing other than the third ball bearing 36 as long as it is capable of supporting the end of the worm shaft 29 such that it can freely tilt with respect to this third bearing.

Moreover, the second bearing for supporting the section of the rotating shaft 32 between the spline joint 33 of the connecting section and the rotor 38 of the electric motor 31 within the casing 23 can also be a bearing other than the second ball bearing 35 as long as it is capable of preventing the rotating shaft 32 from tilting even though the worm shaft 29 tilts with respect to the third bearing. Also the tip end of the rotating shaft 32 and base end of the worm shaft 29 are not limited to being connected by meshing of teeth such as in a spline joint 33 or a serration joint, but this tip end and base end can be connect by way of an elastic material.

Figure 9:
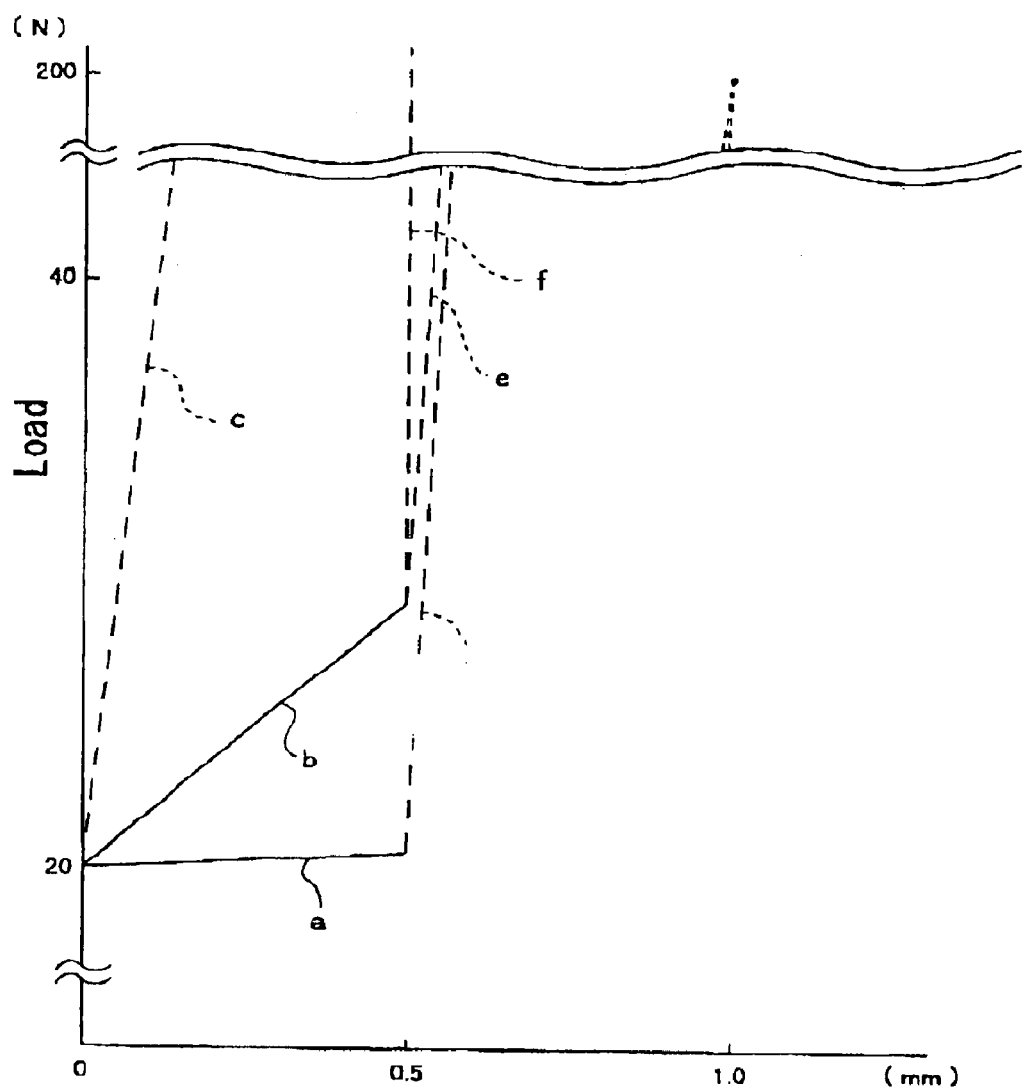
FIG. 9 is a diagram to show various spring constants.

Also, the elastic-force application means can also comprise an elastic material that has a spring constant that can be changed between to values according to displacement in the radial direction of the worm 29; for example a low spring constant of 1 N/mm to 20 N/mm, and a high spring constant of 180 N/mm or greater (for example 360 n/mm). For example, it is possible to use the types shown in FIG. 9 as the spring constants. The horizontal axis in FIG. 9 represents the amount of displacement of the worm shaft 29 in the radial direction with respect to the worm wheel 28 at the area where the worm shaft 29 and worm wheel 28 mesh together and when not driven by the electric motor 31, and the vertical axis represents the load. Also, the solid lines a, b show a low spring constant, and the dashed lines, c to f, show a high spring constant. The spring constants for the solid lines a, b are 1 N/mm and 20 N/mm, respectively. Also, of the dashed lines c to f, the dashed line c indicates the spring constant for when the worm shaft 29 meshes with the teeth on the inner diameter side of the worm wheel 28, and is 180 N/mm. The dashed line d indicates the spring constants when the worm shaft 29 meshes with the teeth on the outer diameter side of the worm wheel 28, and is 360 N/m. The dashed lines e, f coincide with a low spring constant of 20 N/mm at the displacement of 0.5 mm, and are 340 N/mm and an infinite spring constant, respectively.

In the case of using this kind of elastic-force application means that has a spring constant that can be changed between two values, it is possible to apply a pre-load and bring the teeth of the worm shaft 29 in contact with those of the worm wheel 28 by an elastic force with the low spring constant when the rotating shaft 32 is not being driven by the electric motor 31. Also, when driven at maximum output of the electric motor 31, the worm shaft 29 is moved in the direction going away from the worm wheel 28 by the reaction force applied from the worm wheel 28 to worm shaft 29, so that the elastic force with the high spring constant is balanced the reaction force and that at this location, the worm shaft 29 meshes with the worm wheel 28. In this case, it is preferable that the position of the meshing area when driven at the maximum output of the electric motor 31 be displaced 0.1 mm to 1.0 mm in the radial direction of the worm shaft 29 with respect to the position of the meshing area when not driven by the electric motor 31.

In the case of using an elastic material having a spring constant that can change in this way between at least two levels, it is possible to bring the worm shaft 29 and worm wheel 28 into a proper position where they mesh together when being driven by the electric motor 31, so it is possible for both of these members 29, 28 to mesh together well while having a suitable amount of backlash. Therefore, it is possible to keep the torque loss due to friction in the meshing area small. In the case of using an elastic material having a spring constant that changes between two values in this way, it is also possible to use a controller that controls the size of the output of the electric motor 31 corresponding to the amount of displacement in the radial direction of the worm shaft 29.

Next, the results of tests performed by the inventors of the invention for checking the result obtained when regulating the amount of increase of the torque of the inner shaft 18 due to an increase in friction force to 0.4 Nm to 5 Nm in the meshing area when the elastic force having a low spring constant is applied to the worm shaft 29, will be explained. In the tests, five identical electric-powered power steering apparatuses (No. 1 to 5) were used, and the noise of colliding teeth and the responsiveness of the electric motor 31 were measured. The results of the tests performed in this way are shown in Tables 1-1 and 1-2.

TABLE 1-1 colliding teeth noise

| | | No. 1 | No. 2 | No. 3 | No. 4 | No. 5 |
|---|---|---|---|---|---|---|
| amount of torque increase (Nm) | 0.2 | . | x | x | x | x |
| | 0.3 | . | . | . | . | x |
| | 0.4 | . | . | . | . | . |
| | 0.5 | . | . | . | . | . |
| | 1.0 | . | . | . | . | . |
| | 2.0 | . | . | . | . | . |
| | 3.0 | . | . | . | . | . |
| | 4.0 | . | . | . | . | . |
| | 5.0 | . | . | . | . | . |
| | 5.3 | . | . | . | . | . |
| | 5.7 | . | . | . | . | . |
| | 6.0 | . | . | . | . | . |
| | 6.5 | . | . | . | . | . |

TABLE 1-2 electric motor responsiveness judgement

| | | No. 1 | No. 2 | No. 3 | No. 4 | No. 5 |
|---|---|---|---|---|---|---|
| amount of torque increase (Nm) | 0.2 | . | . | . | . | x |
| | 0.3 | . | . | . | . | x |
| | 0.4 | . | . | . | . | . |
| | 0.5 | . | . | . | . | . |
| | 1.0 | . | . | . | . | . |
| | 2.0 | . | . | . | . | . |
| | 3.0 | . | . | . | . | . |
| | 4.0 | . | . | . | . | . |
| | 5.0 | . | . | . | . | . |
| | 5.3 | . | . | . | . | x |
| | 5.7 | x | . | . | . | x |

TABLE 1-2-continued electric motor responsiveness judgement

| | No. 1 | No. 2 | No. 3 | No. 4 | No. 5 |
|---|---|---|---|---|---|
| 6.0 | x | . | x | x | . | x |
| 6.5 | x | x | x | x | . | x |

In table 1. the mark  indicates that the noise of colliding teeth could be made sufficiently small, or that the responsiveness of the electric motor 31 was good, and the . mark indicates that the noise of colliding teeth was somewhat large, or that the responsiveness of the electric motor 31 was somewhat poor, and the x mark indicates that the noise of colliding teeth is very annoying, or that the responsiveness of the electric motor 31 is poor. As can be clearing seen from the test results shown in Table 1, when the amount of increase in torque is 0.4 Nm or less, the noise of colliding teeth became large. On the other hand, when the amount of increase in torque exceeded 5.0 Nm, the responsiveness of the electric motor 31 became poor. However, when the amount of increase in torque was within the range 0.4 Nm to 5.0 Nm, the noise of colliding teeth was made small and the responsiveness of the electric motor 31 was good. From these test results, the effect obtained by regulating the amount of increase in torque could be confirmed.

Figure 10:
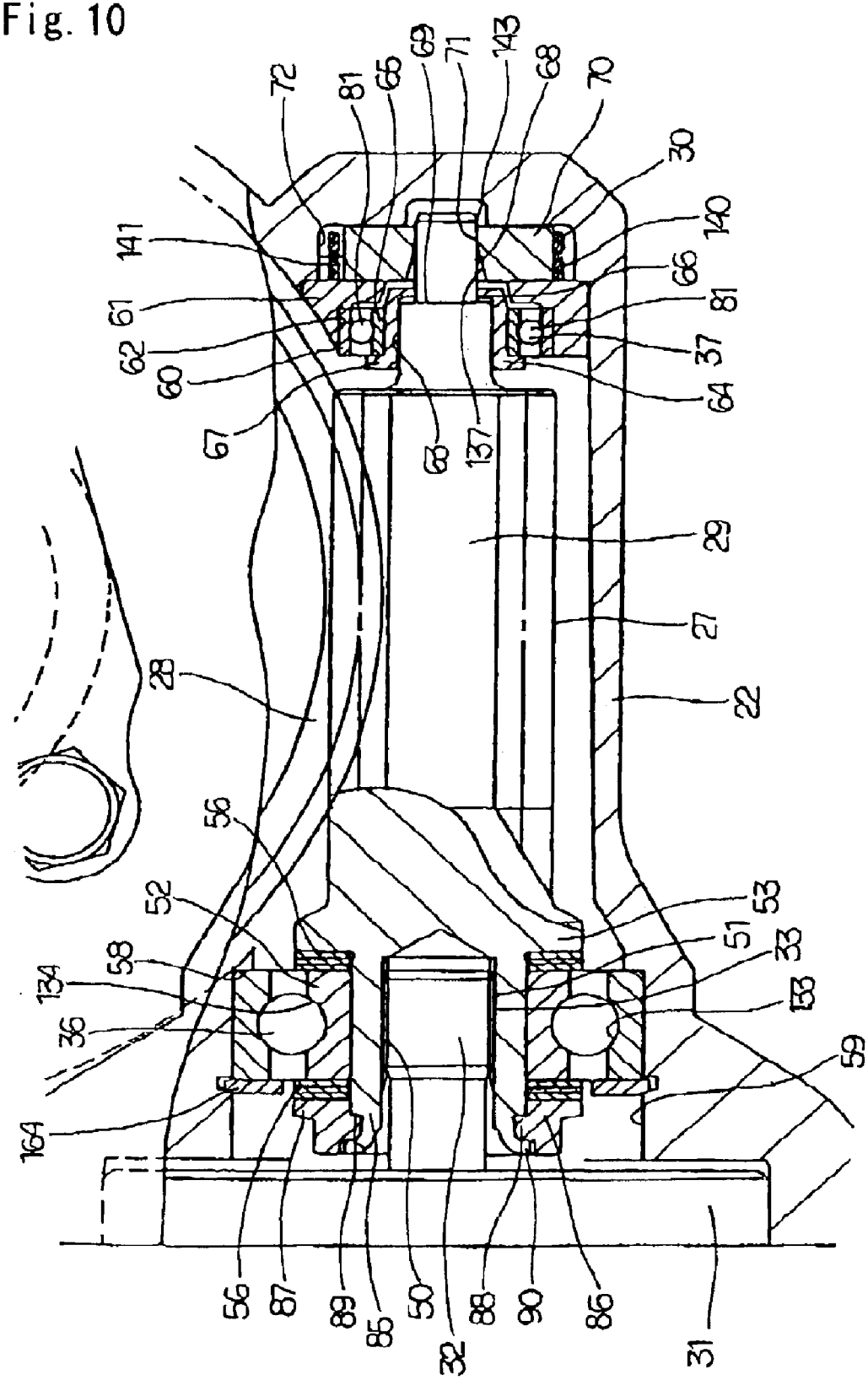
FIG. 10 is a view similar to FIG. 4 to show a second example of the embodiment of the present invention.

Next, a second example of the embodiment of the invention is shown in FIG. 10. This example differs from the first example described above in that the outer peripheral surface of the base end (left end in FIG. 10) of the worm shaft 29 is a stepped cylindrical surface on which the male screw section 54 (See FIGS. 2 and 4) is not formed. This cylindrical surface is formed around the outer peripheral surface of the cylindrical section 85 and, a support member 86 fits onto a portion near the base end of this cylindrical section 85. This support member 86 has a generally cylindrical shape, and has an outward facing flange section 87 formed around the outer peripheral surface on the base end. Also, an inward facing flange section 88 that protrudes radially inward is formed all the way around the inner peripheral surface in the middle section of this support member 86. Also, a crimped section 90 is formed by spreading the base end of this cylindrical section 85 outward in the radial direction through spinning crimping etc. when the support member 86 fits around the cylindrical surface such that the surface on one end (right end surface in FIG. 10) of the inward facing flange section 88 of the support member 86 comes in contact with the surface of the stepped section 89 that is formed around the middle section of the cylindrical surface. This crimped section 90 connects and fastens the support member 86 to the cylindrical section 85 by supporting the surface on the other end (left end in FIG. 10) of the inward facing flange section 88 of the support member 86.

The other construction and functions of this example are substantially the same as in the first example, so the same reference numbers are given to identical parts, and any redundant explanation is omitted.

Figure 11:
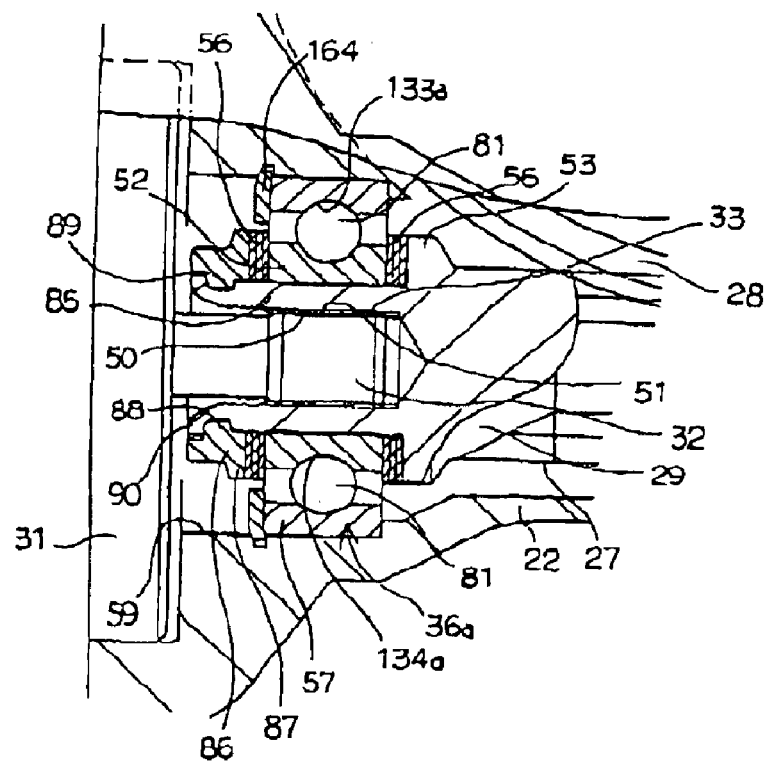
FIG. 11 is a view to show a third example of the embodiment of the present invention corresponding to Portion C of FIG. 2.

Next, FIG. 11 shows a third example of the embodiment of the invention. In the case of this example, in the construction of the second example shown in FIG. 10, the third ball bearing 36a that supports the base end of the worm shaft 29 on the side of the electric motor 31 is a 4-point contact type bearing. In other words, the outer-ring raceway 133a formed around the inner peripheral surface of the outer race 57 of the third ball bearing 36a, and the inner-ring raceway 134a formed around the outer peripheral surface of the inner race 52 have a so-called gothic arch shape in cross-section that is formed by connecting a pair of arcs having a radius of curvature that is greater than the radius of curvature of the rolling contact surfaces of the balls 81. Also, the rolling contact surfaces of the balls 81 come in contact with the both the outer-ring raceway 133a and inner-ring raceway 134a at two points each on each ball 81.

In the case of this example, since the third ball bearing 36a is of a 4-point contact type, it is possible to increase the rigidity in the axial direction of this third ball bearing 36a. Therefore, it is possible to suppress vibration in this third ball bearing 36a, thus to prevent the occurrence of abnormal vibrations.

The other construction and functions of this example are substantially the same as in the second example shown in FIG. 10, so the same reference numbers are given to identical parts, and any redundant explanation is omitted.

Figure 12:
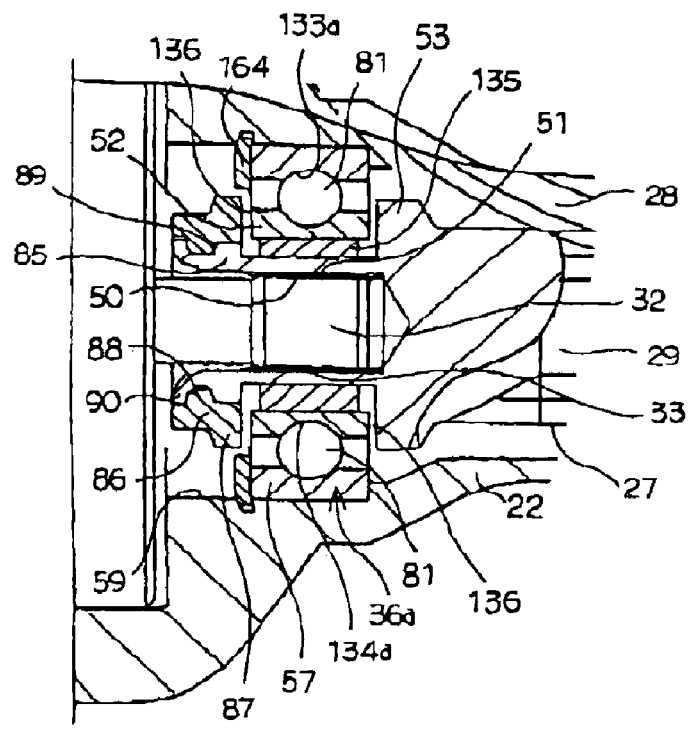
FIG. 12 is a view similar to FIG. 11 to show a fourth example of the embodiment of the present invention.

Next, FIG. 12 shows a fourth example of the embodiment of the invention. In the case of this example, in the construction of the third example shown in FIG. 11, a cylindrical member 135 made of an elastic member such as an elastomer like rubber is elastically held between the inner peripheral surface of the inner race 52 of the third ball bearing 36a, and the outer peripheral surface on the end section of the worm shaft 29. Also, this example differs from the other examples described above in that the disc springs 56 (see FIGS. 2 and 4) are not provided between the surfaces on both ends in the axial direction of the inner race 52 of the third ball bearing 36a and one surface (the left side surface of FIG. 12) of the flange section 53 that is formed around the outer peripheral surface of the part near the base end of the worm shaft 29 and the surface on the inside end of the support member 86 (the right side surface in FIG. 12) and there are gaps 136 in the axial direction between these members 52, 53, 86.

Similar to the examples described above, in the case of this example as well, it is easy to have the worm shaft 29 within a specified range tilt with respect to the third ball bearing 36a.

The other construction and functions of this example are substantially the same as in the third example shown in FIG. 11, so the same reference numbers are given to identical parts, and any redundant explanation is omitted.

Different from the case of the third and fourth examples shown in FIGS. 11 and 12, the third ball bearing 36a can be of a typical deep-groove type as in the first example shown in FIGS. 1 to 5, and the fourth ball bearing 37 (see FIGS. 2 and 4) for supporting the tip end of the worm shaft 29 on the side opposite that of the electric motor 31 can be of a four-point contact type, or both the third ball bearing 36a and fourth ball bearing 37 can be of the four-point contact type.

Figure 13:
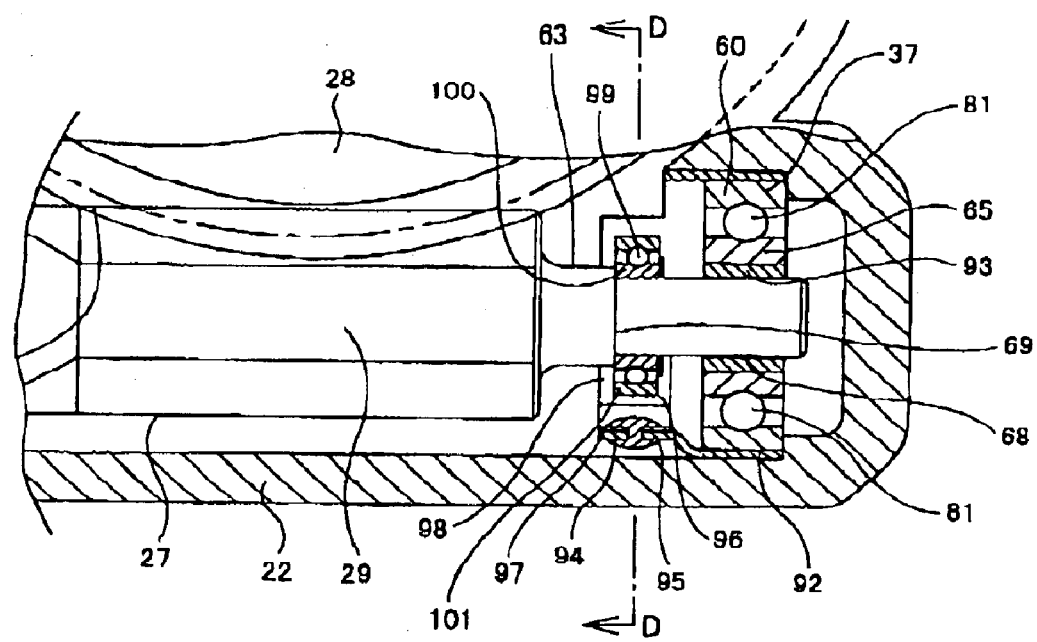
FIG. 13 is a view to show a fifth example of the embodiment of the present invention corresponding to the right half of FIG. 4.
Figure 14:
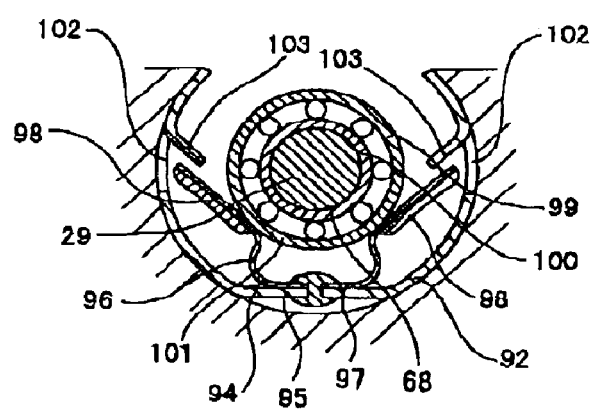
FIG. 14 is a cross sectional view taken along the line D—D in FIG. 13.

Next, FIGS. 13 and 14 show a fifth example of the embodiment of the invention. In this example of the invention, the outer race 60 of the fourth ball bearing 37 fits around the inner peripheral surface of half (right half in FIG. 13) of a cylindrical holder 92 that is fastened to part of the inside of the gear housing 22. Also, the portion near the tip end of the small-diameter section 68 formed on the tip end of the worm shaft 29 fits into the inner peripheral surface of the cylindrical sleeve 93 fastened on the inner-diameter side of the inner race 65 of the fourth ball bearing 37 with a gap between the portion and inner peripheral surface. Also, a semi-cylindrical retainer 94 having a non-continuous section on the side of the worm wheel 28 is located on the other half (left half in FIG. 13) of the holder 92. The middle section of a plate spring 96, which acts as the elastic-force application means, is attached to the inner surface of a flat place section 95, that is part of this retainer 94, located on the opposite side from the worm wheel 28. This plate spring 96 has a base section 97 in the middle for connecting to the flat plate 95, and a pair of support sections 98 on both end sections that form a V-like shape cross section that opens up to the side of worm wheel 28. This plate spring 96 has an elastic force in the direction that decreases the space between the tip ends of the support sections 98. Moreover, the inner race 100 of a fifth ball bearing 99 is fastened around the base end section of the small-diameter section 68 of the worm shaft 29, and one surface of the support sections 98 at its base end is elastically pressed against two locations on the outer peripheral surface of the outer race 101 of the fifth ball bearing 99.

Also, on part of the retainer 94 there are some C-shaped or U-shaped notches 102 formed at two locations that face the tip ends of the support sections 98, and a pair of fitting sections 103 are formed by curving the inside of these notches 102 toward the fifth ball bearing 99. One of the surfaces (top surfaces in FIG. 14) of the support sections 98 of the plate spring 96 at its tip end face one of the surfaces (lower surfaces in FIG. 14) of the fitting sections 103 at its base end through a gap therebetween.

Before inserting the tip end of the worm shaft 29 into the fourth ball bearing 37, the space between the tip ends of the support sections 98 is decreased from that shown in FIG. 14. Also, when these tip ends are in contact with the fitting sections 103, the position of the support sections 98 is regulated. In this state, when the tip end of the worm shaft 29, whose small-diameter section is supported by the fifth ball bearing 99, is inserted into the fourth ball bearing 37, the space between the tip ends of the support sections 98 is elastically spread open by the outer race 101 of the fifth ball bearing 99. Moreover, when the tip end of the worm shaft 29 has been inserted into the fourth ball bearing 37, an elastic force in the direction toward the worm wheel 28 is applied to the worm shaft 29.

As in the case of the examples described above, in the case of this example as well, it is possible to suppress the occurrence of the noise of colliding teeth in the area where the worm wheel 28 meshes with the worm shaft 29. Also, in this example as well, when a specified elastic force is applied to the worm shaft 29 in the direction toward the worm wheel 28, it becomes easy to perform the work of installing the worm shaft 29 inside the gear housing 22.

The other construction and functions of this example are substantially the same as in the first example shown in FIGS. 1 to 5, so the same reference numbers are given to identical parts, and any redundant explanation is omitted.

Figure 15:
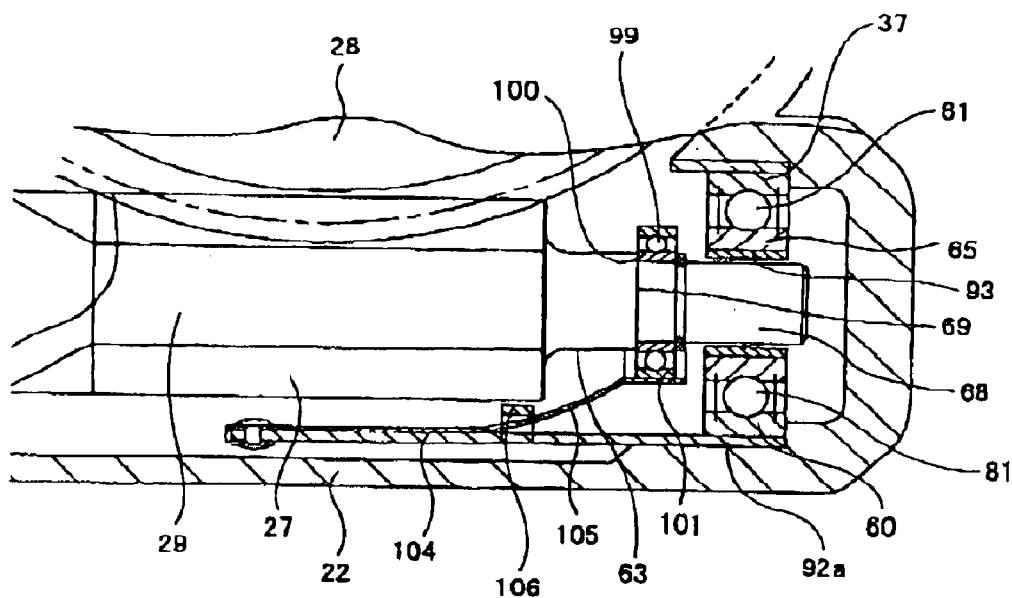
FIG. 15 is a view similar to FIG. 13 to show a sixth example of the embodiment of the present invention.

Next, FIG. 15 shows a sixth example of the embodiment of the invention. In this example, a long protruding fitting plate 104 that protrudes in the lengthwise direction of the worm shaft 29 is formed on part of the circumference on one end surface (left end surface in FIG. 15) of the holder 92a that is formed in a cylindrical shape. To the tip end of this fitting section 104, the base end (left end in FIG. 15) of a plate spring 105 that has an arc shaped cross section is fastened. This plate spring 105 has an elastic force that acts in a direction to move the tip end (right end in FIG. 15) toward the worm wheel 28. The tip end of this plate spring 105 presses a place on the circumference of the outer peripheral surface of the outer race 101 of the fifth ball bearing 99 to apply an elastic force to the tip end of the worm shaft 29 toward the worm wheel 28. Also, in the case of this example, there is a limiting section 106 in the middle section in the lengthwise direction of the fitting plate 104, and this limiting section 106 regulates the displacement of the middle section in the lengthwise direction of the plate spring 105 toward the worm wheel 28.

In the case of the example described above, when a specified elastic force is applied to the worm shaft 29 in the direction to the worm wheel 28, it becomes easy to perform the work of assembling the worm shaft 29 inside the gear housing 22. Also, in the case of this example, it is possible to sufficiently increase the dimension of the plate spring 105 in the lengthwise direction of the worm shaft 29, so it is possible to decrease the spring constant of this plate spring 105 and thus it is possible to apply a stable elastic force to the worm shaft 29.

The other construction and functions of this example are substantially the same as in the fifth example shown in FIGS. 13 and 14, so the same reference numbers are given to identical parts, and any redundant explanation is omitted.

Figure 16:
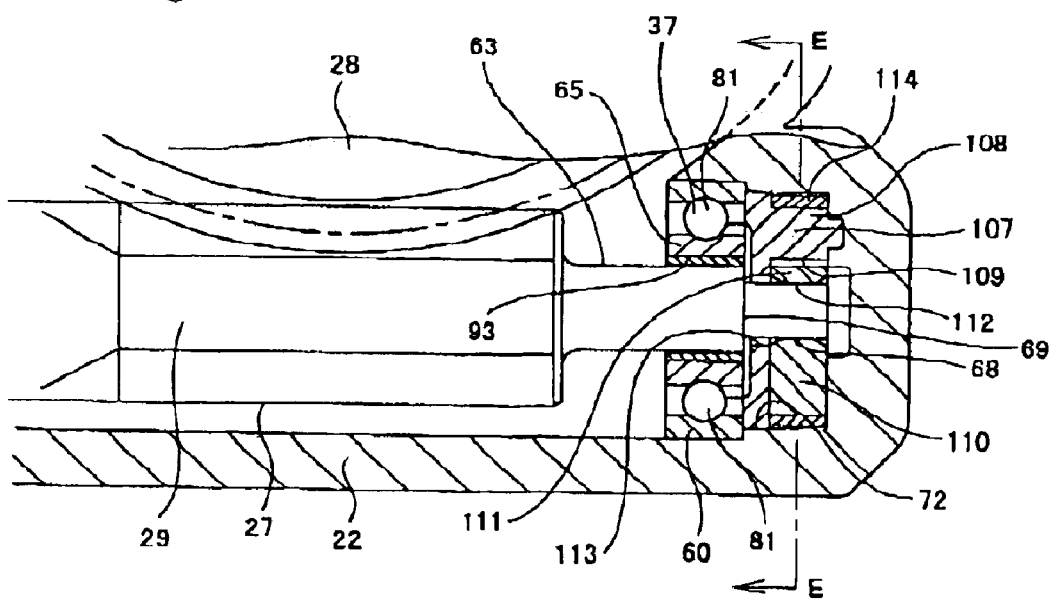
FIG. 16 is a view similar to FIG. 13 to show a seventh example of the embodiment of the present invention.
Figure 17:
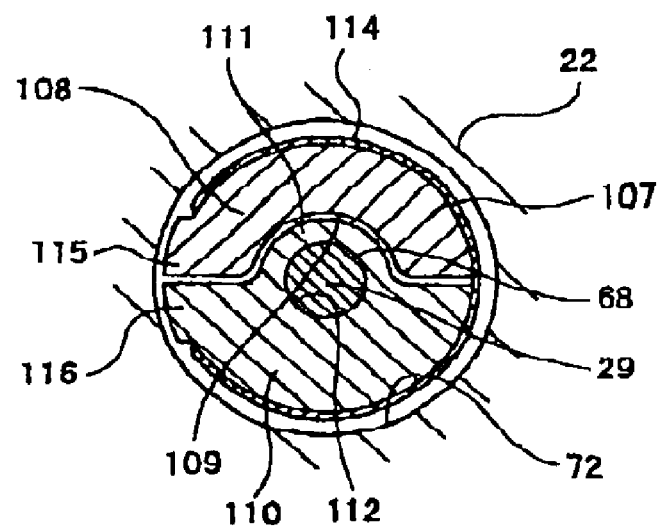
FIG. 17 is a cross sectional view taken along the line E—E in FIG. 16.

Next, FIGS. 16 and 17 show a seventh example of the embodiment of the invention. In this example, the outer race 60 of the fourth ball bearing 37 is directly (not by way of any other members) fitted into the portion near the opening around the inner peripheral surface of the concave hole 72 formed in part of the inner surface of the gear housing 22 in the first example shown in FIGS. 1 to 5. Also, a holder 107 in which a through hole 113 is formed through the center in the axial direction is fitted and fastened into the inner peripheral surface in the middle section in the axial direction of this concave hole 72. Moreover, on one surface (right side surface in FIG. 16) of this holder 107 on its half on the side of the worm wheel 28, there is a semi-columnar protruding fitting section 108 that protrudes in the axial direction. There is a concave groove 109 formed on the side surface in the middle section of this protruding fitting section 108, along its entire length in the axial direction, on the opposite side (bottom side in FIGS. 16 and 17) from the worm wheel 28. On the inside of the concave hole 72, at the position that faces the side surface of the protruding fitting section 108, there is a semi-columnar pre-load pad 110. Of this pre-load pad 110, at a position that faces the concave groove 109 in the protruding fitting section 108, there is a protruding section 111 that runs along the entire length in the axial direction. In the state where the protruding section 111 on the pre-load pad 110 is fitted inside the concave groove 109 on the protruding fitting section 108, the protruding fitting section 108 is combined with the pre-load pad 110 such that the combination of the protruding fitting section 108 and the pre-load pad 110 becomes a cylindrical shape.

Moreover, a through hole 112 is formed in part of the pre-load pad 110 such that it passes in the axial direction through the portion that includes the protruding section 111. The small-diameter section 68 formed on the tip end of the worm shaft 29 is freely inserted through this through hole 112 and the through hole 113 that is formed in the holder 107.

Also, a plate spring 114 having a C-shaped cross section fits onto the outer peripheral surface of the protruding fitting section 108 and pre-load pad 110. This plate spring 114 has an elastic force acting in a direction such that the diameter becomes smaller. Also, when the side surface of the protruding fitting section 108 is in close contact with the side surface of the pre-load pad 110, the center axis of the through hole 112 that is formed in the pre-load pad 110 shifts toward the worm wheel 28 with respect to the center axis of the fourth ball bearing 37. Moreover, when the tip end section of the worm shaft 29 is inserted into the through hole 112 of the pre-load pad 110, the elastic force from this plate spring 114 is applied to this tip end in the direction toward the worm wheel 28 by way of the pre-load pad 110. In this example, there are protrusions 115, 116 formed along the entire length in the axial direction on one end in the circumferential direction of the partial cylindrical surface of the protruding fitting section 108, and on one end in the circumferential direction of the partial cylindrical surface of the pre-load pad 110 that faces this end. The plate spring 114 is prevented from turning around the protruding fitting section 108 and the pre-load pad 110 by these protrusions 115, 116.

In the case of this example described above, when the specified elastic force is applied to the worm shaft 29 in the direction toward the worm wheel 28, it becomes easy to perform the work of assembling the worm shaft 29 inside the gear housing 22.

The other construction and functions of this example are substantially the same as in the fifth example shown in FIGS. 13 and 14, so the same reference numbers are given to identical parts, and any redundant explanation is omitted.

Figure 18:
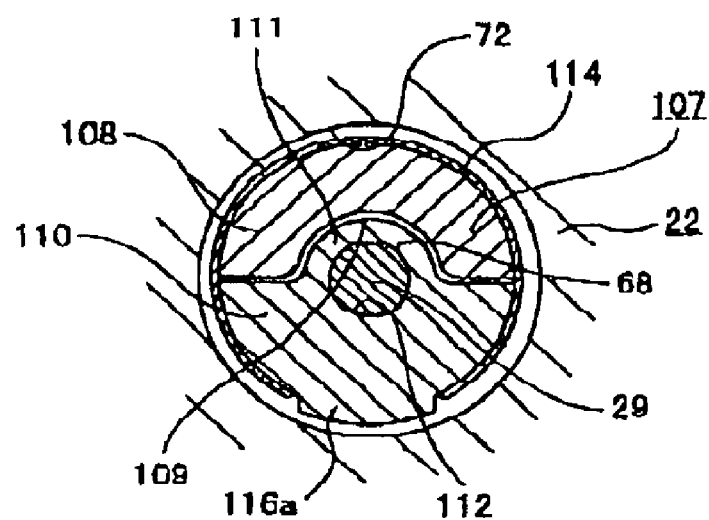
FIG. 18 is a view similar to FIG. 17 to show an example of the structure where the position of the protrusion to prevent the plate spring from rotating.

As shown in FIG. 18, the protrusions for preventing the plate spring 114 from rotating around the protruding fitting section 108 and pre-load pad 110 can also be a protrusion 116a that is formed on just the middle section on the partial cylindrical surface of the pre-load pad 110, or could be a protrusion that is formed on just the middle section of the partial cylindrical surface of the protruding fitting section 108. Also, instead of a plate spring 114, it is possible to use a C-shape wire spring.

Figure 19:
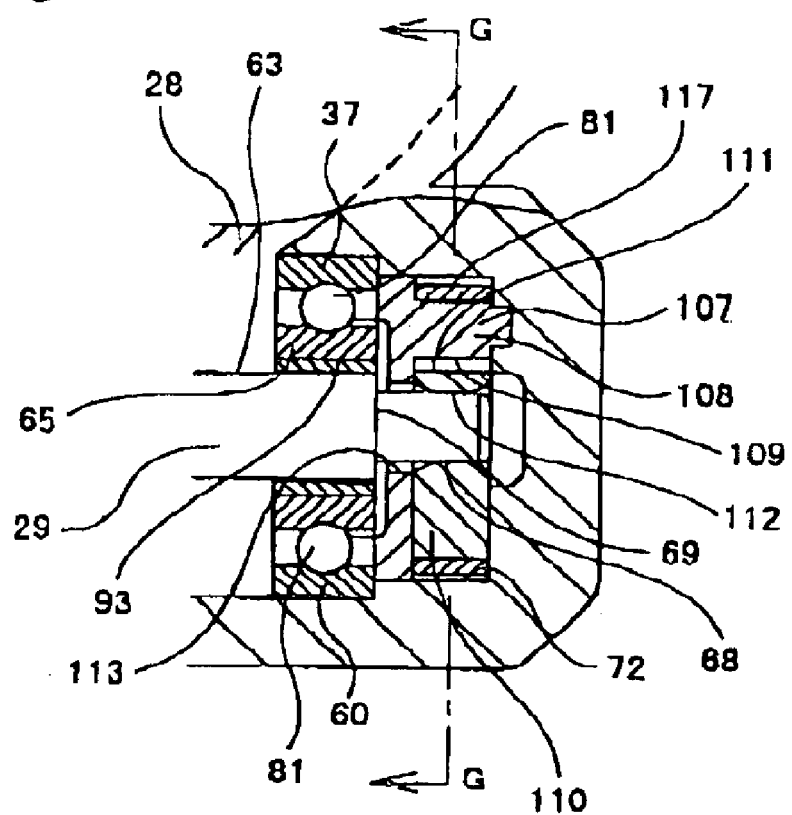
FIG. 19 is a view to show an eighth example of the embodiment of the present invention corresponding to Portion F of FIG. 4.
Figure 20:
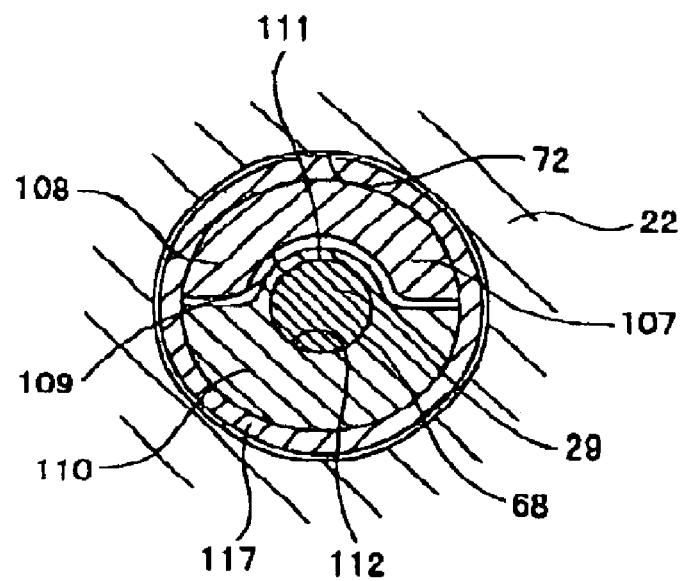
FIG. 20 is a cross sectional view taken along the line G—G in FIG. 19.

Next, FIGS. 19 and 20 show an eighth example of the embodiment of the invention. In this example, a cylindrical member 117 made of an elastic materials such as an elastomer like rubber and having an elastic force acting in the direction toward the inner diameter side is fitted around the outer peripheral surfaces of the protruding fitting section 108 and pre-load pad 110 of the holder 107 in the seventh example shown in FIGS. 16 and 17. This cylindrical member 117 applies an elastic force to the tip of the worm shaft 29 in the direction toward the worm wheel 28.

The other construction and functions of this example are substantially the same as in the seventh example shown in FIGS. 16 and 17, so the same reference numbers are given to identical parts, and any redundant explanation is omitted.

Figure 21:
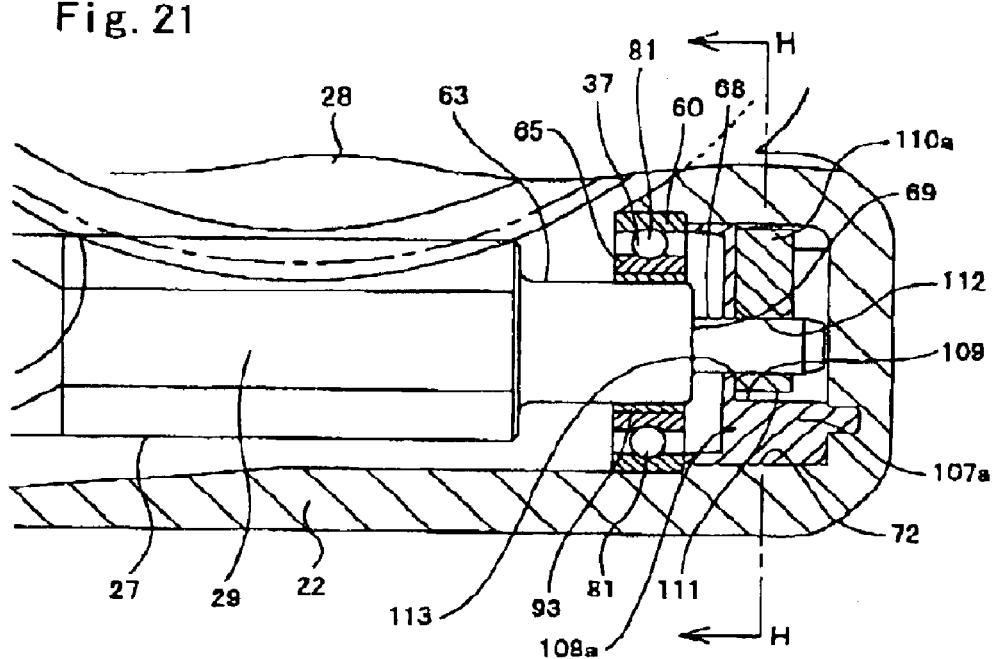
FIG. 21 is a view similar to FIG. 13 to show a ninth example of the embodiment of the present invention.
Figure 22:
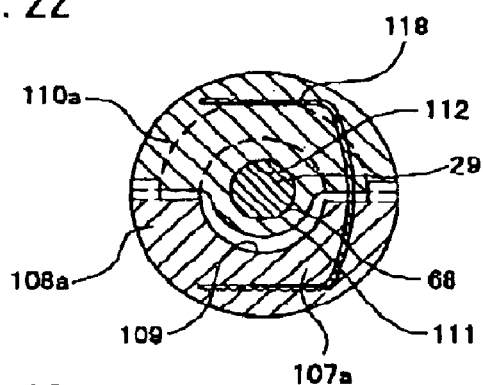
FIG. 22 is a cross sectional view taken along the line H—H in FIG. 21.
Figure 23:
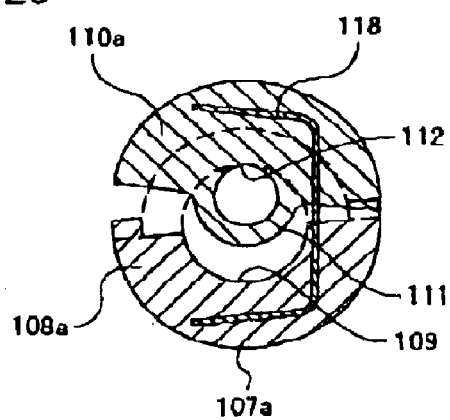
FIG. 23 is a view similar to FIG. 22 to show a state before the tip end of the worm shaft is inserted into the through hole of the pre-load pad.

Next, FIGS. 21 to 23 show a ninth example of the embodiment of the invention. This example differs from the seventh example shown in FIGS. 16 and 17 in that there is a protruding fitting section 108a provided on one surface (right side surface in FIG. 21) of the holder 107a that is fastened on the inner peripheral surface of the concave hole 72 in the gear housing 22, in a portion in the circumferential direction on the opposed side from the worm wheel 28 (lower side of FIGS. 21 to 23). Also, inside the concave hole 72, both ends of a plate spring 118 with a channel shaped cross section are connected to the pre-load pad 110a and the protruding fitting section 108a with the pre-load pad 110a facing the protruding fitting section 108a. This plate spring 118 has an elastic force that acts in a direction that spreads open the space between both ends. The plate spring 118 applies an elastic force to the tip end of the worm shaft 29 in the direction toward the worm wheel 28.

In other words, in this example, when the tip end of the worm shaft 29 is not inserted in the through hole 112 formed in the pre-load pad 110a, the space between one end (left end in FIG. 23) of the side surface of the pre-load pad 110a and one end (left end in FIG. 23 of the side surface of the protruding fitting section 108a is elastically spread open by the plate spring 118 as shown in FIG. 23. In this state, the center axis of the through hole 112 formed in the pre-load pad 110a shifts toward the worm wheel 28 with respect to the center axis of the fourth ball bearing 37. Also, when the tip end of the worm shaft 29 moves the pre-load pad 110a to the side opposite from the worm wheel 28 and is inserted inside the fourth ball bearing 37 and the through hole 112 formed in the pre-load pad 110a, the plate spring 118 applies an elastic force to the tip end of the worm shaft 29 in the direction toward the worm wheel 28.

In the case of this example that is constructed as described above, when the specified elastic force is applied to the worm shaft 29 in the direction toward the worm wheel 28, it becomes easy to assemble the worm shaft 29 inside the gear housing 22.

The other construction and functions of this example are substantially the same as in the seventh example shown in FIGS. 16 and 17, so the same reference numbers are given to identical parts, and any redundant explanation is omitted.

Figure 24:
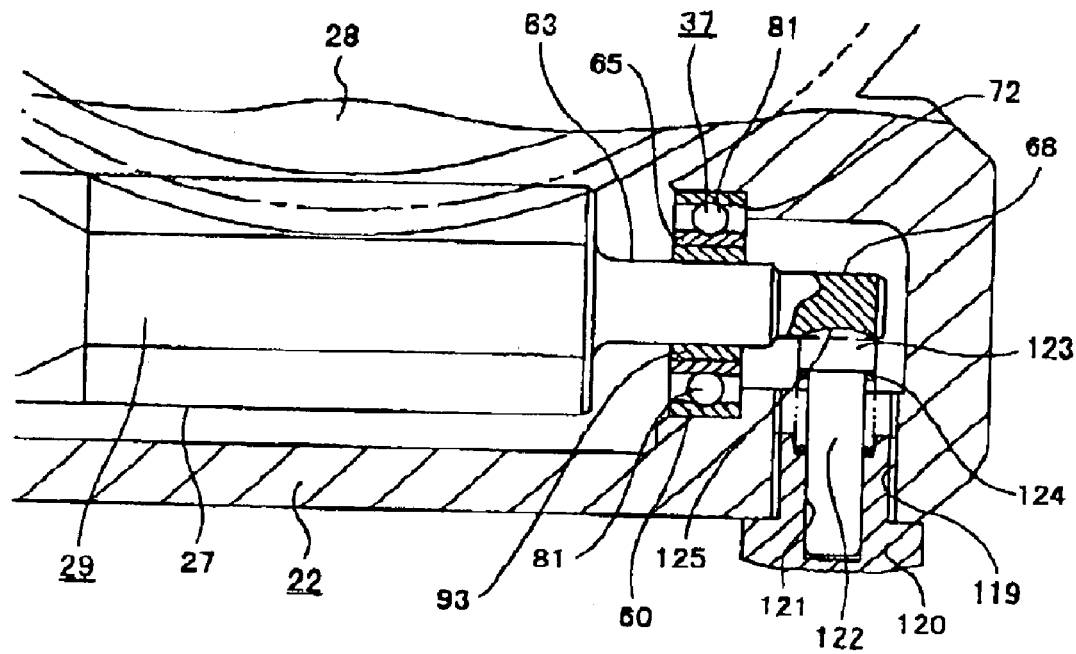
FIG. 24 is a view similar to FIG. 13 to show a tenth example of the embodiment of the present invention.

Next, FIG. 24 shows a tenth example of the embodiment of the invention. In this example, a nut member 120 is screwed from the outside of the gear housing 22 of the seventh example shown in FIGS. 16 and 17 into a screw hole 119 that is formed in part of this gear housing 22 on the side opposite from the worm wheel 28. Also, there is a concave hole 121 formed in the surface on the tip end (surface on the top end in FIG. 24) of this nut member 120, and the tip-end half (bottom half in FIG. 24) of a rod-shaped pre-load pad 122 fits in the concave hole 121 such that it can move freely in the axial direction. Moreover, a coil spring 124, used as the elastic-force application means, is located between the surface on one side (bottom side surface in FIG. 24) of a head section 123 with a partial convex spherical end surface formed on the tip end surface on the base end (top side portion in FIG. 14) of the pre-load pad 122, and the tip end surface of the nut member 120. Also, the head section 123 comes in contact with a concave section 125 in a partial concave spherical shape formed on the outer peripheral surface of the tip-end section of the worm shaft 29. With this construction, an elastic force is applied to the tip end of the worm shaft 29 in the direction toward the worm wheel 28.

The other construction and functions of this example are substantially the same as in the seventh example shown in FIGS. 16 and 17, so the same reference numbers are given to identical parts, and any redundant explanation is omitted.

Figure 25:
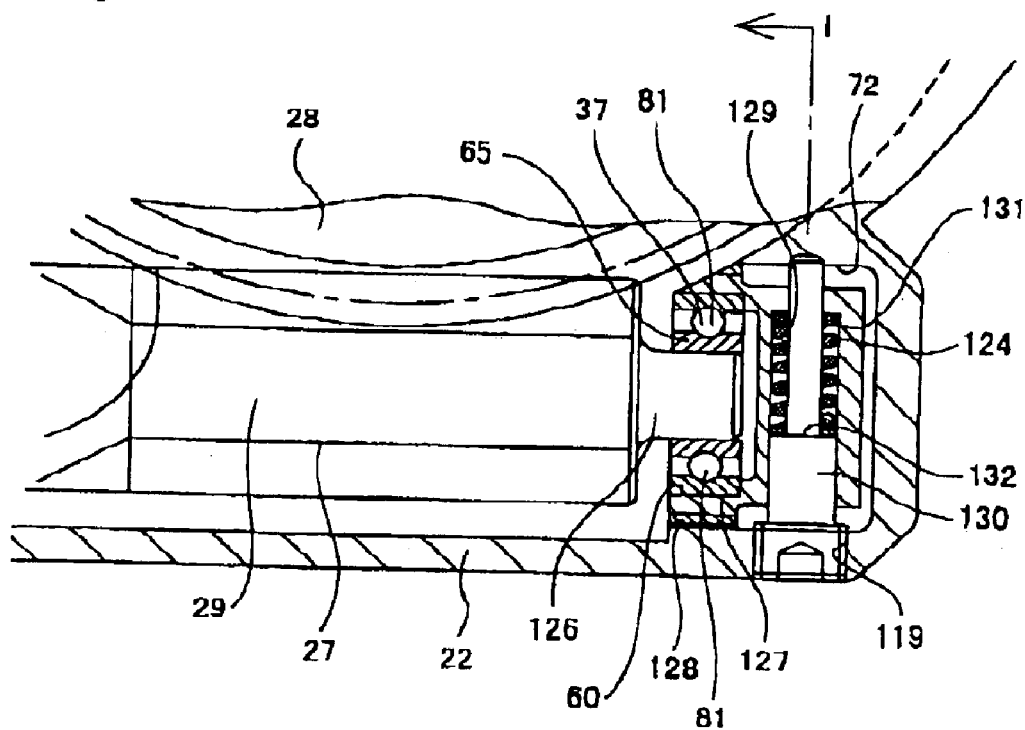
FIG. 25 is a view similar to FIG. 13 to show an eleventh example of the embodiment of the present invention.
Figure 26:
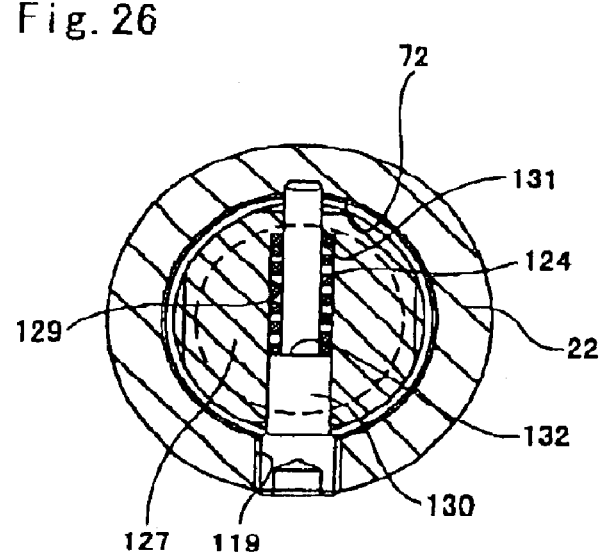
FIG. 26 is a cross sectional view taken along the line I—I in FIG. 25.

Next, FIGS. 25 and 26 show an eleventh example of the embodiment of the invention. In this example, the section of the worm shaft 29 that is away from the worm 27 toward the tip end side is a shaft section 126 having a short length in the axial direction. The outer peripheral surface of this shaft section 126 is a simple cylindrical surface that is not stepped. Also, a holder 27 is located on the inside of the concave hole 72 that is formed in part of the gear casing 22, and a cylindrical elastic member 128 is connected to and fastened to the outer peripheral surface of the tip half (left half shown in FIG. 25) of the holder 127. Moreover, there is a small gap between the outer peripheral surface of this elastic member 128 and the inner peripheral surface of the concave hole 72. The outer race 60 of the fourth ball bearing 37 fits around and is fastened to the inner peripheral surface of the tip half of the holder 127, and the inner race 65 of this fourth ball bearing 37 fits around and is fastened to the shaft section 126.

Also, an insert hole 129 extending perpendicular to the center axis of the fourth ball bearing 37 is formed in the base half (right half in FIG. 25) of the holder 127. The tip-end half of a pin member 130, whose base end is connected to and fastened to the screw hole 119 formed in part of the gear housing 22, is inserted into this insert hole 129. The holder 127 freely moves in the lengthwise direction within a specified range in the pin member 130. Moreover, an elastic force is applied to the holder 127 in the direction toward the worm wheel 28 by placing a coil spring 124 in between a stepped section 131 formed in the middle section of the insert hole 129 and a stepped section 132 formed in the middle section of the pin member 130. With this construction, an elastic force is applied to the tip end section of the worm shaft 29 in the direction toward the worm wheel 28. Also, in this example, when driven by the electric motor 31 (see FIG. 1), the elastic member 128 that is fastened around the outer peripheral surface of the tip-end half of the holder 127 functions as a stopper that regulates the displacement of the worm shaft 29.

The other construction and functions of this example are substantially the same as in the tenth example shown in FIG. 24, so the same reference numbers are given to identical parts, and any redundant explanation is omitted.

Figure 27:
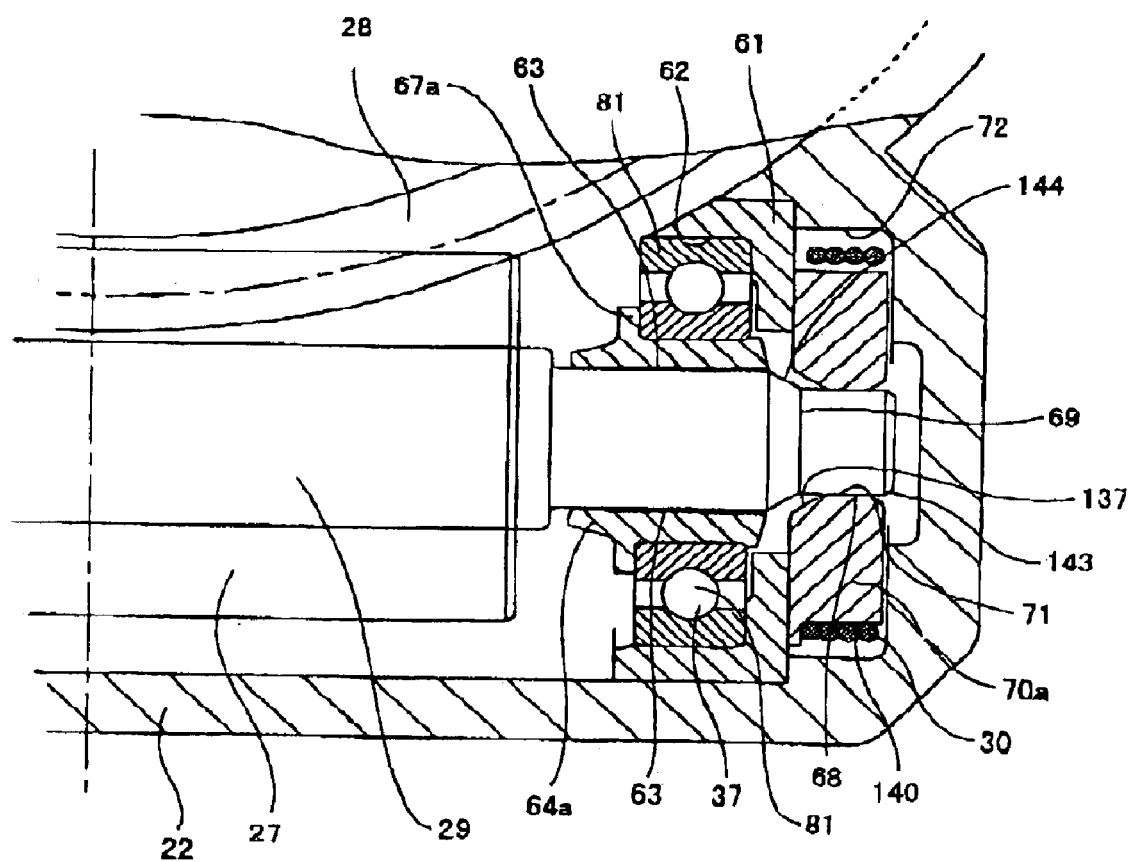
FIG. 27 is a view similar to FIG. 13 to show a twelfth example of the embodiment of the present invention.
Figure 28:
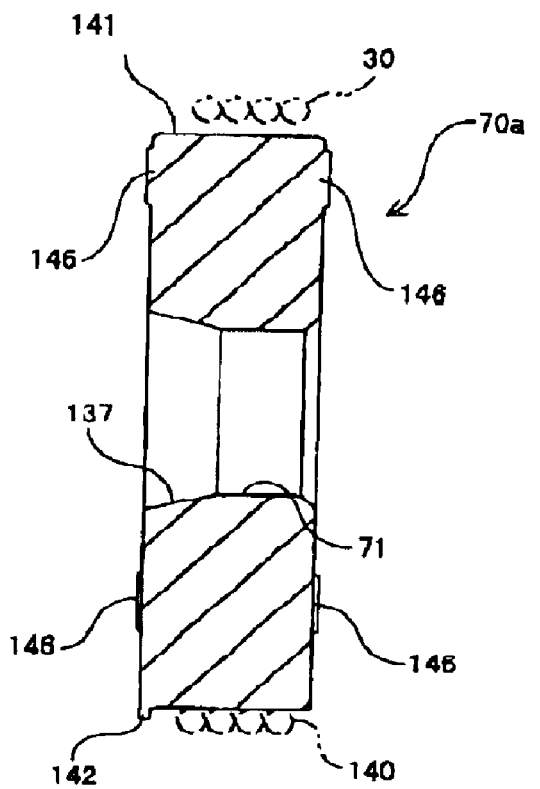
FIG. 28 is an enlarged view to show a pre-load pad only taken out from FIG. 27.
Figure 29:
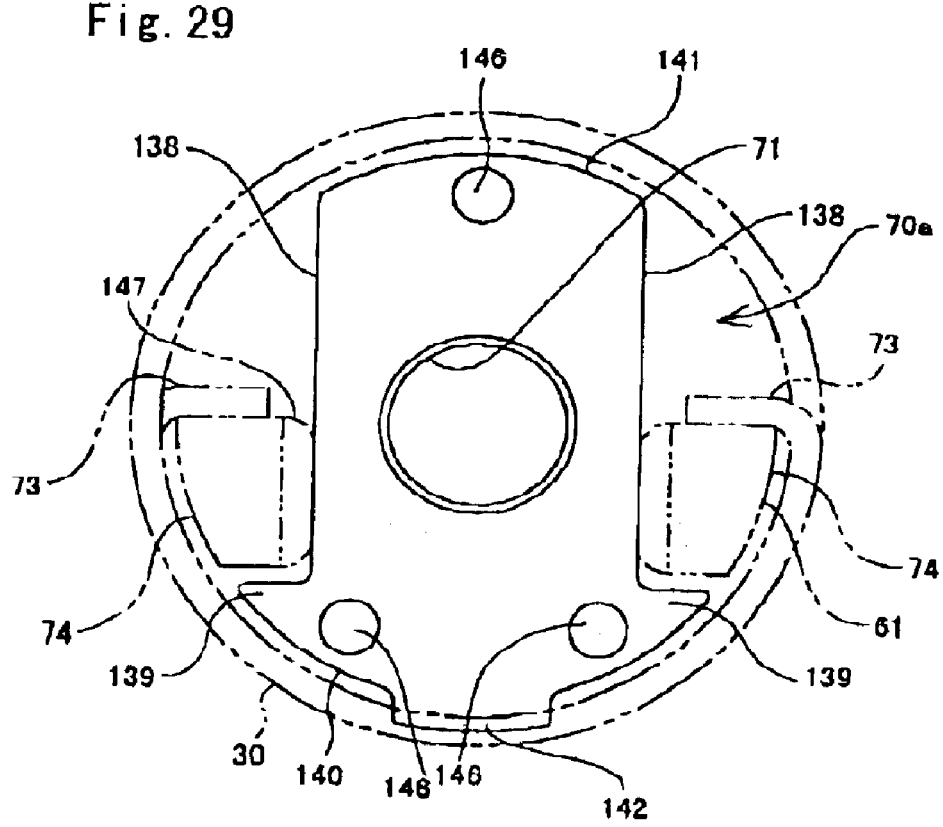
FIG. 29 is a view taken from the right side of FIG. 28.

Next, FIGS. 27 to 29 show a twelfth example of the embodiment of the invention. In this example, in the construction of the first example shown in FIGS. 1 to 5, the large-diameter section 63 and the small-diameter section 68 formed on the outer peripheral surface near the tip end of the worm shaft 29 are connected by a tapered surface 144. Also, a bushing 64*a* in which this large-diameter section 63 fits has an outward facing flange section 67*a* formed around its outer peripheral surface in the middle section. Moreover, there are protruding sections 146 that protrude in the axial direction formed at three locations each on both ends in the axial direction of the pre-load pad 70*a* located inside the concave hole 72 of the gear housing 22. There are elastic material 147 such as an elastomer like rubber connected to portions of the pair of protruding fitting sections 74, which are formed on the surface of the holder 61 fastened to the gear housing 22 that faces the pre-load pad 70*a* such that they protrude in the axial direction, on the portions that face the flat sections 138 on the pre-load pad 70*a*.

In the case of this example constructed as described above, a plurality of protruding sections 146 are formed on the surfaces of both ends in the axial direction of the pre-load pad 70*a*, so it is possible with these protrusions 146 to better control displacement of the pre-load pad 70*a* in the axial direction inside the concave hole 72. Furthermore, since the contact area between the protrusions 146 and the opposing surfaces is small, the friction force acting at the area of contact is small, and thus displacement of the pre-load pad 70*a* in the planar direction of the bottom surface of the concave hole 72 can be performed smoothly. Particularly, the viscosity of the grease inside the gear housing 22 becomes large at low temperature, however, since the friction force acting on the area of contact is small, displacement of the pre-load pad 70*a* can always be performed smoothly, even at low temperature.

In this example, since there are elastic materials 147 between part of the pre-load pad 70*a* and the protruding fitting sections 74 on the holder 61, it is possible to prevent the pre-load pad 70*a* from turning inside the concave hole 72 and to apply a steady elastic force to the worm shaft 29.

The other construction and functions of this example are substantially the same as in the first example shown in FIGS. 1 to 5, so the same reference numbers are given to identical parts, and any redundant explanation is omitted.

The protruding sections 146 that are formed on the surface of both sides in the axial direction of the pre-load pad 70*a* are not limited to being formed at three locations on each side, and it is possible to have two or more formed on each side.

Figure 30:
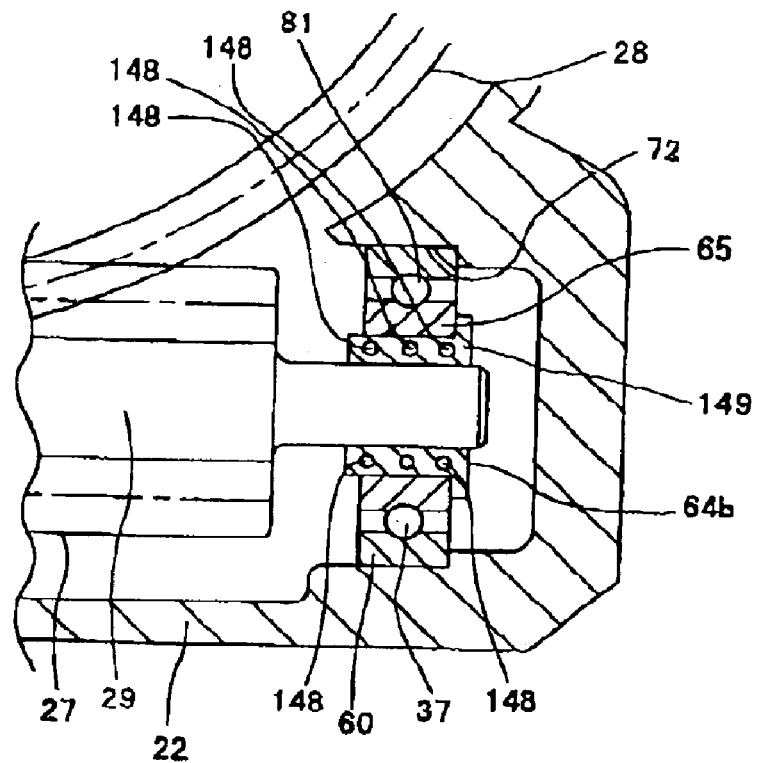
FIG. 30 is a view similar to FIG. 19 to show a thirteenth example of the embodiment of the present invention.

Next, FIG. 30 shows a thirteenth example of the embodiment of the invention. In this example, the outer race 60 of the fourth ball bearing 37 of the first example shown in FIGS. 1 to 5 fits directly around the inner peripheral surface of the concave hole 72 in the gear housing 22. Also, the tip end of the worm shaft 29 is supported inside the inner race 65 of the fourth ball bearing 37 by way of a busing 64*b*. This bushing 64*b* is made out of an elastic material such as an elastomer like rubber into a cylindrical shape, and there is a plurality of hollow cavities 148 at a plurality of locations inside it. There is a flange section 149 formed around the outer peripheral surface on one end (right end in FIG. 30) of the bushing 64*b*, and one surface of this flange section 149 comes in contact with the end surface of the inner race 65. This bushing 64*b* applies an elastic force to the tip end of the worm shaft 29 in the direction toward the worm wheel 28. In the case of this example, when all the hollow cavities 148 that are formed in the bushing 64*b* are not closed, the spring constant of this bushing 64*b* is low, however, when part of the hollow cavities 148 in the circumferential direction are closed, the spring constant of the bushing 64*b* becomes high.

The other construction and functions of this example are substantially the same as in the first example shown in FIGS. 1 to 5, so the same reference numbers are given to identical parts, and any redundant explanation is omitted.

Figure 31:
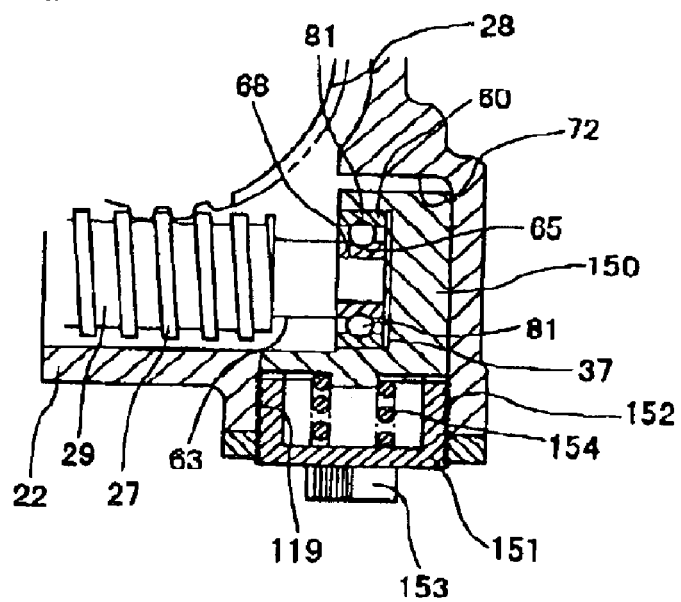
FIG. 31 is a view similar to FIG. 19 to show a fourteenth example of the embodiment of the present invention.

Next, FIG. 31 shows a fourteenth example of the embodiment of the invention. In this example, the outer race 60 of the fourth ball bearing 37 fits inside a bottomed cylindrical holder 150 that is located in the concave hole 72 of the gear housing 22, and the tip end of the worm shaft 29 is supported on the inside of the inner race 65 of the fourth ball bearing 37. Also, there is a cylindrical support member 151 with a bottom that is connected and fastened to a screw hole 119 that is formed in part of the gear housing 22 on the side opposite from the worm wheel 28. This support member 151 has a male screw section 152 formed on its outer peripheral surface that screws into the screw hole 119. Also, a fitting section 153 having a polygon-shaped cross section is formed in the center of the surface on the base end (bottom surface in FIG. 31) of the support member 151 for fitting with a tool such as a wrench. Moreover, by placing a coil spring 154 between the bottom surface of the support member 151 and part of the outer peripheral surface of the holder 150, a specified elastic force is applied to the holder 150 in the direction toward the worm wheel 28. Also, the tip end surface (top surface in FIG. 31) of the support member 151 faces the part of the outer peripheral surface of the holder 150 through a gap between them.

In the case of this kind of example, by changing the length in the axial direction of the connection between the screw hole 119 and the male-thread section 152 of the support member 151, it is possible to easily adjust the size of the elastic force that is applied to the tip end of the worm shaft 29 by the coil spring 154.

The other construction and functions of this example are substantially the same as in the first example shown in FIGS. 1 to 5, so the same reference numbers are given to identical parts, and any redundant explanation is omitted.

Figure 32:
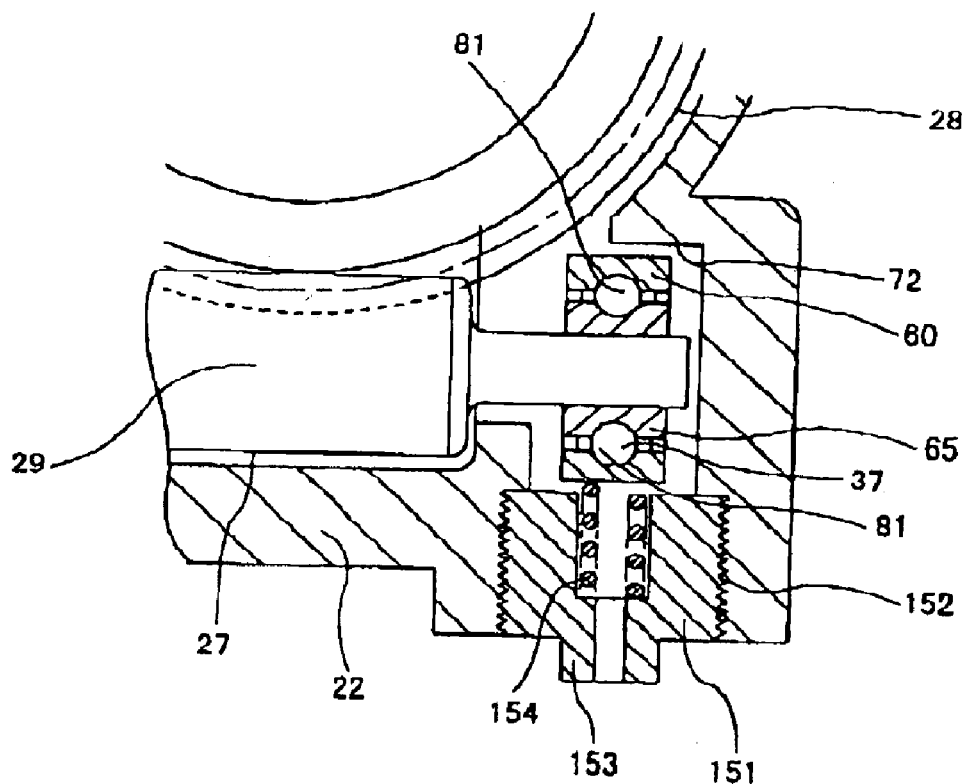
FIG. 32 is a view similar to FIG. 19 to show a fifteenth example of the embodiment of the present invention.

Next, FIG. 32 shows a fifteenth example of the embodiment of the invention. In this example, with the construction of the fourteenth example shown in FIG. 31, a coil spring 154 is located on the inside of the support member 151, so that the end section of the coil spring 154 directly presses, without the holder 150 (see FIG. 31), part of the outer peripheral surface of the fourth ball bearing 37 that is supported on the tip end of the worm shaft 29. Also, this coil spring 154 applies a specified elastic force to the tip end of the worm shaft 29.

The other construction and functions of this example are substantially the same as in the fourteenth example shown in FIG. 31, so the same reference numbers are given to identical parts, and any redundant explanation is omitted.

Figure 33:
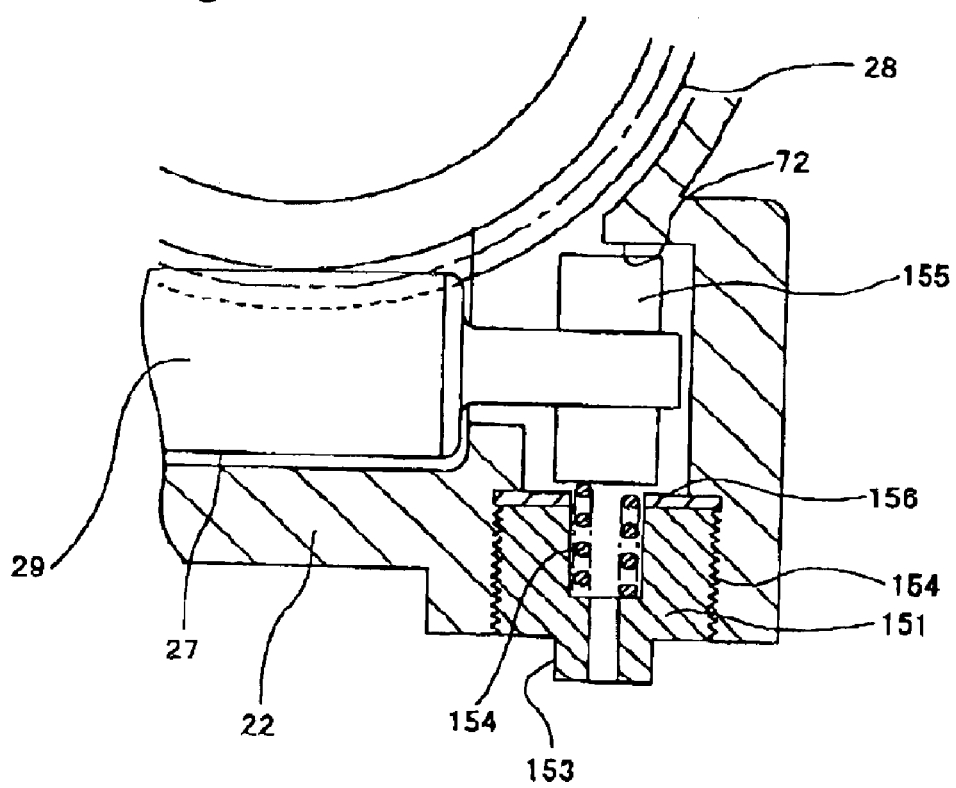
FIG. 33 is a view similar to FIG. 19 to show a sixteenth example of the embodiment of the present invention.

Next, FIG. 33 shows a sixteenth example of the embodiment of the invention. In this invention, with the construction of the fifteenth example shown in FIG. 32, a sliding bearing 155, which is the fourth bearing, fits onto the tip end section of the worm shaft 29. Also, a coil spring 154 is located inside the support member 151, so that the tip end of the coil spring 154 directly pushes against part of the outer peripheral surface of this sliding bearing 155. In the case of this example, there is also a shock-absorbing member 156, made of an elastic material such as an elastomer like rubber, located between the surface on the tip (upper end surface in FIG. 33) of the support member 151 and the outer peripheral surface of the sliding bearing 155. This shock-absorbing member 156 can absorb impact that is applied from the sliding bearing 155.

The other construction and functions of this example are substantially the same as in the fifteenth example shown in FIG. 32, so the same reference numbers are given to identical parts, and any redundant explanation is omitted.

Figure 34:
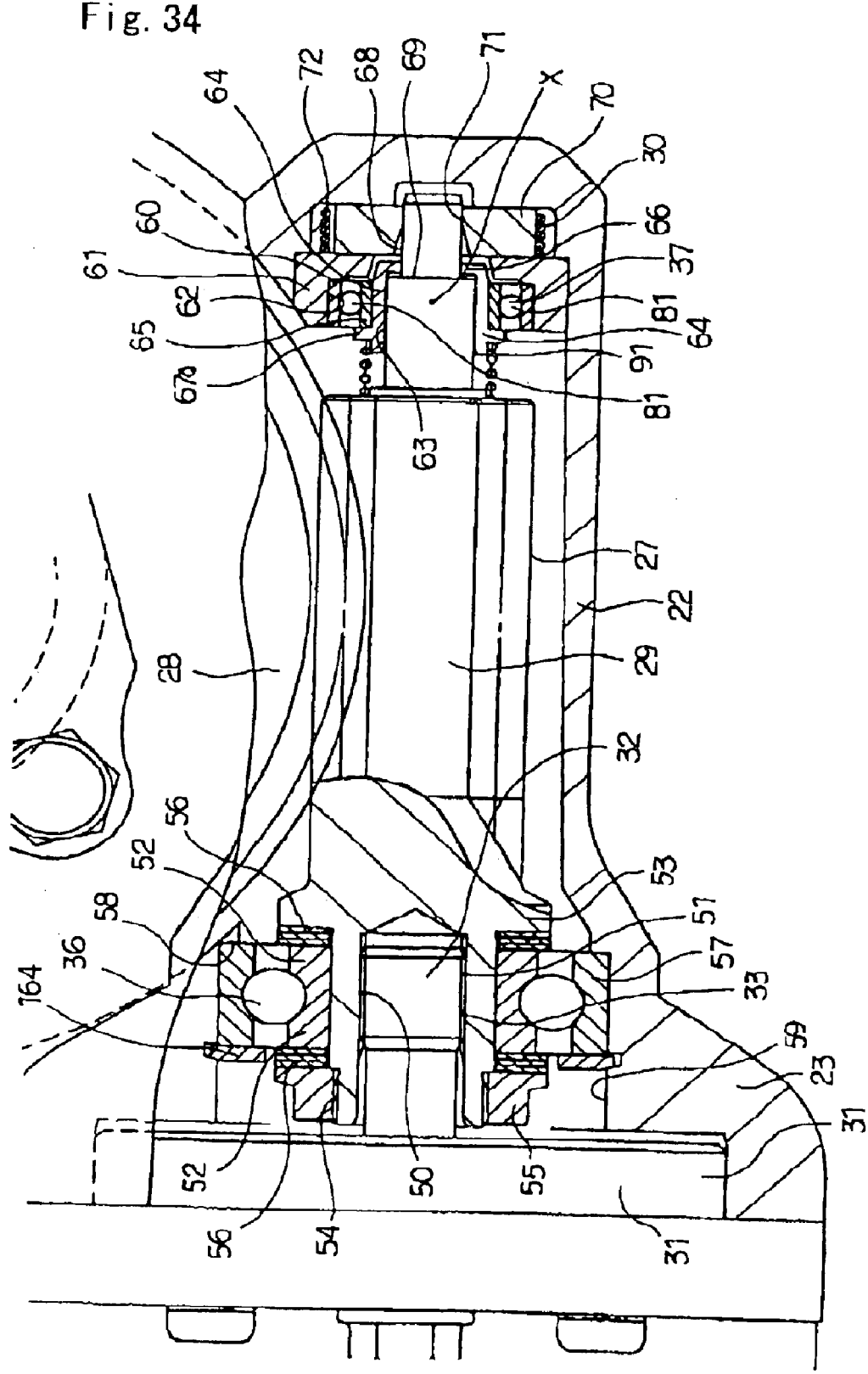
FIG. 34 is a view similar to FIG. 4 to show a seventeenth example of the embodiment of the present invention.

Next, FIG. 34 shows a seventeenth example of the embodiment of the invention. In this example, an outward facing flange section 67a is formed on the outer peripheral surface of the portion near the base end (portion near the left end in FIG. 34) of the bushing 64 that is located on the inside-diameter side of the fourth ball bearing 37 of the first example shown in FIGS. 1 to 5. Also, there is a coil spring 91, which acts as an elastic member, located between the surface of one of the sides (left side surface in FIG. 34) of the outward facing flange section 67a and the surface of one of the sides (right side surface in FIG. 34) of the worm 27 formed on the worm shaft 29, and it applies a pre-load in the axial direction of a magnitude of 20 N to 200 N on the balls of the fourth ball bearing 37. Moreover, in this example, when not driven by the electric motor 31, the position x on the center axis of the worm shaft 29 that coincides with the center position in the axial direction of the fourth ball bearing 37 can freely move in the radial direction of the fourth ball bearing 37 within a range of 1.0 mm or less. Also, in this example, the rigidity of the coil spring 91 in the radial direction of the fourth ball bearing 37 is less than the rigidity of this coil spring 91 in the axial direction of the fourth ball bearing 37.

In the case of this example constructed as described above, it is possible to suppress lost motion of the fourth ball bearing 37, and to keep noise and vibration to a minimum. Also, in the case of this example, the rigidity of the coil spring 91 in the radial direction of the fourth ball bearing 37 is less than the rigidity of the coil spring 91 in the axial direction of the fourth ball bearing 37. Therefore, it is possible to prevent the coil spring 91 from hindering the tilting of the worm shaft 29 with respect to the third ball bearing 36.

The other construction and functions of this example are substantially the same as in the first example shown in FIGS. 1 to 5, so the same reference numbers are given to identical parts, and any redundant explanation is omitted.

Figure 35:
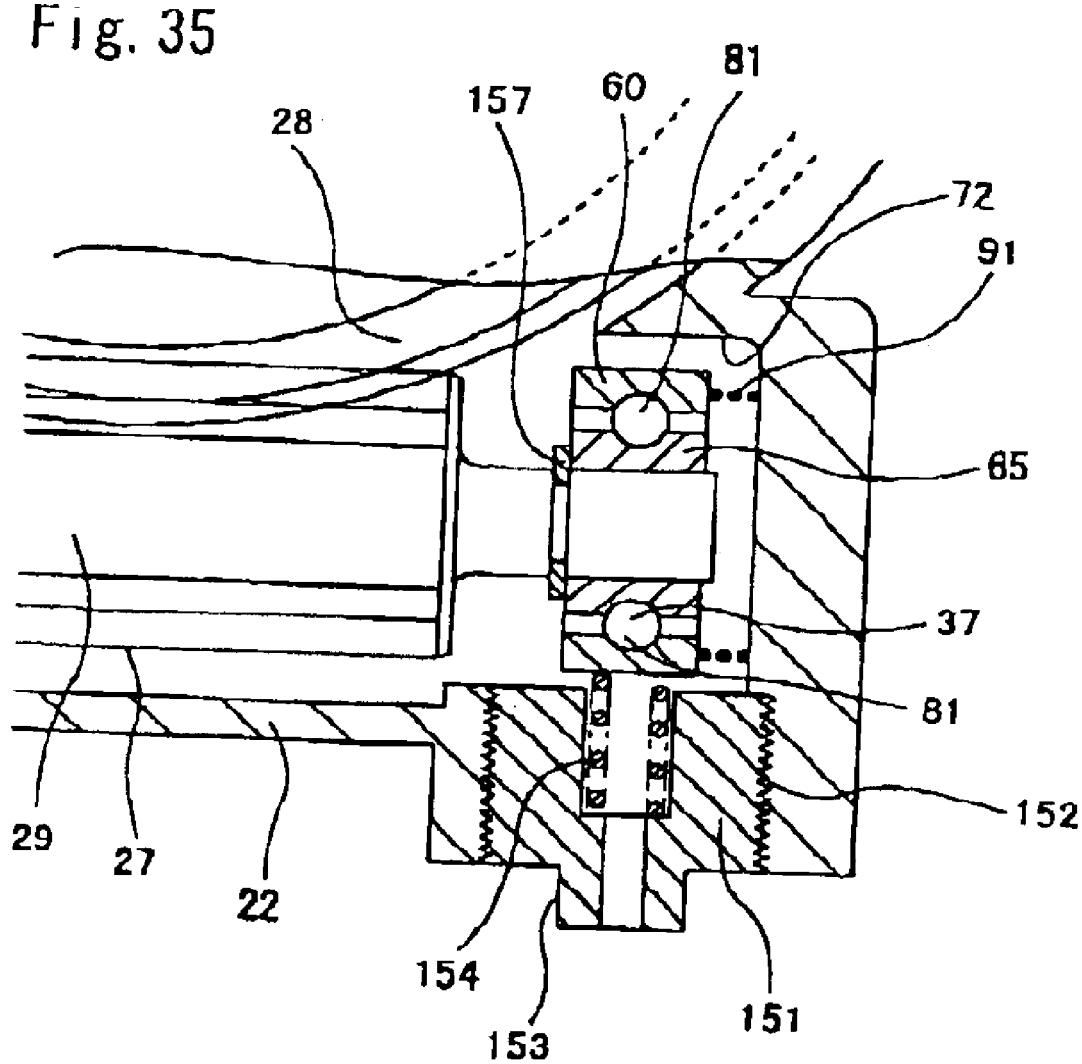
FIG. 35 is a view similar to FIG. 19 to show an eighteenth example of the embodiment of the present invention.

Next, FIG. 35 shows an eighteenth example of the embodiment of the invention. In this example, there is a coil spring 91 located between the surface on one end (right end surface is FIG. 35) in the axial direction of the outer race 60 of the fourth ball bearing 37 of the fifteenth example shown in FIG. 32 and the bottom surface of the concave hole 72 in the gear housing 22, and this coil spring 91 applies a pre-load in the axial direction to the balls 81 of the fourth ball bearing 37. In this example, a retaining ring 157 fits around the outer peripheral surface of the portion near the tip end of the worm shaft 29, and one surface (right side surface in FIG. 35) of this retaining ring 157 comes in contact with the surface on the end (left end surface in FIG. 35) in the axial direction, on the side opposite from the coil spring 91, of the inner race 65 of the fourth ball bearing 37.

Similar to the seventeenth example shown in FIG. 34, in the case of this embodiment as well, it is possible to suppress lost motion of the fourth ball bearing 37, and to keep noise and vibration to a minimum.

The other construction and functions of this example are substantially the same as in the fifteenth example shown in FIG. 32, so the same reference numbers are given to identical parts, and any redundant explanation is omitted.

Figure 36:
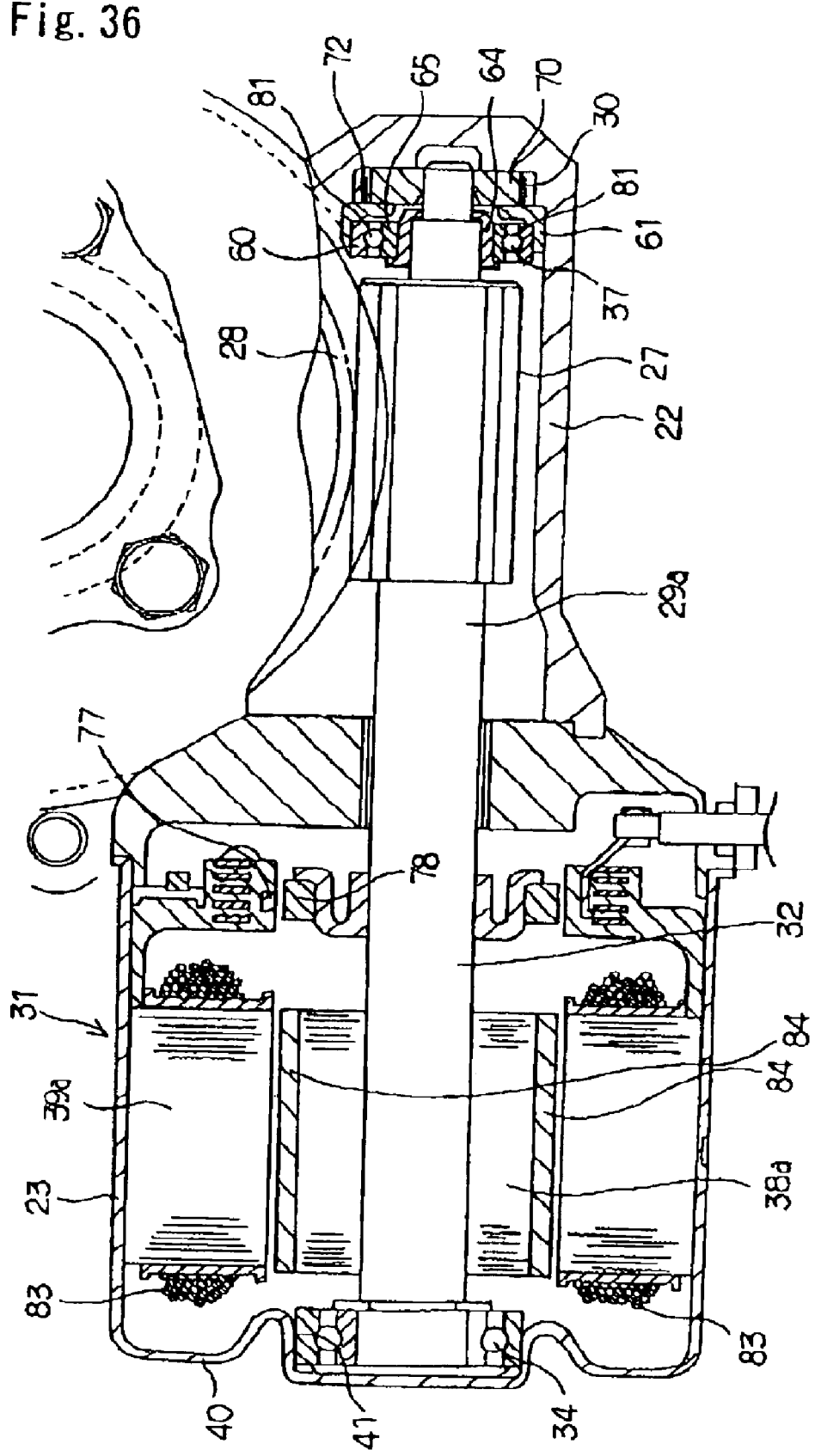
FIG. 36 is a view similar to the lower part of FIG. 2 to show a nineteenth example of the embodiment of the present invention.

Next, FIG. 36 shows a nineteenth example of the embodiment of the invention. This example differs from the other examples in that the portion near the base end of the worm shaft 29a is the rotating shaft 32 of the electric motor 31. In other words, the worm shaft 29a and the rotating shaft 32 are a single member. Also, in this example, the second ball bearing 35 and third ball bearing 36 (see FIG. 2) are not provided. Moreover, the first ball bearing 34 and fourth ball bearing 37 support both ends of the worm shaft 29a inside the gear housing 22. Also, the worm shaft 29a can freely tilt within a specified range with respect to the first ball bearing 34. Furthermore, in the case of this example, one end in the axial direction (right end in FIG. 36) of the connection of the worm shaft 29a with the rotor 38a can move freely in the radial direction of the worm shaft 29a within a range of up to 0.05 mm, and the area where the worm shaft 29a meshes with the worm wheel 28 can move freely in the radial direction of the worm shaft 29a within a range of up to 0.15 mm. Also, similar to the construction shown in FIG. 8, in the case of this example, the electric motor 31 uses brushless construction.

In the case of this kind of example, by doing away with the second ball bearing 35 and third ball bearing 36, the apparatus can be made more compact and lighter.

The other construction and functions of this example are substantially the same as in the first example shown in FIGS. 1 to 5 and as in the construction shown in FIG. 8, so the same reference numbers are given to identical parts, and any redundant explanation is omitted.

In this example, there is a cylindrical member that fits around the portion near the tip end of the worm shaft 29 (portion near the right end in FIG. 36), and the teeth of the worm can be formed around the outer peripheral surface of this cylindrical member. Also, when driven by the electric motor 31, the angle between the center axis of the stator 39a of the electric motor 31 and the rotating shaft 32 is less than the angle between the center axis of the stator 39a and the rotating shaft 32 when not driven by the electric motor 31. When adopting this kind of construction, it is possible to suppress the vibration of the electric motor 31.

In the case of this example, there is a gap between the inner peripheral surface of the bushing 64 around which the inner race 65 of the fourth ball bearing 37 fits and the outer peripheral surface of the tip end of the worm shaft 29a, and it is possible to place an elastic material between the inner peripheral surface of the inner race 65 and the outer peripheral surface of the tip end of the worn shaft 29a. Also, in the case of this example, there is a rotor-phase detector for detecting the phase of the rotor 38a by using a Hall IC 77 and encoder 78, and similar to the case of the first example shown in FIGS. 1 to 5, it is possible to construct the rotor-phase detector using a brush 48 and commutator 46.

Figure 37:
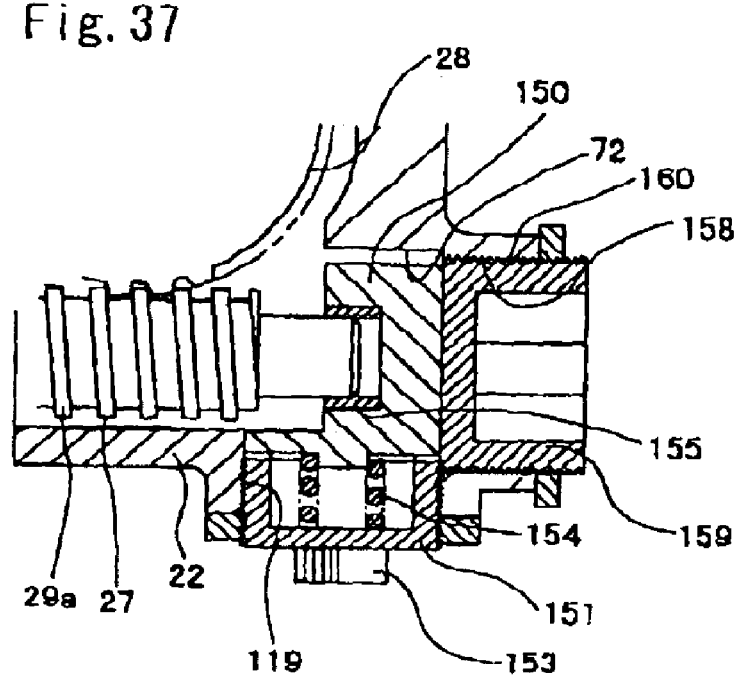
FIG. 37 is a view similar to FIG. 19 to show a twentieth example of the embodiment of the present invention.

Next, FIG. 37 shows a twentieth example of the embodiment of the invention. In this example, the outer peripheral surface around the tip end of the worm shaft 29a is supported on the inside of a sliding bearing 155, which is the fourth bearing that is fastened inside the holder 150. Also, in this example, there is a screw hole 158 formed in the portion of the gear housing 22 that faces the bottom surface of the holder 150, and a cover 159 is connected to and fastened in this screw hole 158. This cover 159 has a male screw section 160 for screwing into the screw hole 158 formed around its outer peripheral surface. Also, the bottom surface of the cover 159 faces the bottom surface of the holder 150. Moreover, the inner diameter of the screw hole 158 is greater than the outer diameter of the holder 150.

In the case of this example, it is possible to assemble the holder 150 inside the gear housing 22 through the screw hole 158.

The other construction and functions of this example are substantially the same as in the fourteenth example shown in FIG. 31 and nineteenth example shown in FIG. 36, so the same reference numbers are given to identical parts, and any redundant explanation is omitted.

Figure 38:
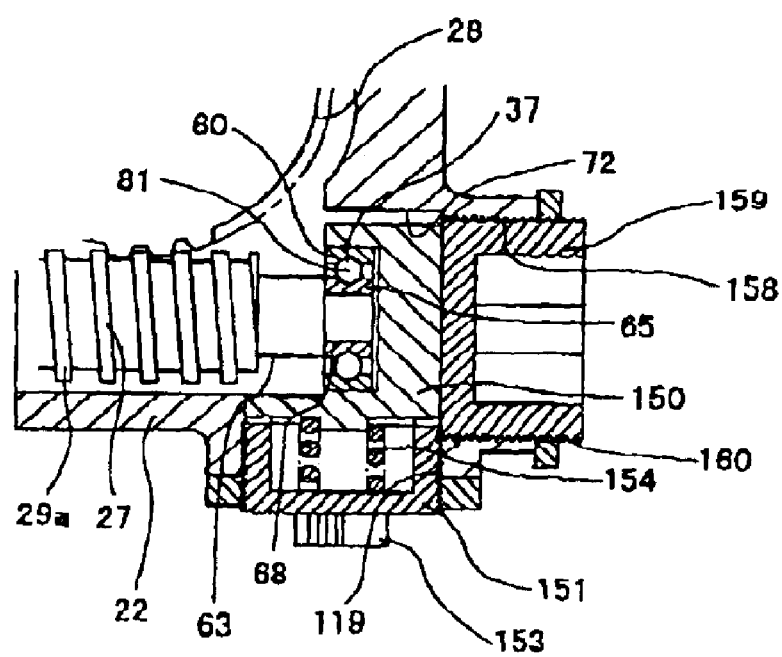
FIG. 38 is a view similar to FIG. 19 to show a twentyfirst example of the embodiment of the present invention.

The fourth bearing for supporting the tip end of the worm shaft 29a can also be a fourth ball bearing 37 as in the twenty-first example shown in FIG. 38.

Figure 39:
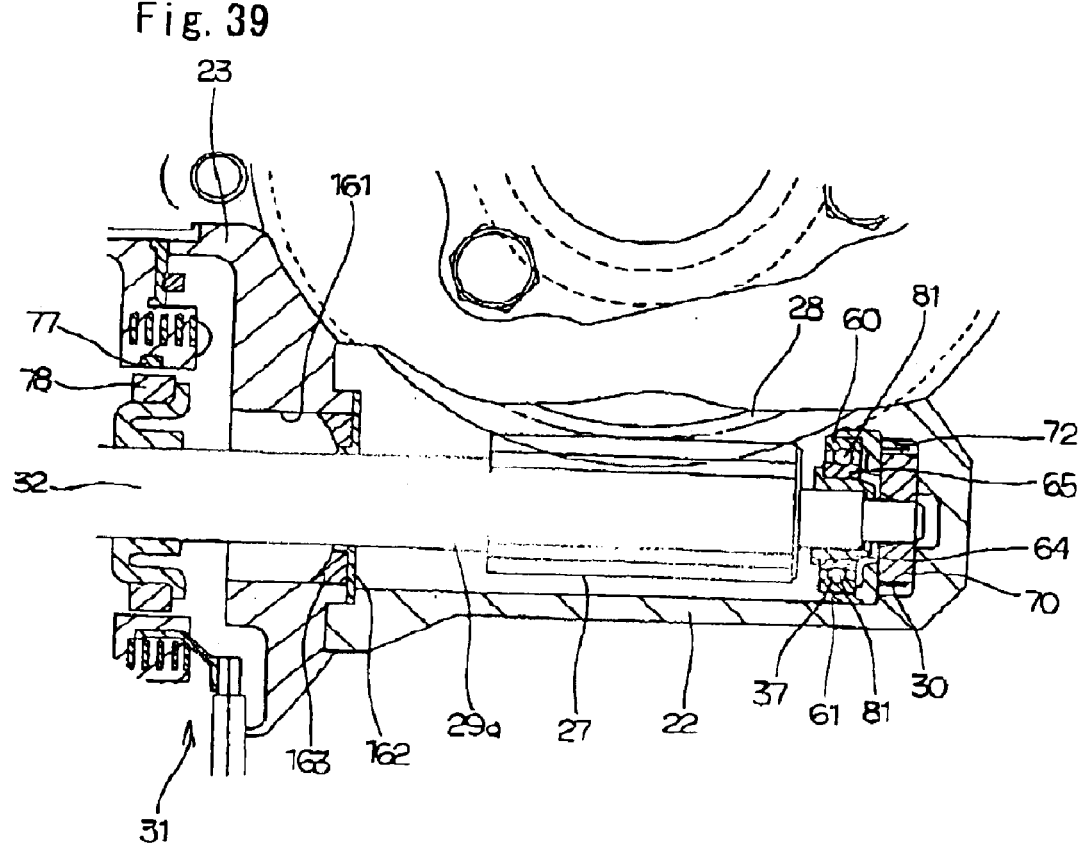
FIG. 39 is a view similar to FIG. 4 to show a twentysecond example of the embodiment of the present invention.

Next, FIG. 39 shows a twenty-second example of the embodiment of the invention. In this example, the middle section of the worm shaft 29a is inserted through the inside of a through hole 161 that is formed on one end (right end in FIG. 39) in the axial direction of the casing 23 of the electric motor 31. Also, there is a metal retaining ring 162 and a support bushing 163 made of an elastic material that are attached to the inner peripheral surface of the through hole 161 so as to support the worm shaft 29a before assembling it in the gear housing 22.

The other construction and functions of this example are substantially the same as in the nineteenth example shown in FIG. 36, so the same reference numbers are given to identical parts, and any redundant explanation is omitted.

Similar to the seventeenth and eighteenth examples shown in FIGS. 34 and 35, in the nineteenth to twenty-second examples shown in FIGS. 36 to 39 as well, there is an elastic material such as a coil spring located between the first and fourth ball bearings 34, 37 that support both end of the worm shaft 29a, and between the attached members such as the gear housing and these ball bearings 34, 37, so it is also possible to apply a pre-load to the balls 81 of the ball bearings 34, 37 by this elastic material. Moreover, similar to the third ball bearing 133a used in the third and fourth examples shown in FIGS. 11 and 12, the first ball bearing 34 for supporting the base end of the worm shaft 29a can be of a four-point contact type. In the case of this kind of construction, it is possible to make the rigidity in the axial direction of the first ball bearing 34 high, and thus to suppress the occurrence of abnormal vibrations.

Application to the Industry

The electric-powered power steering apparatus of this invention is constructed and functions as described above and is inexpensive and makes it possible to suppress the disturbing noise of colliding teeth in the area where the worm wheel meshes with the worm shaft.

What is claimed is:

1. An assist apparatus for electric-powered power steering apparatus having a torque sensor, assist shaft, worm wheel, worm shaft, elastic force application means and an electric motor, comprising first to fourth bearings and wherein the torque sensor is located around the steering shaft or pinion; the assist shaft is one of the steering shaft, the pinion shaft and a sub-pinion; the worm wheel is fastened around either one of the steering shaft, pinion and sub-pinion; the worm shaft has a worm gear that meshes with the worm wheel; the electric motor comprises a rotating shaft, a rotor that is located on the outer-diameter side of the rotating shaft, and a stator that is located such that it faces the rotor in the radial direction; and the rotating shaft and worm shaft are connected to each other by way of a toothed joint or elastic member, wherein the first bearing supports inside the casing the end section of the rotating shaft on the opposite side from the worm shaft; the second bearing supports inside the casing the portion between the joint, which connects the worm shaft and the rotating shaft, and the rotor; the third bearing supports the end of the worm shaft on the side of the rotating shaft inside the gear housing such that the worm shaft can free tilt within a specified range; and the fourth bearing supports the end of the worm shaft on the opposite side from the rotating shaft inside the gear housing, wherein a clearance in the radial direction is provided between either the outer peripheral surface of the outer race of the fourth bearing and the inner surface of the gear housing, or between the inner peripheral surface of the inner race of the fourth bearing and the outer peripheral surface of the worm shaft, wherein the elastic-force application means comprises an elastic member having a variable spring constant that can be changed from a low spring constant of 1 N/mm to 20 N/mm to a high spring constant of 180 N/mm or more, and located between the fourth bearing and gear housing, between the fourth bearing and the worm shaft and/or between the gear housing and the worm shaft so as to apply an elastic force corresponding to the radial displacement of the worm shaft, wherein when not driven by the electric motor, the elastic force having a low spring constant applies a pre-load to parts of the toothed surfaces of the worm and worm wheel to bring them into contact; and when driven by the maximum output of the electric motor and the worm shaft is moved in the direction going away from the worm wheel by the reaction force applied to the worm shaft from the worm wheel, with the area of meshing moved just 0.1 mm to 1.0 mm in the radial direction of the worm shaft with respect to when not driven, the elastic force having a high spring constant applies a pre-load to parts of the toothed surfaces of the worm and worm wheel and brings them into contact, wherein the amount of increase in torque of the assist shaft due to the rise in friction force in the area where the worm shaft meshes with the worm wheel caused by applying an elastic force having a low spring constant to the worm shaft is kept within a range of 0.4 Nm to 5 Nm.

2. The assist apparatus for an electric-powered power steering apparatus described in claim 1, wherein the total sum $\delta_1$ of the gaps in the radial direction existing inside the second bearing, in the fitting section between the inner race of the second bearing and the rotating shaft, and in the fitting section between the outer race of the second bearing and the inner surface of the casing is less than the total sum $\delta_2$ of the gaps in the radial direction existing inside the third bearing, in the fitting section between the outer race of the third bearing and the inner surface of the gear housing, in the fitting section between the inner race of the third bearing and the worm shaft, and in the connecting section between the worm shaft and the rotating shaft.

3. The assist apparatus for an electric-powered power steering apparatus described in claim 1, wherein when the amount of displacement in the radial direction of a point on the center axis of the rotating shaft where a 20 N force is applied in the radial direction, to a place on the rotating shaft that coincides in the axial direction with the second bearing is taken to be $x_1$, and the amount of displacement in the radial direction of a point on the center axis of the worm shaft where a 20 N force is applied in the radial direction, to a place on the worm shaft that coincides in the axial direction with the third bearing is taken to be $x_2$, and the displacement in the radial direction of the center axis of the rotating shaft with reference to the center axis of the worm shaft in a part connecting the center axis of the worm shaft with the center axis of the rotating shaft when a 20 N force is applied in the radial direction to the part on the rotating shaft where the worm shaft and rotating shaft are connected is taken to be $x_3$, $x_1<(x_2+x_3)$.

4. The assist apparatus for an electric-powered power steering apparatus described in claim 1, wherein the angle between the worm shaft and rotating shaft when driven by the electric motor is less than the angle between the worm shaft and the rotating shaft when not driven by the electric motor.

5. The assist apparatus for an electric-powered power steering apparatus described in claim 1, wherein the angle between the center axis of the worm shaft and the center axis of the rotating shaft when driven by the electric motor is 10 minutes or less.

6. The assist apparatus for an electric-powered power steering apparatus described in claim 1, wherein the third bearing is a deep-groove type ball bearing having a C2 or C3 internal clearance.

7. The assist apparatus for an electric-powered power steering apparatus described in claim 1, wherein the third bearing is a four-point contact type ball bearing.

8. The assist apparatus for an electric-powered power steering apparatus described in claim 1, wherein the balls of at least one of the third and fourth bearings are pre-loaded in the axial direction by a force of 20 N to 200 N.

9. The assist apparatus for an electric-powered power steering apparatus described in claim 1, wherein the connection between the worm shaft and the rotating shaft is located at a position that coincides in the axial direction with the third bearing.

10. The assist apparatus for an electric-powered power steering apparatus described in claim 1, wherein the ends of the worm shaft and the rotating shaft are connected by a spline joint and wherein the displacement in center of both shafts due to clearance in the radial direction of the spline joint is kept within 10 μm to 200 μm.

11. The assist apparatus for an electric-powered power steering apparatus described in claims 1, wherein the ends of the worm shaft and rotating shaft are connected to each other by a spline joint, and wherein the displacement of the centers of the worm shaft and rotating shaft due to the clearance existing in-row section between the casing which supports the end of the rotating shaft, and the gear housing which supports the end of the worm shaft, is less than the displacement of the center of these shafts due to the clearance in the radial direction existing in the spline joint.

12. The assist apparatus for an electric-powered power steering apparatus described in claim 1, wherein the rotor comprises a permanent magnet and the stator comprises a coil, and wherein a vector-control apparatus changes the magnetic force of the stator.

13. The assist apparatus for an electric-powered power steering apparatus described in claim 1, wherein a controller controls the output of the electric motor according the amount of displacement in the radial direction of the worm shaft.

14. The assist apparatus for an electric-powered power steering apparatus described in claim 1, wherein the amount of displacement in the radial direction of the center axis of the worm shaft at a portion where a 20 N force is applied in the radial direction and where the worm shaft coincides in the axial direction with the second bearing is 5 μm to 200 μm.

15. The assist apparatus for an electric-powered power steering apparatus described in claim 1, wherein the force received by the second bearing from the rotating shaft due to the force acting on the area where the worm wheel meshes with the worm shaft when driven by the electric motor is less than the force received by the third bearing from the worm shaft due to the force that acts on this same area of meshing.

16. The assist apparatus for an electric-powered power steering apparatus described in claim 1, wherein the position of the center in the axial direction of the spline joint between the worm shaft and the rotating shaft is located closer to the third bearing than the position of the center in the axial direction between the second bearing and the third bearing.

17. The assist apparatus for an electric-powered power steering apparatus of claim 1, wherein the elastic force is applied to the worm shaft from the elastic-force application means located inside the gear housing without by way of the fourth bearing.

18. The assist apparatus for an electric-powered power steering apparatus of claim 17 above wherein the elastic-force application means comprises a torsion coil spring that is located around the worm shaft.

19. An assist apparatus for an electric-powered power steering apparatus having a torque sensor, assist shaft, worm wheel, worm shaft, and electric motor, and comprising a first bearing and fourth bearing; wherein the torque sensor is located around the steering shaft or pinion; the assist shaft is one of the steering shaft, pinion and a sub-pinion; the worm wheel is fastened to one of the steering shaft, pinion and sub-pinion; the worm shaft is formed with a worm that meshes with the worm wheel; and the electric motor comprises a rotating shaft that is integrated with a part of the worm shaft, a rotor that is located around the outer-diameter side of the rotating shaft, and a stator that is located such that it faces the rotor in the radial direction; wherein the first bearing supports the end of the rotating shaft on the side opposite from the worm shaft inside the casing such that the rotating shaft can tilt freely within a specified range; and the fourth bearing supports the end of the worm shaft on the opposite side from the rotating shaft inside the gear housing; wherein a clearance in the radial direction is provided either between the outer peripheral surface of the outer race of the fourth bearing and the inner surface of the casing, or between the inner peripheral surface of the inner race of the fourth bearing and the outer peripheral surface of the worm shaft or in the interior of the fourth bearing.

20. The assist apparatus for an electric-powered power steering apparatus of claim 19, wherein a cylindrical member is fastened around the outer peripheral surface of the worm shaft, and worm teeth are formed around the outer peripheral surface of this cylindrical member to mesh with the worm wheel.

21. The assist apparatus for an electric-powered power steering apparatus of claim 19, wherein the angle between the center axis of the stator and the rotating shaft of the electric motor when driven by the electric motor is less than the angle between the center axis of the stator and the rotating shaft when not driven by the electric motor.

22. The assist apparatus for an electric-powered power steering apparatus of claim 19, wherein the inner peripheral surface of the inner race of the fourth bearing faces the outer peripheral surface of the worm shaft by way of a clearance or elastic material.

23. The assist apparatus for an electric-powered power steering apparatus of claim 19, wherein the fourth bearing is a sliding bearing, and wherein the inner peripheral surface of this sliding bearing faces the outer peripheral surface of the worm shaft.

24. The assist apparatus for an electric-powered power steering apparatus of claim 19, wherein a hole for assembling the fourth bearing inside the gear housing that supports the fourth bearing is formed in the part of the gear housing that faces the fourth bearing, and this hole is blocked with a cover.

25. The assist apparatus for an electric-powered power steering apparatus of claim 19, wherein the electric motor uses brushless construction.

26. The assist apparatus for an electric-powered power steering apparatus of claim 19, wherein a support bushing is provided in part of the casing for supporting the worm shaft before it is installed inside the gear housing.

27. The assist apparatus for an electric-powered power steering apparatus of claim 19, wherein a pre-load in the axial direction is applied to the balls of at least one of the first and fourth bearings.

28. The assist apparatus for an electric-powered power steering apparatus of claim 19, wherein the first bearing is a four-point contact type ball bearing.

29. An electric-powered power steering apparatus comprising: a steering shaft having a steering wheel located at its rear end, a pinion that is located at the front end of the steering shaft, a rack whose teeth mesh with the pinion or a member supported by the pinion, the assist apparatus for an electric-powered power steering apparatus of claim 1 and a controller for controlling the drive state of the electric motor.

30. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applied an elastic force in a direction toward a worm wheel to an end of a worm shaft or to a bearing for supporting the end of the worm shaft, wherein the elastic-force application means is a pre-load pad that is located inside a gear housing, and a torsion coil spring that is located around the pre-load pad, and wherein the pre-load pad is made of a synthetic resin.

31. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applied an elastic force in a direction toward a worm wheel to an end of a worm shaft or to a bearing for supporting the end of the worm shaft, wherein the elastic-force application means is a pre-load pad that is located inside the gear housing and a torsion coil spring that is located around the pre-load pad, and wherein there is a gap in an axial direction between a surface of wires of each winding of the torsion coil spring.

32. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applied an elastic force in a direction toward a worm wheel to an end of a worm shaft or to a bearing for supporting the end of the worm shaft, wherein the elastic-force application means is a pre-load pad that is located inside a gear housing and a torsion coil spring that is located around the pre-load pad, and wherein an arm section is formed on part of the pre-load pad for controlling a displacement of the pre-load pad inside a gear housing before the worm shaft is inserted through a through hole that is formed in the pre-load pad.

33. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applies an elastic force in a direction toward a worm wheel to an end of a worm shaft or to a bearing for supporting the end of the worm shaft, wherein the elastic-force application means is a pre-load pad that is located inside a gear housing and a torsion coil spring that is located around the pre-load pad, and wherein an area of contact between a outer peripheral surface of the pre-load pad and the torsion coil spring is arc shaped such that a radius of curvature of a part on the outer peripheral surface of the pre-load pad away from the area of contact is less than the radius of curvature of the area of contact.

34. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applies an elastic force in a direction toward a worm wheel to an end of a worm shaft or to a bearing for supporting the end of the worm shaft, wherein the elastic-force application means is a pre-load pad that is located inside a gear housing and a torsion coil spring that is located around the pre-load pad, and wherein a protruding fitting section is formed on a part of an outer peripheral surface of the pre-load pad for preventing the torsion coil spring from falling off from around the pre-load pad.

35. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applied an elastic force in a direction toward a worm wheel to an end of a worm shaft or to a bearing for supporting the end of the worm shaft, wherein the elastic-force application means is a pre-load pad that is located inside a gear housing, and wherein protrusions are formed at two or more locations on each end in an axial direction of the pre-load pad for controlling displacement in the axial direction of the pre-load pad inside the gear housing.

36. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applies an elastic force in a direction toward a worm wheel to an end of a worm shaft or to a bearing for supporting the end of the worm shaft, wherein the elastic-force application means has a pre-load pad that is located inside a gear housing, and wherein an elastic material is located between the gear housing or a member fixed to the gear housing and an outer peripheral surface of the pre-load pad for preventing the pre-load pad from turning inside the gear housing.

37. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applies an elastic force in a direction toward a worm wheel to an end of a worm shaft or to a bearing for supporting the end of the worm shaft, wherein the elastic-force application means has a pre-load pad that is located inside a gear housing, and wherein a through hole is formed in a part of the pre-load pad for inserting a tip end of the worm shaft and a tapered surface is formed on the part of the pre-load pad for guiding part of the worm shaft into the through hole.

38. An electric-powered power steering apparatus wherein a torque obtained by reducing an output of an electric motor by a worm speed reducer at a magnitude corresponding to a steering torque applied to a steering wheel is applied to a steering shaft, and wherein an elastic-force application means applies an elastic force in a direction toward a worm wheel to an end of a worm shaft or to a bearing for supporting the end of the worm shaft, wherein the elastic-force application means has a pre-load pad that is located inside a gear housing, and wherein a tapered surface is formed on a part of the pre-load pad or bearing for guiding the worm shaft inside the pre-load pad or worm shaft, and wherein a diameter of an opening of the tapered surface is greater than a diameter of the part on the worm shaft that is inserted into the opening by 0.5 mm or more.

* * * * *